United States Patent
Miyazaki et al.

(10) Patent No.: US 8,547,587 B2
(45) Date of Patent: Oct. 1, 2013

(54) IMAGE PROCESSING APPARATUS INCLUDING AN INPUT UNIT THAT RECEIVES PLURAL IMAGES

(75) Inventors: Ryonosuke Miyazaki, Tokyo (JP);
Tomofumi Harada, Kanagawa (JP);
Hiroki Hiraguchi, Kanagawa (JP);
Yumiko Murata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1392 days.

(21) Appl. No.: 12/042,083

(22) Filed: Mar. 4, 2008

(65) Prior Publication Data

US 2009/0021758 A1 Jan. 22, 2009

(30) Foreign Application Priority Data

Mar. 9, 2007 (JP) ................................. 2007-060678
Mar. 14, 2007 (JP) ................................. 2007-064817

(51) Int. Cl.
*G06K 15/00* (2006.01)
*G06F 3/12* (2006.01)
(52) U.S. Cl.
USPC .......................... 358/1.18; 358/1.13; 358/1.15
(58) Field of Classification Search
USPC ........................................ 358/1.13, 1.15, 1.18
See application file for complete search history.

(56) References Cited

U.S. PATENT DOCUMENTS

| | | | | |
|---|---|---|---|---|
| 6,466,329 | B1 * | 10/2002 | Mukai | 358/1.15 |
| 6,661,933 | B1 * | 12/2003 | Hisatomi et al. | 382/306 |
| 7,746,490 | B2 * | 6/2010 | Sawada | 358/1.14 |

FOREIGN PATENT DOCUMENTS

| | | |
|---|---|---|
| JP | 10-143414 | 5/1998 |
| JP | 2001-257862 | 9/2001 |
| JP | 2003-259042 | 9/2003 |
| JP | 2005-222372 | 8/2005 |
| JP | 2005-295151 | 10/2005 |
| JP | 2006-80939 | 3/2006 |
| JP | 2006-115020 | 4/2006 |

OTHER PUBLICATIONS

U.S. Appl. No. 12/041,334, filed Mar. 3, 2008, Murata, et al.
Japanese Office Action issued May 24, 2011, in Patent Application No. 2007-060678.
Japanese Office Action issued Aug. 30, 2011, in Patent Application No. 2007-064817.

* cited by examiner

*Primary Examiner* — Benny Q Tieu
*Assistant Examiner* — Sunil Chacko
(74) *Attorney, Agent, or Firm* — Oblon, Spivak, McClelland, Maier & Neustadt, L.L.P.

(57) ABSTRACT

An image processing apparatus stores an input image and an image ID for identifying the image in association with each other, stores a medium ID for identifying a recording medium on which the image is printed n, a unit ID for identifying a print unit having a plurality of recording media, and an image ID of an image included in the print unit in association with each another, detects a plurality of medium IDs from at lease one recording medium, obtains image IDs of all images included in the print unit identified by the unit ID associated with the medium ID, obtains images associated with obtained image IDs, and outputs obtained images.

16 Claims, 53 Drawing Sheets

DOCUMENT A

FIG.4

| PID | EID | PARENT PID | BID | COPY CANCEL FLAG | JID | JOB CANCEL FLAG | PRINT SETTINGS |
|---|---|---|---|---|---|---|---|
| 1 | 1 | - | 1 | 0 | 1 | 0 | DUPLEX PRINTING, PUNCHING |
| 2 | 2 | - | 1 | 0 | 1 | 0 | DUPLEX PRINTING, PUNCHING |
| 3 | 1 | - | 2 | 0 | 1 | 0 | DUPLEX PRINTING, PUNCHING |
| 4 | 2 | - | 2 | 0 | 1 | 0 | DUPLEX PRINTING, PUNCHING |
| 5 | 1 | 1 | 3 | 0 | 2 | 0 | SINGLE-SIDE PRINTING, STAPLING |
| 6 | 2 | 2 | 3 | 0 | 2 | 0 | SINGLE-SIDE PRINTING, STAPLING |
| 7 | 1 | 3 | 4 | 0 | 2 | 0 | SINGLE-SIDE PRINTING, STAPLING |
| 8 | 2 | 4 | 4 | 0 | 2 | 0 | SINGLE-SIDE PRINTING, STAPLING |

DOCUMENT B

FIG.7

| PID OF DETECTION MARKING | JOB INFORMATION OF PID | JID TO WHICH PID BELONGS | EID GROUP BELONGING TO JID |
|---|---|---|---|
| A₁ | DOCUMENT NAME: DOCUMENT A ... | Jₐ | a1 TO a3 |
| B₁ | DOCUMENT NAME: DOCUMENT B ... | J_b | b1 TO b3 |

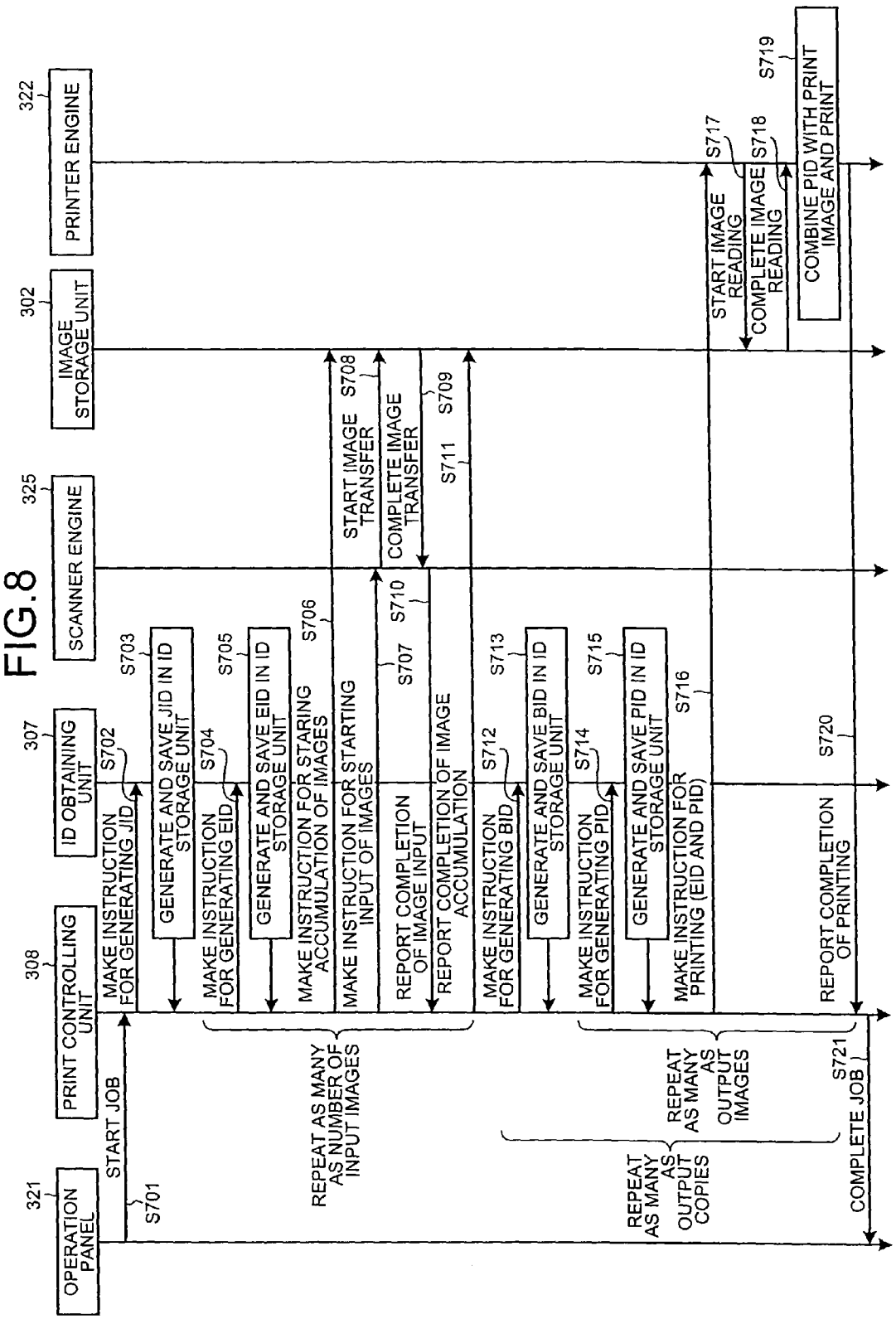

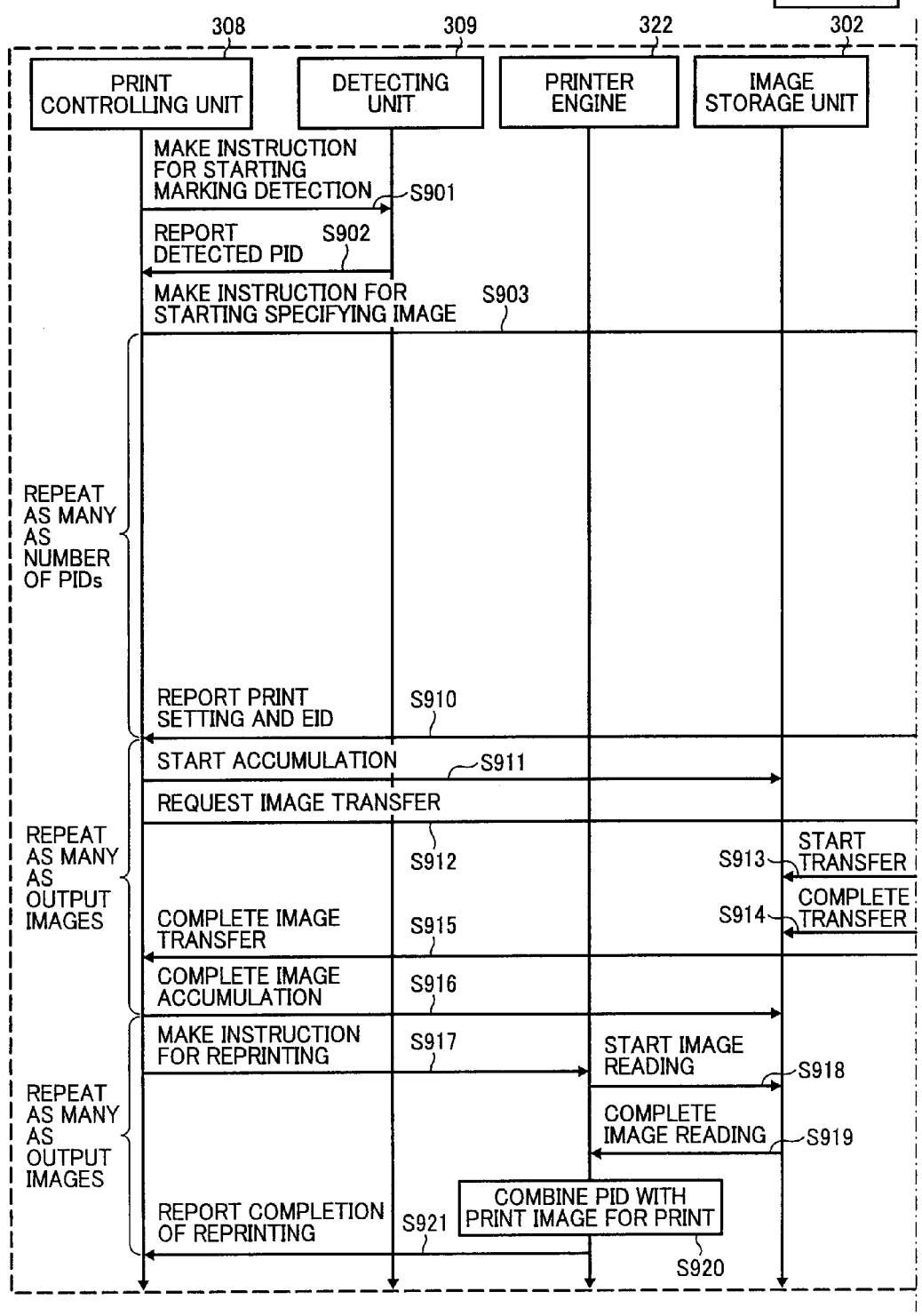

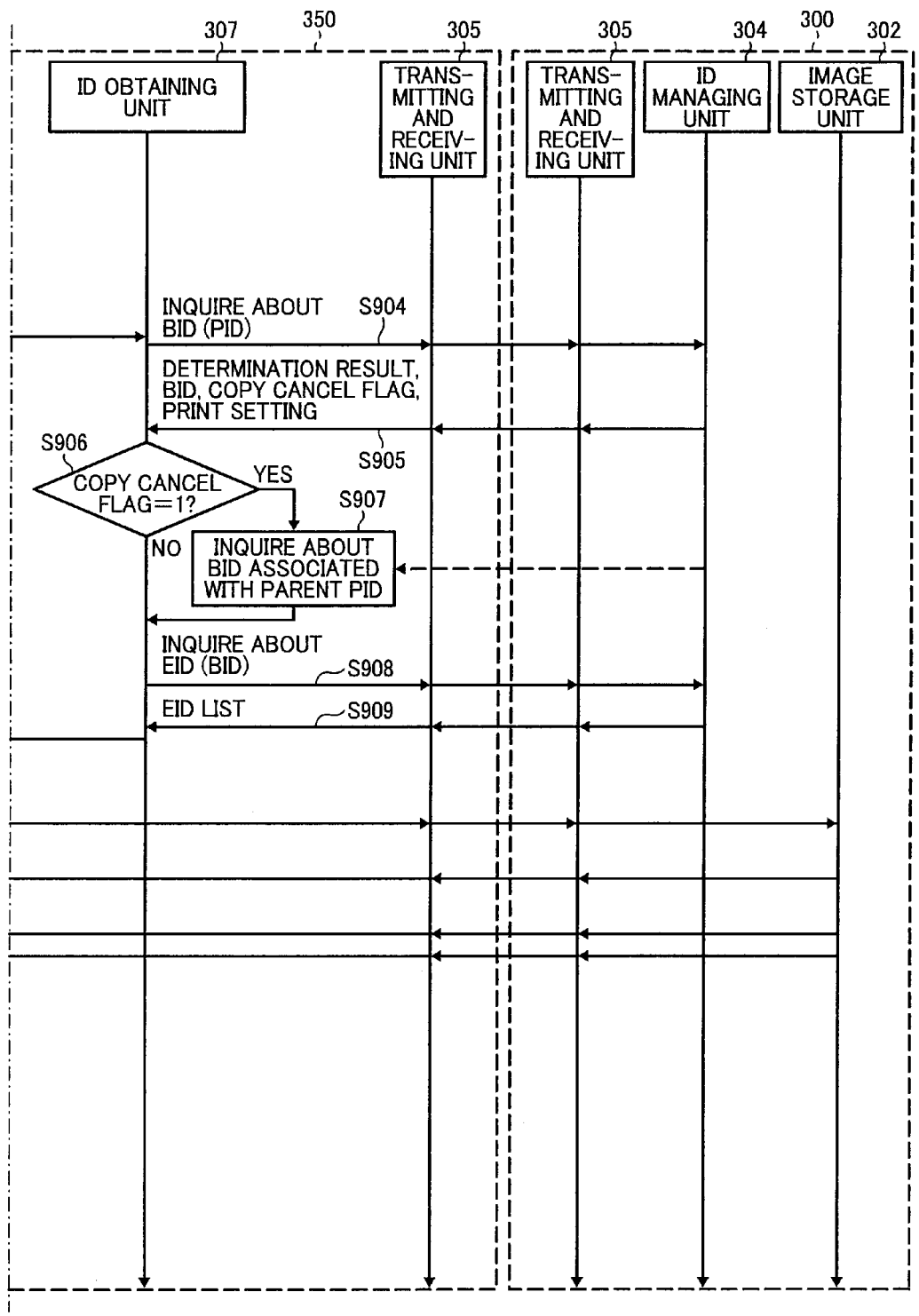

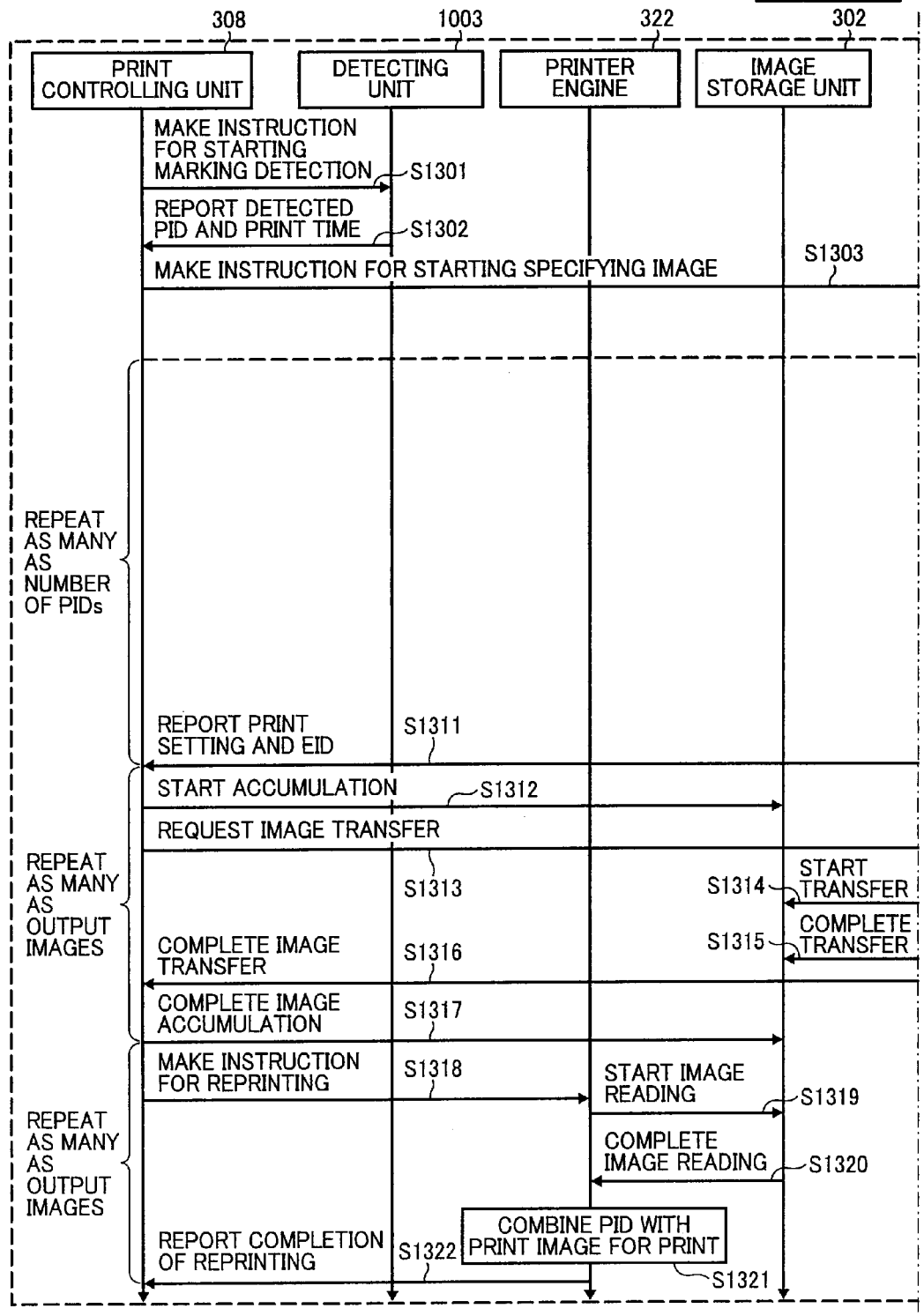

FIG.14

| PID OF DETECTION MARKING | PID PRINT TIME |
|---|---|
| $a_1$ | (2004/02/14/11:02:02.330) — 1401 |
| $c_1$ | (2004/02/24/17:59:99.999) — 1402 |

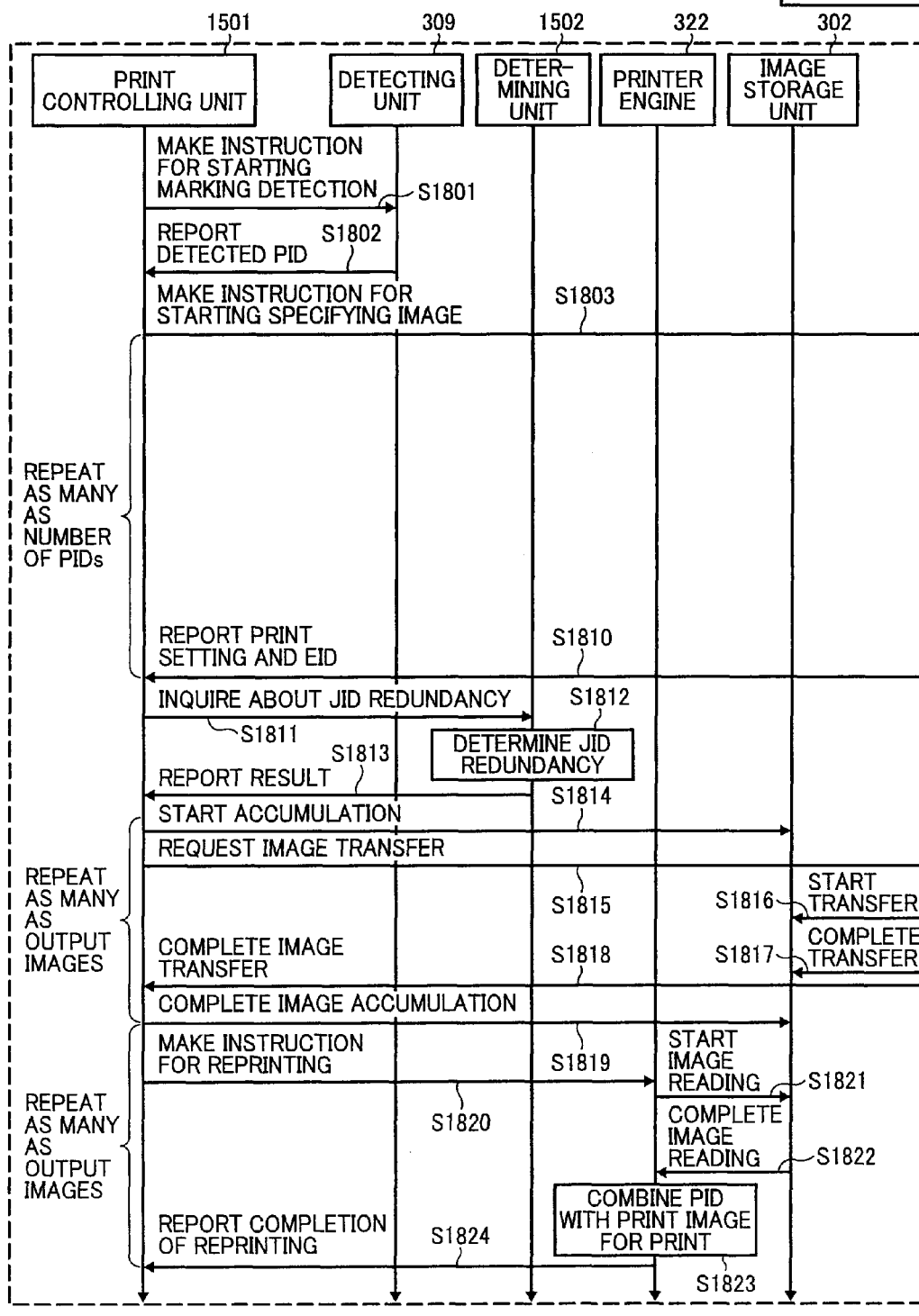

FIG.19

| PID OF DETECTION MARKING | JOB INFORMATION OF PID | JID TO WHICH PID BELONGS | EID GROUP BELONGING TO JID |
|---|---|---|---|
| a1 | DOCUMENT NAME: DOCUMENT A ... | Ja ~1901 | a1 TO a3 |
| b1 | DOCUMENT NAME: DOCUMENT B ... | Ja | b1 TO b3 |
| a2 | DOCUMENT NAME: DOCUMENT A ... | Ja 1902 | a1 TO a3 |

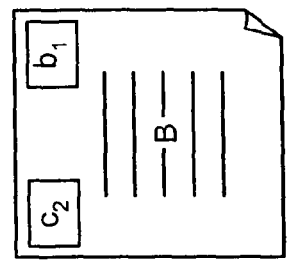
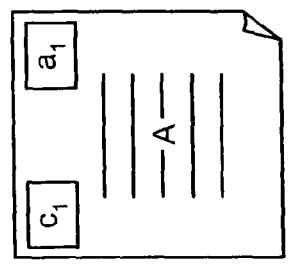
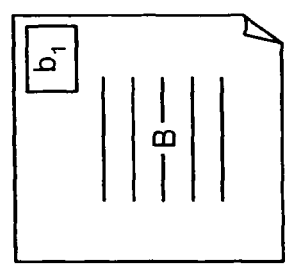
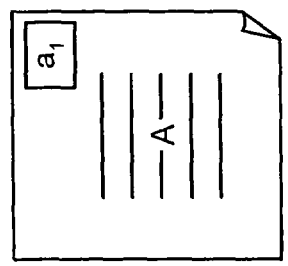
FIG.21

FIG.23

| PID OF DETECTION MARKING | JOB INFORMATION OF PID | JID TO WHICH PID BELONGS | EID GROUP BELONGING TO JID |
|---|---|---|---|
| A₁ | DOCUMENT NAME: DOCUMENT A ... | Jₐ | a1 TO a3 |
| C₁ | DOCUMENT NAME: DOCUMENT C ... | Jc — 2301 | c1 TO c3 |
| B₂ | DOCUMENT NAME: DOCUMENT B ... | Jb | b1 TO b3 |
| C₂ | DOCUMENT NAME: DOCUMENT C ... | Jc | c1 TO c3 |

| USER ID | PASSWORD |
|---|---|
| abc | 11111111 |
| cdf | 22222222 |
| efg | 33333333 |
| ccc | 44444444 |
| hii | 55555555 |
| yoo | 66666666 |
| koo | 77777777 |

FIG.26

| PID | EID | PARENT PID | BID | COPY CANCEL FLAG | JID | JOB CANCEL FLAG | PRINT SETTINGS | JOB OWNER | ACCESS-ALLOWED USER |
|---|---|---|---|---|---|---|---|---|---|
| 1 | 1 | - | 1 | 0 | 1 | 0 | DUPLEX PRINTING, PUNCHING | abc | cdf,efg |
| 2 | 2 | - | 1 | 0 | 1 | 0 | DUPLEX PRINTING, PUNCHING | abc | cdf,efg |
| 3 | 1 | - | 2 | 0 | 1 | 0 | DUPLEX PRINTING, PUNCHING | abc | cdf,efg |
| 4 | 2 | - | 2 | 0 | 1 | 0 | DUPLEX PRINTING, PUNCHING | abc | cdf,efg |
| 5 | 1 | 1 | 3 | 0 | 2 | 0 | SINGLE-SIDE PRINTING, STAPLING | ccc | hii,yoo,koo |
| 6 | 2 | 2 | 3 | 0 | 2 | 0 | SINGLE-SIDE PRINTING, STAPLING | ccc | hii,yoo,koo |
| 7 | 1 | 3 | 4 | 0 | 2 | 0 | SINGLE-SIDE PRINTING, STAPLING | ccc | hii,yoo,koo |
| 8 | 2 | 4 | 4 | 0 | 2 | 0 | SINGLE-SIDE PRINTING, STAPLING | ccc | hii,yoo,koo |

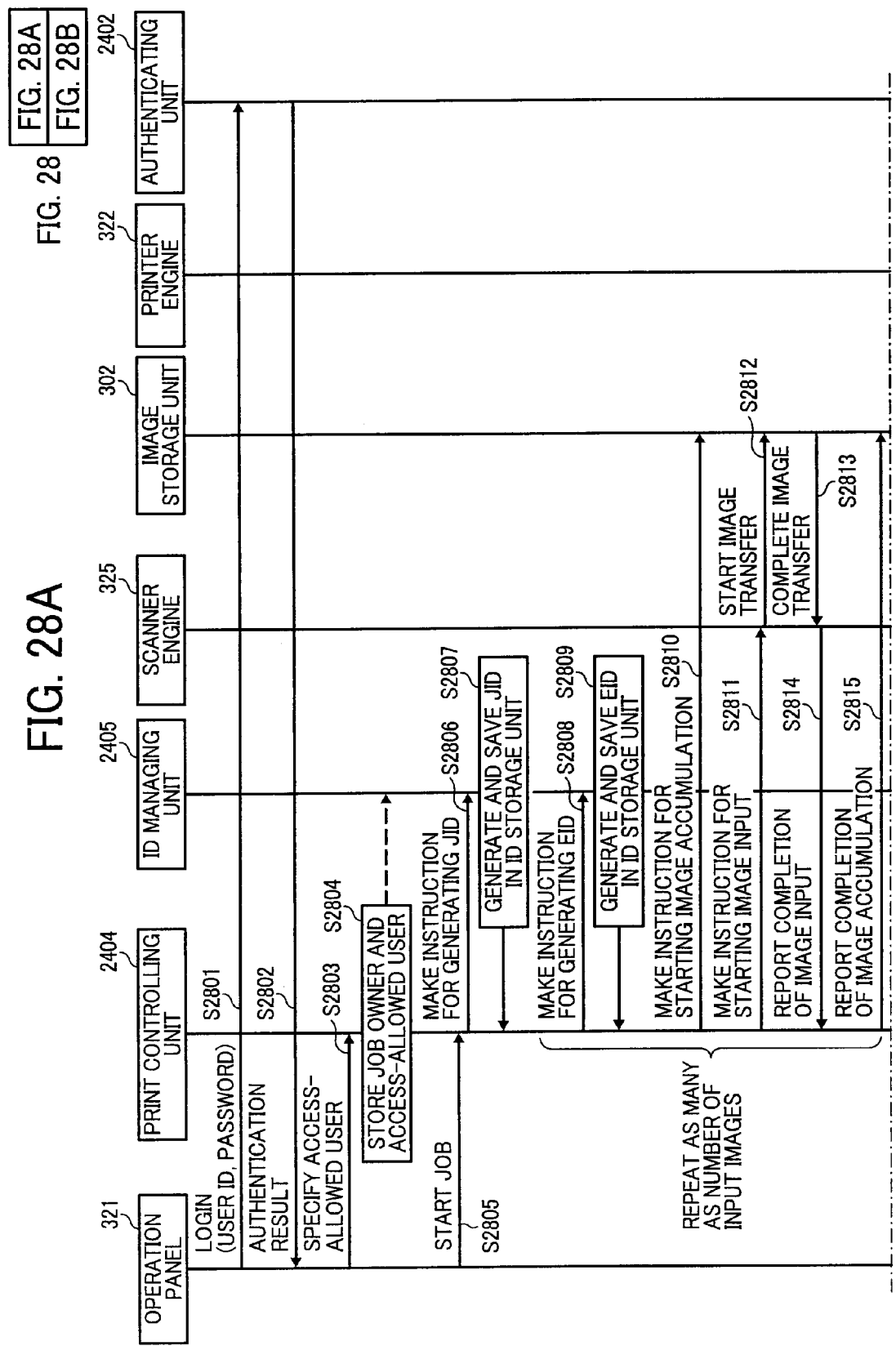

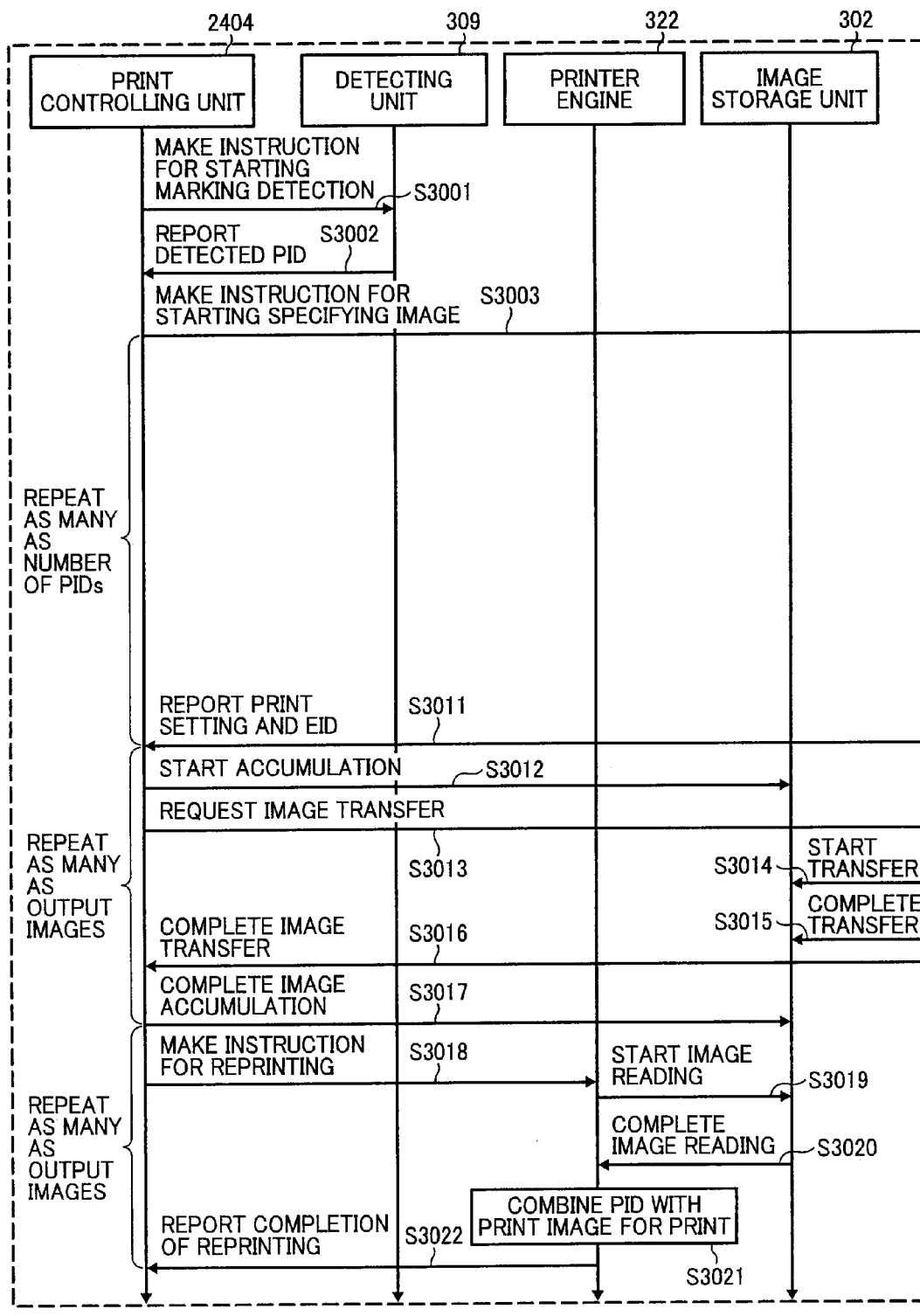

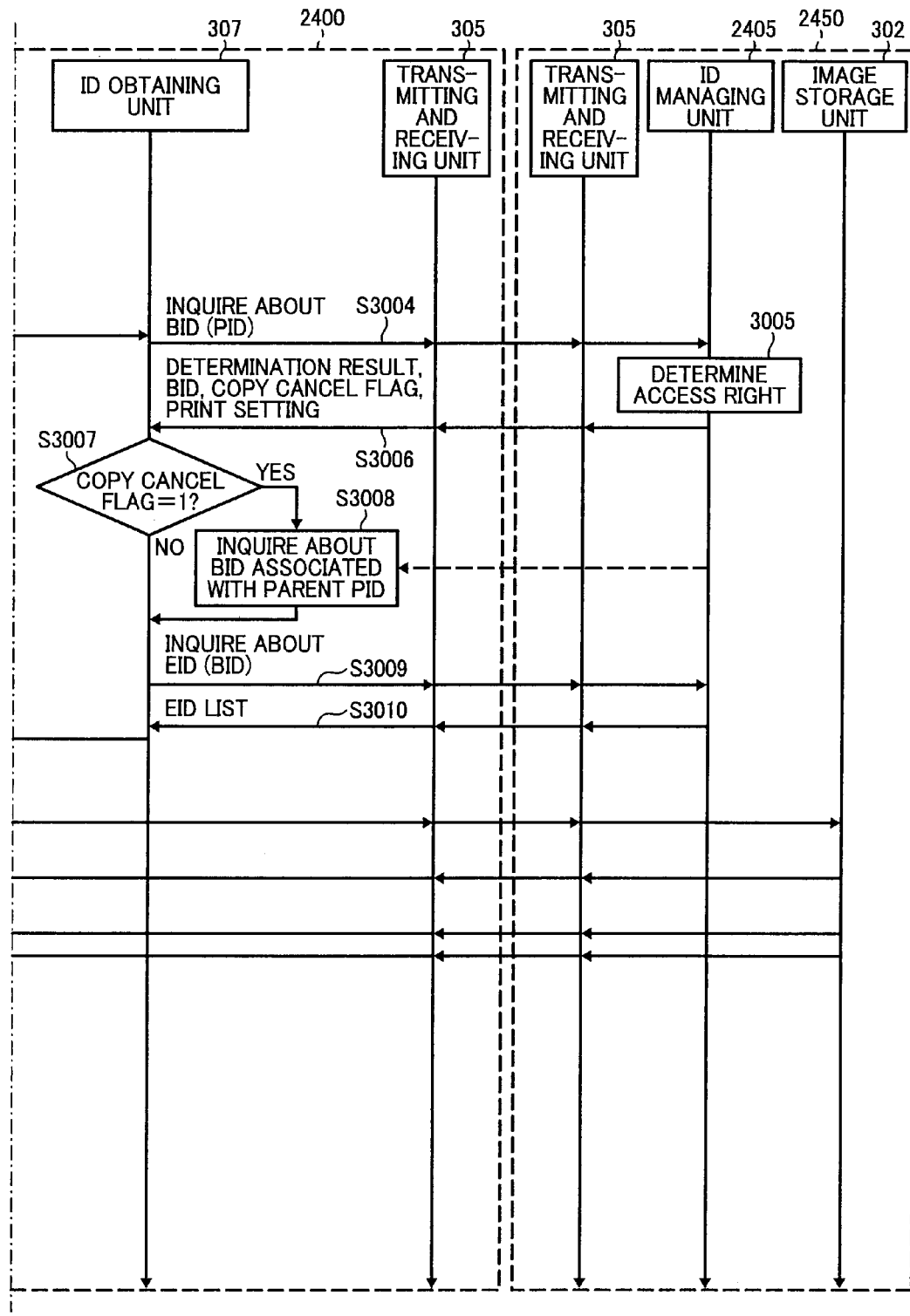

FIG.31

PLEASE SELECT JOB FOR CHANGING ACCESS RIGHT — 3100

| JID | PRINT CONDITION | DOCUMENT NAME | IP ADDRESS |
|---|---|---|---|
| 710 | SINGLE-SIDE PRINTING, STAPLING | DOCUMENT A | 123.456.789.000 |
| 794 | DUPLEX PRINTING, PUNCHING | DOCUMENT B | 123.456.789.000 |
| 1192 | DUPLEX PRINTING, PUNCHING | DOCUMENT C | 123.456.789.000 |
| 1543 | DUPLEX PRINTING, PUNCHING | DOCUMENT D | 123.456.789.000 |

— 3101

NEXT (3102)   PREVIOUS (3103)

FIG.32

SELECT ACCESS-ALLOWED USER — 3200

ACCESS-ALLOWED USER

3201:
- cdf
- efg

3202:
- abc
- ccc
- hii
- yoo
- koo

3203: >>
3204: <<

CHANGE (3205)   CANCEL (3206)

FIG.35

SELECT JOB FOR REPRINTING

| JID | PRINT TIME | DOCUMENT NAME | IP ADDRESS |
|---|---|---|---|
| 300 | 2004/02/14/11/02/02330 | DOCUMENT A | 123.456.789.000 |
| 348 | 2004/02/24/17/59/99999 | DOCUMENT B | 112.345.678.999 |
| 377 | 2004/03/03/00/34/04250 | DOCUMENT A | 123.456.789.000 |

| PID OF DETECTION MARKING | PRINT CONDITION | JOB INFORMATION OF PID | JID TO WHICH PID BELONGS | EID GROUP BELONGING TO JID |
|---|---|---|---|---|
| $a_1$ | SINGLE-SIDE PRINTING | DOCUMENT NAME: DOCUMENT A ... | $J_a$ | a1 TO a3 |
| $b_1$ | SINGLE-SIDE PRINTING | DOCUMENT NAME: DOCUMENT A ... | $J_b$ | a1 TO a3 |

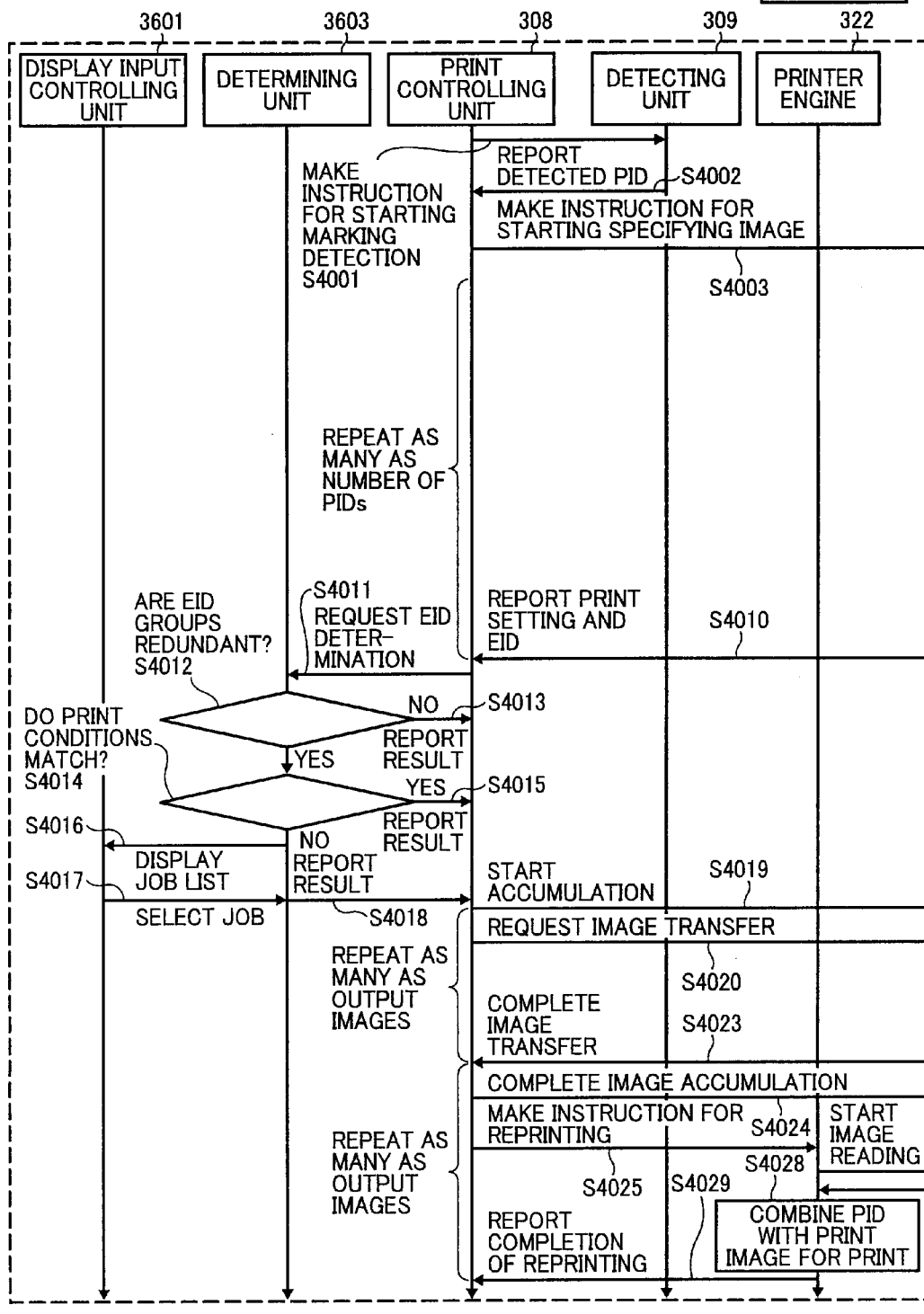

FIG.41

| JID | PRINT CONDITION | DOCUMENT NAME | IP ADDRESS |
|---|---|---|---|
| 300 | SINGLE-SIDE PRINTING, STAPLING | DOCUMENT A | 123.456.789.000 |
| 348 | DUPLEX PRINTING, PUNCHING | DOCUMENT A | 123.456.789.000 |

PLEASE SELECT JOB FOR REPRINTING

OK

DOCUMENT A+DOCUMENT B

FIG.44

| PID OF DETECTION MARKING | PRINT CONDITION | JOB INFORMATION OF PID | JID TO WHICH PID BELONGS | EID GROUP BELONGING TO JID |
|---|---|---|---|---|
| $a_1$ | SINGLE-SIDE PRINTING | DOCUMENT NAME: DOCUMENT A ... | $J_a$ | a1, a2, a3 |
| $b_1$ | SINGLE-SIDE PRINTING | DOCUMENT NAME: DOCUMENT A DOCUMENT NAME: DOCUMENT B | $J_b$ | a1, a2, a3, b1, b2, b3 |

FIG.46

| JID | PRINT CONDITION | DOCUMENT NAME | IP ADDRESS |
|---|---|---|---|
| 400 | SINGLE-SIDE PRINTING | DOCUMENT A | 123.456.789.000 |
| 410 | SINGLE-SIDE PRINTING, STAPLING | DOCUMENT A DOCUMENT B | 123.456.789.000 |

PLEASE SELECT JOB FOR REPRINTING

OK

| PRINT SETTING | PROCESS WHEN PRINT SETTINGS ARE DIFFERENT |
|---|---|
| A | REGARD AS MATCHING |
| B | REGARD AS MATCHING |
| C | REGARD AS MATCHING |
| D | REGARD AS NOT MATCHING |

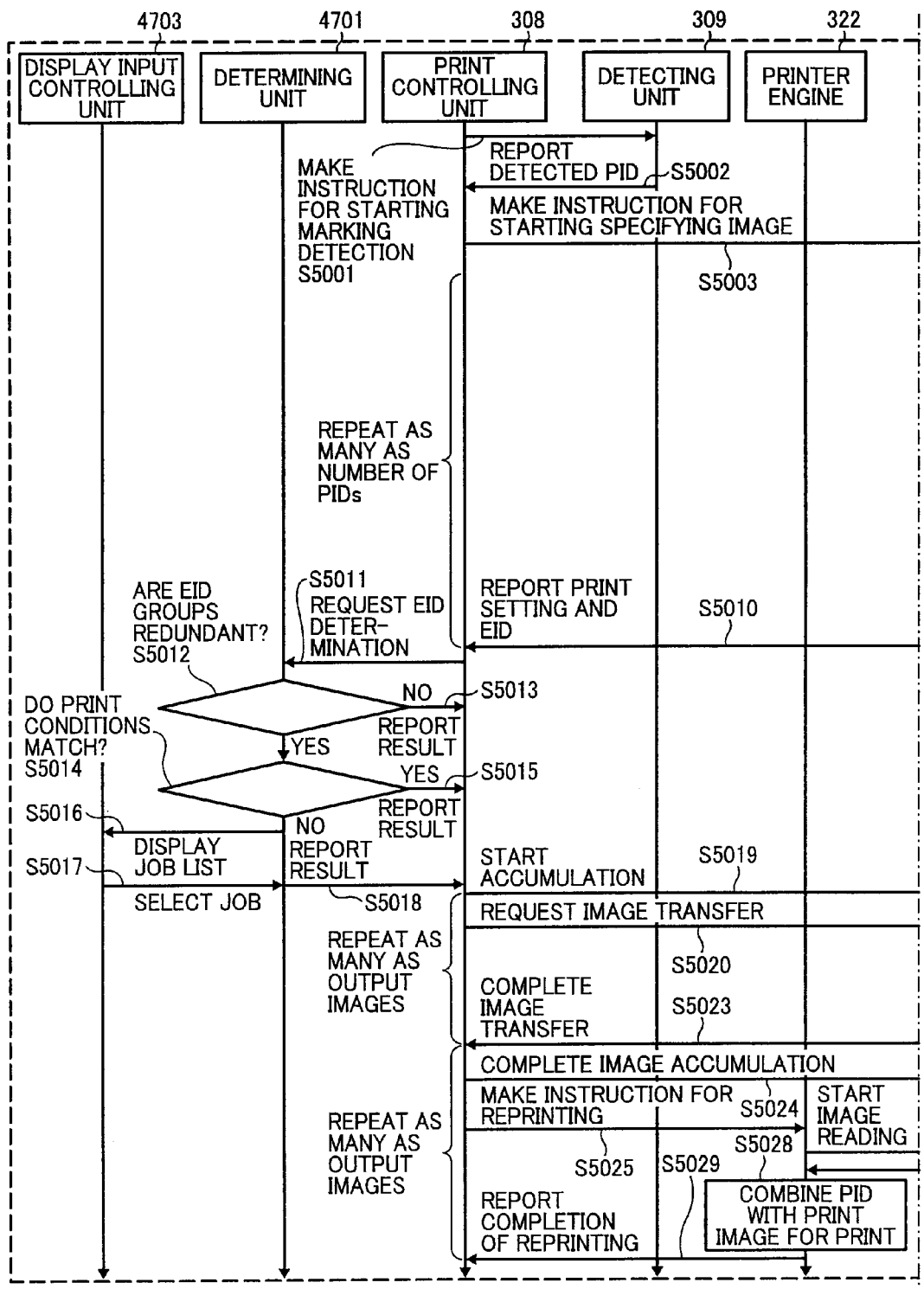

IMAGE PROCESSING APPARATUS INCLUDING AN INPUT UNIT THAT RECEIVES PLURAL IMAGES

CROSS-REFERENCE TO RELATED APPLICATIONS

The present application claims priority to and incorporates by reference the entire contents of Japanese priority documents, 2007-060678 filed in Japan on Mar. 9, 2007 and 2007-064817 filed in Japan on Mar. 14, 2007.

BACKGROUND OF THE INVENTION

1. Field of the Invention

The present invention relates to an image processing apparatus that prints an image using a marking added to a printing sheet.

2. Description of the Related Art

In recent years, scanners that read document images, copiers that print document images read by a scanner, printers and facsimile machines that print externally-input image data, or multifunction products (MFPs) have been used. Also, a technology has been known in which a marking, such as a two-dimensional barcode, embedded with various information is read from a document and, based on the embedded information, printing or other processes thereafter is controlled.

For example, Japanese Patent Application Laid-open No. 2006-80939 suggests a technology in which a two-dimensional barcode added to a document is detected, command information coded on the detected two-dimensional barcode is decoded and, according to the decoded command information, a process on the read document is determined.

Also, Japanese Patent Application Laid-open No. 2006-115020 suggests a technology in which, when the read image data includes two-dimensional code information, information as to an access to a web server is decoded from the two-dimensional code information and, according to the decoded access information, content data is obtained for printing.

However, the methods disclosed in Japanese Patent Application Laid-open Nos. 2006-80939 and 2006-115020 have a problem in which a document printed for each predetermined unit, such as each print job unit or copy unit, cannot be reprinted for each unit by reproducing print settings at the time of printing.

For example, in the technology disclosed in Japanese Patent Application Laid-open No. 2006-80939, only the command information defining the process content on each document is added. Therefore, for example, when collective printing for each copy unit is performed, it is required to prepare all documents belonging to that copy and detect a two-dimensional barcode from each document.

Moreover, in the technology disclosed in Japanese Patent Application Laid-open No. 2006-115020, although collective printing of the entire content data obtained by referring to the access information is possible, it is impossible to reproduce the print settings at the time of printing the content data for reprinting. This is because, in the first place, an object of the technology disclosed in Japanese Patent Application Laid-open No. 2006-115020 is to reduce time and trouble of obtaining information from an external apparatus, and reading the barcode or the like added to the document at the time of printing to reprint the document is not an object of this technology.

SUMMARY OF THE INVENTION

It is an object of the present invention to at least partially solve the problems in the conventional technology.

According to an aspect of the present invention, there is provided an image processing apparatus including an image storage unit that stores therein an input image and an image identification for identifying the image in association with each other; an identification storage unit that stores therein identification information in which a medium identification for identifying a recording medium on which the image is printed, a unit identification for identifying a print unit including a plurality of recording media, and the image identification of the image included in the print unit are associated with each other; a detecting unit that detects a plurality of medium identifications from at least one recording medium; an identification obtaining unit that obtains the image identification of all images included in the print units identified by the unit identification associated with the medium identification, from the identification storage unit; an image obtaining unit that obtains all images associated with the image identification obtained by the identification obtaining unit, from the image storage unit; and an output unit that outputs the image obtained by the image obtaining unit.

Furthermore, according to another aspect of the present invention, there is provided an image processing apparatus including an image storage unit that stores therein an input image and the image identification for identifying the image in association with each other; an identification storage unit that stores identification information in which a medium identification for identifying a recording medium on which the image is printed, a unit identification for identifying a print unit including a plurality of the recording media, and the image identification of the image included in the print unit are associated with each other; a detecting unit that detects the medium identification from at least one recording medium; an identification obtaining unit that obtains the image identification of all images included in the print unit identified by the unit identification associated with the medium identification in association with each of the medium identifications, from the identification storage unit; a determining unit that determines whether the image identifications obtained by the identification obtaining unit match each other for each of the medium identifications; and an output unit that outputs once, when the determining unit determines that the image identifications match each other, the image associated with the image identifications determined as matching.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a drawing of an example of a data structure of ID information stored in an ID storage unit of the MFP according to the first embodiment;

FIG. 7 is a drawing of an example of print jobs managed by a print-job managing unit in the MFP according to the first embodiment;

FIG. 8 is a flowchart of an entire flow of a printing process by the MFP according to the first embodiment;

FIGS. 9A and 9B are a flowchart of an entire flow of a reprinting process by a plurality of MFPs according to the first embodiment;

FIGS. 13A and 13B are a flowchart of an entire flow of a reprinting process by the MFP according to the second embodiment;

FIG. 14 is a drawing of detected PIDs and print times transmitted to an ID obtaining unit of the MFP according to the second embodiment;

FIGS. 18A and 18B are a flowchart of an entire flow of a reprinting process in a plurality of MFPs according to the third embodiment;

FIG. 19 is a drawing of an example of print jobs held by a print-job managing unit of the MFP according to the third embodiment after Step S1813 of FIG. 18 ends;

FIG. 21 is a schematic drawing of an example in which one sheet of the document A and one sheet of the document B are collectively copied in the MFP according to the fourth embodiment;

FIG. 23 is a drawing of an example of a print job held by a print-job managing unit of the MFP according to the fourth embodiment after Step S1811 ends;

FIG. 25 is a drawing for explaining an example of a data structure of a user-information management table of the MFP according to the fifth embodiment;

FIG. 26 is a drawing for explaining an example of a data structure of ID information stored in an ID storage unit of the MFP according to the fifth embodiment;

FIGS. 28A and 28B are a flowchart of an entire flow of a printing process in the MFP according to the fifth embodiment;

FIGS. 30A and 30B are a flowchart of an entire flow of a reprinting process in a plurality of MFPs according to the fifth embodiment;

FIG. 31 is a drawing for explaining an example of a changeable-job selection screen displayed when an access-allowed user is changed;

FIG. 32 is a drawing for explaining an example of a change screen;

FIG. 35 is a drawing of an example of a print-job selection screen displayed when a plurality of markings are detected in an MFP according to a second modification example;

FIG. 39 is a drawing of an example of print jobs managed by a print-job managing unit in the MFP according to the sixth embodiment;

FIGS. 40A and 40B are a flowchart of an entire flow of a reprinting process in a plurality of MFPs according to the sixth embodiment;

FIG. 41 is a drawing of an example of a screen of a print-job list displayed by a display input controlling unit in the MFP according to the sixth embodiment;

FIG. 44 is a drawing of an example of print jobs managed by a print-job managing unit of the MFP according to the first modification example of the sixth embodiment;

FIG. 46 is a drawing of an example of a screen of a print-job list displayed by the display input controlling unit of the MFP according to the first modification example of the sixth embodiment;

FIGS. 50A and 50B are a flowchart of an entire flow of a reprinting process in each MFP according to the seventh embodiment;

DETAILED DESCRIPTION OF THE PREFERRED EMBODIMENTS

Exemplary embodiments of the present invention are explained in detail below with reference to the accompanying drawings.

In the embodiments explained below, the image processing apparatus is exemplarily applied to a so-called MultiFunction Peripheral (MFP), which is an image processing apparatus including, for example, a copy function, facsimile (FAX) function, a print function, a scanner function, and a function of distributing an input image (a document image read with the scanner function or an image input with the printer or the FAX function).

In an MFP according to a first embodiment of the present invention, it is assumed that, when images are printed for each predetermined print unit, a coding image obtained by coding identification information of a print sheet (hereinafter, a "marking") is printed on a printing sheet and, by re-reading the marking on the printing sheet by the scanner, all related images for each print unit can be reprinted.

Here, a printed image is stored in a predetermined storage unit. At the time of reprinting, a printing process is performed based on the image stored in the storage unit. With this, it is possible to prevent image deterioration compared with the case where a normal copying process is performed on a printed sheet.

Figure 1:
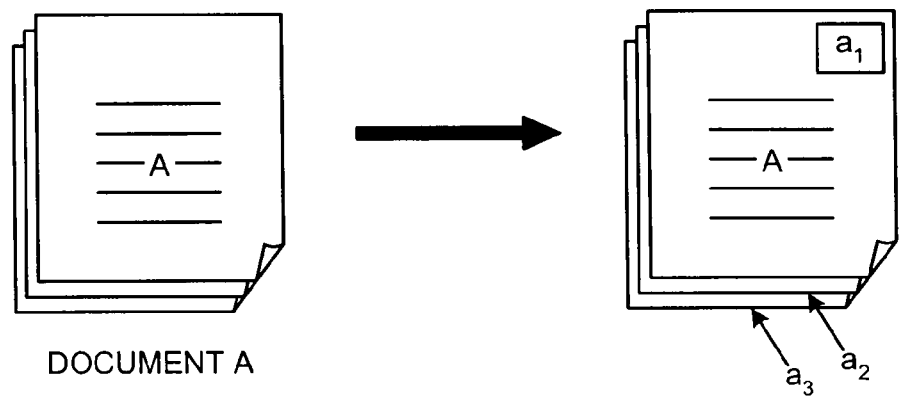
FIG. 1 is a schematic drawing of an example in which a document A is printed in an MFP according to a first embodiment of the present invention.
Figure 2:
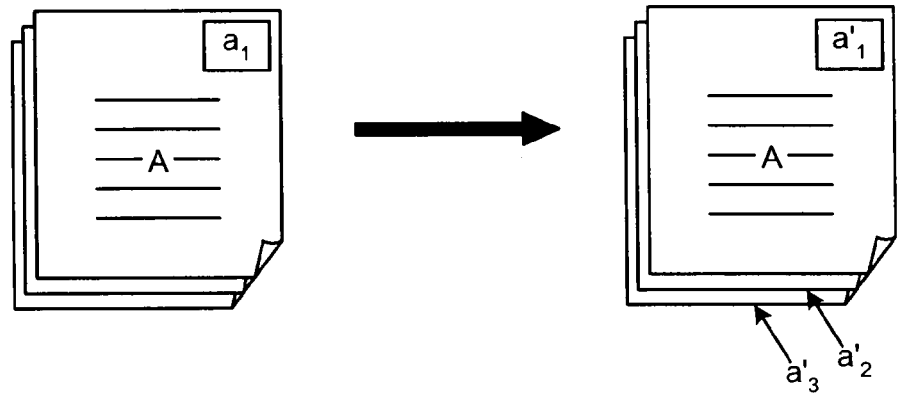
FIG. 2 is a schematic drawing for explaining a reprinting process by the MFP according to the first embodiment.

First, features of an MFP according to a first embodiment are explained by using FIGS. 1 and 2. FIG. 1 is a schematic drawing of an example in which a document A is printed in the MFP according to the first embodiment.

As depicted in the drawing, when a document A formed of a plurality of sheets is copied or printed, a marking is output to each sheet, the marking obtained by coding identification information that uniquely identifies each sheet (hereinafter, "PID") and information for identifying a printing apparatus.

As depicted in FIG. 1, when a user simultaneously prints three sheets, the head sheet is marked with PID=a1, and the second and third sheets are marked with PID=a2 and PID=a3, respectively.

Also, examples of the information that is included in the marking to identify the apparatus include an Internet Protocol (IP) address of the apparatus. With this, it is possible to track which apparatus the image has been stored in, or which apparatus the sheet has been printed at.

Here, in a marking generation process, any code generation scheme conventionally used can be used, such as QR Code™ obtained by coding a PID or another scheme of generating a two-dimensional barcode.

FIG. 2 is a schematic drawing for explaining a reprinting process by the MFP according to the first embodiment. As depicted in FIG. 2, when the user instructs the MFP according to the present embodiment to scan and reprint one sheet printed as in FIG. 1 marked with PID=a1, the MFP according to the first embodiment can print not only the sheet with PID=a1 but also all sheets included in the print unit printed at the same time in a collective manner.

That is, an image on not only the scanned sheet with PID=a1 but also all images including those on the sheets with PID=a2 and PID=a3 in FIG. 1 included in the document A are reprinted. Here, on each of the sheets at the time of reprinting, a marking obtained by coding a new PID (a'1, a'2, a'3) and information that specifies the MFP is printed.

Figure 3:
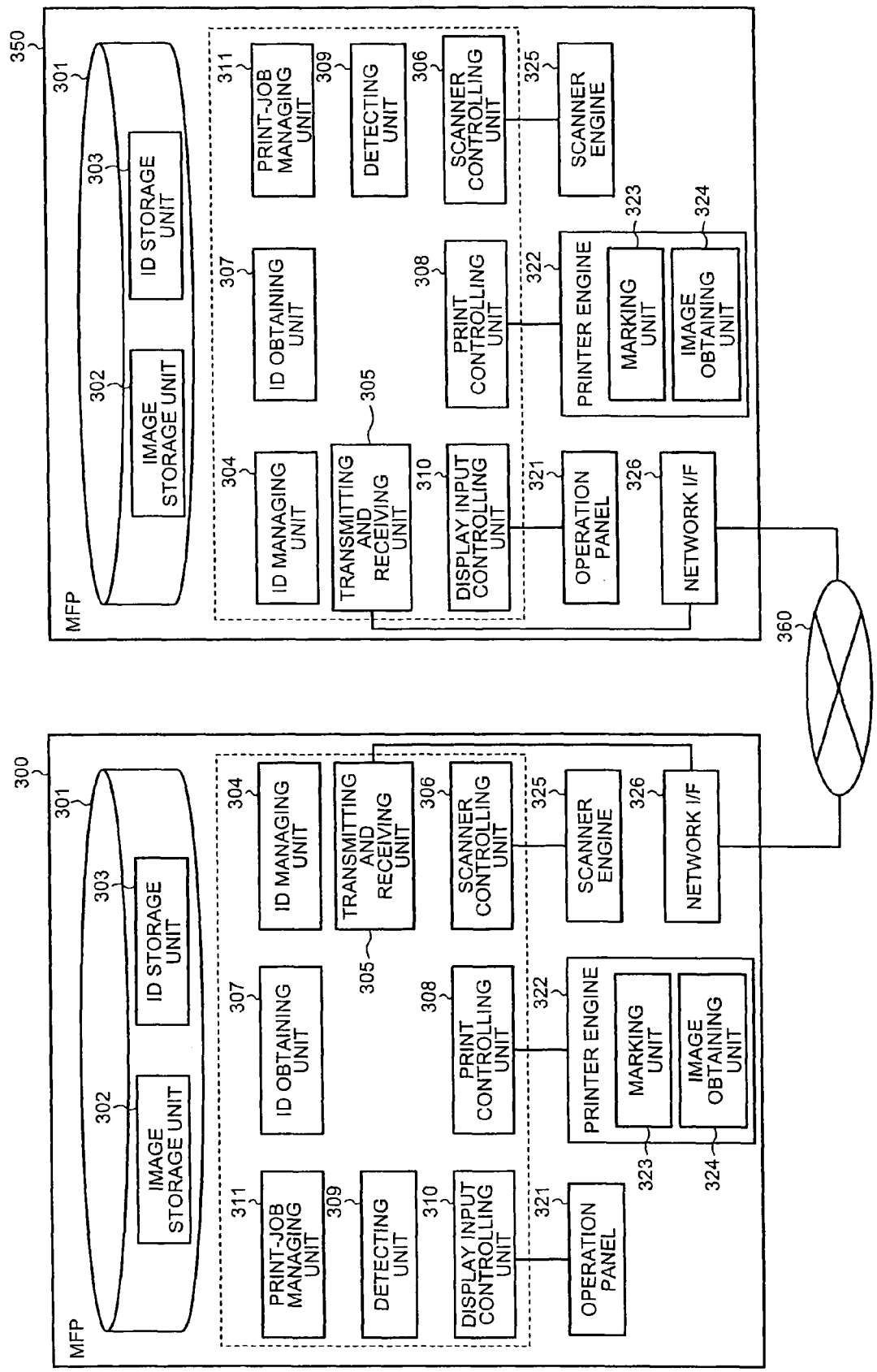
FIG. 3 is a block diagram of the configuration of each MFP according to the first embodiment.

FIG. 3 is a block diagram of the configuration of an MFP 300 and an MFP 350 according to the first embodiment. As depicted in FIG. 3, these MFPs are connected to each other via a network 360. With this, when one MFP performs marking printing, the other MFP can perform reprinting explained above. Here, the number of MFPs to be connected is not restricted to two, but a plurality of MFPs may be provided as MFPs for marking printing and MFPs for reprinting. Also, each MFP may have only one of a marking print function and a reprinting function. Here, as in the drawing, the MFPs 300 and 350 have a similar configuration, and therefore only the MFP 300 is explained.

As depicted in FIG. 3, the MFP 300 according to the first embodiment includes an image storage unit 302, an ID storage unit 303, an operation panel 321, a printer engine 322, a scanner engine 325, a network interface (I/F) 326, an ID managing unit 304, a transmitting and receiving unit 305, a scanner controlling unit 306, an ID obtaining unit 307, a print controlling unit 308, a detecting unit 309, a display input controlling unit 310, and a print-job managing unit 311.

The network I/F 326 is a communication interface connected to the network 360.

The transmitting and receiving unit 305 controls the network I/F 326 to transmit information to an external apparatus, such as the MFP 350, and receives information therefrom. Here, the information to be transmitted and received will be explained further below. Also, the transmitting and receiving unit 305 performs transmission and reception, such as inquiring at the time of performing marking printing. At this time, the transmitting and receiving unit 305 also transmits and receives various identifiers (IDs) (for example, PID, BID, JID, and EID), image data, and others.

The image storage unit 302 has stored therein images read by a scanner, the images being associated with image IDs each uniquely identifying the image (hereinafter, "EID"). Here, the MFP 300 may be configured in a manner such that images are captured over the network I/F 326 and then stored in the image storage unit 302.

The ID storage unit 303 has stored therein ID information in which various pieces of identification information required for image reprinting, such as EIDs are associated with each other. FIG. 4 is a drawing for explaining an example of a data structure of the ID information stored in the ID storage unit 303 according to the first embodiment.

As depicted in the drawing, the ID information has stored therein a sheet PID, an EID of an image printed on the sheet, a parent PID, a BID, a copy cancel flag, JID, a job cancel flag, and print settings in association with each other.

Here, each ID included in the ID information is explained. First, when it is assumed that a job until a print output is completed for a series of input document images is taken as one job, an ID uniquely assigned for each job within the apparatus is referred to as a JID.

Also, when a plurality of copies is subjected to print copy with the print output, it is assumed that an ID uniquely assigned for copy is referred to as a BID. Since it is possible to specify printing of a plurality of copies in one job, one JID can be associated with a plurality of BIDs.

Furthermore, image data of an input image is stored in the image storage unit 302 for each page, and an ID uniquely assigned to such a stored image in the apparatus is referred to as EID (ID for each electronic image).

The PID is an ID uniquely assigned in the apparatus to each sheet for print output.

The parent PID is set in the case of reprinting process, representing a PID of a reprinting-source sheet. In the drawing, an example is depicted in which PID=1 to PID=4 are set as associated parent PIDs for sheets with PID=5 to PID=8 reprinted for each job unit to which sheets with PID=1 to PID=4 belong by scanning the sheet with PID=1.

The copy cancel flag indicates information as to whether printing of a copy to which an image to be printed belongs has been interrupted. The copy cancel flag is set at 1 if printing has been interrupted by a user's instruction or the occurrence of jamming, and is set at 0 if printing has been normally completed. Similarly, a job cancel flag indicates information as to whether printing of a job to which an image to be printed belongs has been interrupted.

The copy cancel flag and the job cancel flag are referred to in order to obtain an appropriate EID by tracking down to the parent PID when it is determined whether printing for each copy unit or each job unit has been interrupted and reprinting of the interrupted copy or job is specified.

With the information as explained above being stored in an associating manner in the ID storage unit 303, reprinting of all relevant images is possible for each copy unit or job unit only by detecting the PID of an arbitrary sheet.

Referring back to FIG. 3, the image storage unit 302 and the ID storage unit 303 are stored in a Hard Disk Drive (HDD) 301. The image storage unit 302 and the ID storage unit 303 may be configured of any storage medium generally used, such as, in addition to the HDD 301, an optical disk, a memory card, or a Random Access Memory (RAM). To read the accommodated image information even after the apparatus is powered off, the storage medium is preferably volatile, such as an HDD.

The operation panel 321 includes a displaying unit (not shown) that displays messages indicating a function setting key, the number of copies, and the state of the MFP 300, and an input unit (not shown) that receives key inputs from a numeric keypad, a clear/stop key, a start key, a preheat key, a reset key, an initialization key, a print key, a transmission key, a save key, and others. The displaying unit also serves as an input unit that displays images and also allows operation inputs in a touch panel scheme.

With the operation panel 321, an instruction for image scanning and printing process, an instruction for reprinting process, a setting of print conditions at the time of printing, and others are performed.

The printer engine 322 includes a marking unit 323 and an image obtaining unit 324, and forms image data on a recording sheet or the like through an ink jet scheme, an electrophotographic scheme, or others.

The marking unit 323 generates a marking obtained by coding a PID specified from the print controlling unit 308 and information for identifying its own apparatus (MFP 300). The printer engine 322 causes printing of a marking image (coded image) generated by the marking unit 323 being combined with image data of the document.

The image obtaining unit 324 obtains from the image storage unit 302 an image associated with the EID obtained by the ID obtaining unit 307. The printer engine 322 causes printing of the image obtained by the image obtaining unit 324.

Here, the marking unit 323 and the image obtaining unit 324 may be provided outside of the printer engine 322, and an image obtained by combining the image data obtained by the image obtaining unit 324 with the coded image generated by the marking unit 323 may be sent to the printer engine 322 for printing.

The scanner engine 325 drives the scanner to perform document scanning process.

The display input controlling unit 310 performs display control of various screens on the displaying unit of the operation panel 321 and receives a key input event from the input unit.

The print controlling unit 308 controls the printer engine 322. Also, in the present embodiment, after an instruction for printing is made and the image input from the scanner engine 325 is temporarily stored in the image storage unit 302, the stored image is printed. Therefore, the print controlling unit 308 also controls an image storing process for the image storage unit 302.

The scanner controlling unit 306 controls the scanner engine 325.

The ID managing unit 304 manages various IDs stored in the ID storage unit 303. For example, the ID managing unit 304 generates an ID for each print unit, such as JID and BID, for each image input and each print output, and causes the generated IDs to be stored in the ID storage unit 303. Also, the ID managing unit 304 generates an EID of each image input for printing, and causes the generated EID to be stored in the ID storage unit 303 in association with a JID or the like.

Also, the ID managing unit 304 performs a process of obtaining various associated IDs from the ID storage unit 303 in response to an inquiry. For example, upon inquiry about a BID associated with the PID detected by the detecting unit 309, the ID managing unit 304 obtains a BID associated with the PID from the ID storage unit 303, and then returns the BID to the inquiring source.

The detecting unit 309 detects a marking in a document image read by the scanner engine 325, and then decodes the detected marking, thereby detecting information for identifying a PID of the document and an apparatus. That is, the detecting unit 309 is used for reprinting.

Also, when detecting a plurality of markings in document sheets, the detecting unit 309 detects information for identifying PIDs and an apparatus from each marking. Then, the detecting unit 309 outputs the detected PIDs to the ID obtaining unit 307. With this, the MFP 300 can print a plurality of documents for each marking.

Figure 5:
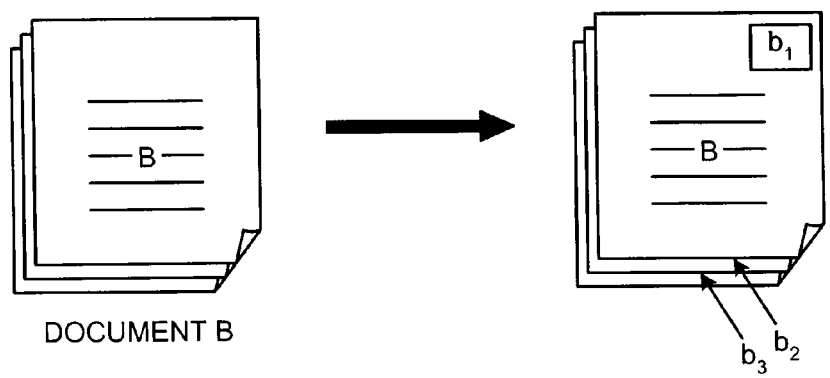
FIG. 5 is a schematic drawing of an example in which a document B is printed in the MFP according to the first embodiment.

For example, it is assumed that, after performing printing with addition of the markings depicted in FIG. 1, the MFP 300 also performs printing with addition of similar markings on the document B. FIG. 5 is a schematic drawing of an example in which the document B is printed in the MFP 300 according to the first embodiment. As depicted in the drawing, when the user performs printing of the document B formed of three document sheets, the head sheet is marked with PID=b1, and the second and third sheet are marked with PID=b2 and PID=b3, respectively. Then, after the user pastes the markings added by printing (for example, a1 and b1) onto another document and then performs reprinting process on the other document, the original document A and the document B are output.

Figure 6:
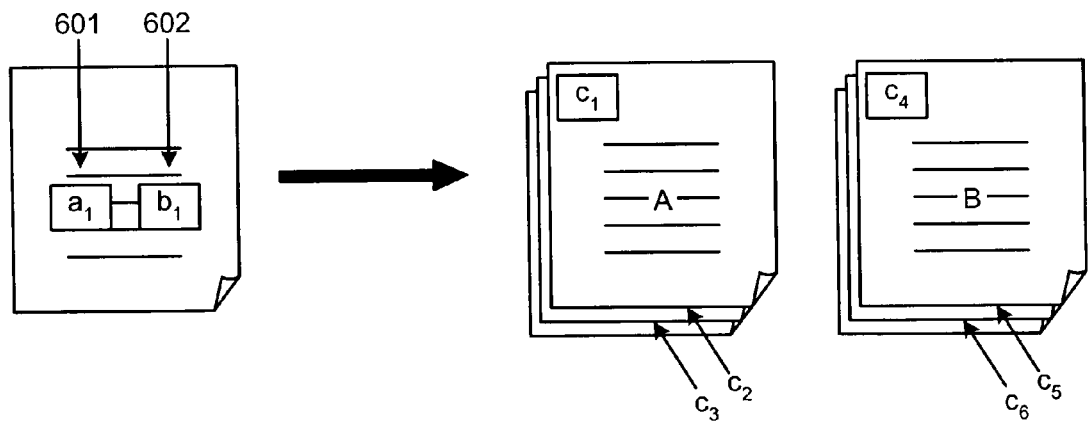
FIG. 6 is a schematic drawing of an example in which a plurality of documents are reprinted from a plurality of markings in the MFP according to the first embodiment.

FIG. 6 is a schematic drawing of an example in which a plurality of documents are reprinted from a plurality of markings in the MFP 300 according to the first embodiment. As depicted in the drawing, when reprinting process for a document sheet added with a marking 601 with PID=a1 and a marking 602 with PID=b1 is requested, the detecting unit 309 detects PID=a1 and PID=b1. The MFP 300 then reprints the document A associated with PID=a1 and the document B associated with PID=b1. Here, sheets of the reprinted document A are added with markings PID=c1, PID=c2, and PID=c3, whilst sheets of the reprinted document B are added with markings PID=c4, PID=c5, and PID=c6. In this manner, in the MFP 300, when markings added to different documents are pasted on one document sheet for instruction of reprinting, these different documents can be respectively reproduced.

The ID obtaining unit 307 obtains EIDs of all images included in a print unit (copy unit or job unit) to which the PIDs detected by the detecting unit belong. Also, the ID obtaining unit 307 obtains print settings, which are print conditions at the time of printing for the print unit to which the detected PIDs belong.

Specifically, the ID obtaining unit 307 first inquires of the ID managing unit 304 about a BID (JID) associated with the detected PIDs for obtainment. Next, the ID obtaining unit 307 inquires of the ID managing unit 304 about all EIDs associated with the obtained BID (JID) for obtainment. Furthermore, the ID obtaining unit 307 inquires of the ID managing unit 304 about print settings associated with the obtained BID (JID).

Upon reception of a reprinting request from the user, the ID obtaining unit 307 obtains, from the ID storage unit 303 of another MFP via the transmitting and receiving unit 305, EIDs of all images included in a print unit to which the PIDs detected by the detecting unit 309 belong and print setting associated with printing units.

Still further, upon reception from another MFP of a request for transmitting information for reprinting, the ID obtaining unit 307 inquires of the ID managing unit 304 about EIDs associated with the PIDs received by the transmitting and receiving unit 305, the BID (JID), and print settings. Then, by transmitting the obtained information to the other MFP (for example, the MFP 350), the information associated with the PIDs in the other MFP can be obtained.

The print-job managing unit 311 manages print jobs obtained under the control by the print controlling unit 308. Examples of print jobs are reprinting process and copying process selected by the user. Also, the print-job managing unit 311 manages print jobs by using a print-job management table not shown. FIG. 7 is a drawing of an example of print jobs managed by the print-job managing unit 311. As depicted in FIG. 7, in the print-job management table, a PID extracted from the detected marking, job information of the PID, a JID to which the PID belongs, and an EID group belonging to the JID are stored in association with each other. A procedure of obtaining a parent PID, job information, a JID, and others from the detected PID will be explained further below. Here, it is assumed that a storage location of the print-job management table is developed on a RAM not shown used by the MFP 300 as a working area.

Here, the image information is transmitted through a transmission path as explained below. First, an image input through the scanner or the network I/F 326 is transmitted to the image storage unit 302 based on an instruction from the print controlling unit 308. Also, upon an instruction from the print controlling unit 308, an image stored in the image storage unit 302 is transmitted to the printer engine 322 for printing. Furthermore, when image transfer is requested from an external apparatus, the image is transmitted by the transmitting and receiving unit 305 via the network I/F 326 to the external apparatus.

Also, on the MFP 350 side receiving image transfer, the image received by the transmitting and receiving unit 305 is transmitted to the image storage unit 302. Also, upon an instruction from the print controlling unit 308, an image stored in the image storage unit 302 is transferred to the printer engine 322 for printing.

In the following, a processing procedure is explained in which the MFP 300 prints markings and the MFP 350 performs reprinting.

A printing process by the MFP 300 configured as explained above according to the first embodiment is now explained. FIG. 8 is a flowchart of an entire flow of a printing process by the MFP 300 according to the first embodiment.

First, upon an input of an instruction for job start by the user through the operation panel 321 (Step S701), the print controlling unit 308 transmits an instruction for generating a JID to the ID managing unit 304 (Step S702). The ID managing unit 304 then newly generates a JID, and causes the JID to be stored in the ID storage unit 303 (Step S703).

Next, the print controlling unit 308 repeats an image accumulation process of reading an image by the scanner and storing the image in the image storage unit 302 as many as the number of input images (Steps S704 to S711).

Specifically, the print controlling unit 308 first transmits an instruction for generating an EID to the ID managing unit 304 (Step S704). The ID managing unit 304 then newly generates an EID, and then causes the EID to be stored in the ID storage unit 303 (Step S705).

Here, when a marking printing target is not a scanned image but an accommodated image, if the accommodated image has been previously printed, the ID managing unit 304 stores the PID generated at the time of previous printing in the ID storage unit 303 as a parent PID.

Next, the print controlling unit 308 instructs the image storage unit 302 to start accumulating images (Step S706). Here, at this time, the image storage unit 302 prepares for storing image data for one page. The print controlling unit 308 then instructs the scanner engine 325 to start input of images (Step S707). The scanner engine 325 receiving the instruction then starts transfer of the read images to the image storage unit 302 (Step S708).

If transfer has been completed, the image storage unit 302 reports the completion of image transfer to the scanner engine 325 (Step S709). Also, the scanner engine 325 reports the completion of image input to the print controlling unit 308 (Step S710). Furthermore, the print controlling unit 308 reports the completion of accumulation of image data for one page to the image storage unit 302 (Step S711).

When the image accumulation process ends, the print controlling unit 308 repeats an accumulated image printing process of printing the stored images as many as the number of copies specified for output and as many as the number of images specified for output (Steps S712 to S720).

Specifically, the print controlling unit 308 first transmits to the ID managing unit 304 an instruction for generating BIDs according to the number of copies to be printed (Step S712). The ID managing unit 304 then newly generates BIDs, and stores the BIDs in the ID storage unit 303 (Step S713).

The print controlling unit 308 then transmits an instruction for generating a PID to the ID managing unit 304 (Step S714). The ID managing unit 304 then newly generates a PID, and stores the PID in the ID storage unit 303 (Step S715).

The print controlling unit 308 then instructs the printer engine 322 to print the image (Step S716). This print instruction includes the EID of the image to be printed, the PID to be coded and combined with a printing sheet, and information for identifying the MFP 300.

The image obtaining unit 324 of the printer engine 322 then starts a process of reading the image associated with the print-instructed EID from the image storage unit 302 (Step S717). When reading the image from the image storage unit 302 ends (Step S718), the marking unit 323 generates a marking obtained by encoding the PID, and the printer engine 322 combines the generated marking with the print image for printing (Step S719).

Upon completion of printing, the completion of printing is reported from the printer engine 322 to the print controlling unit 308 (Step S720).

Also, upon completion of the accumulated-image printing process for all copies and images, the print controlling unit 308 causes an indication of the completion of the job to be displayed on the operation panel 321 via the display input controlling unit 310 (Step S721), thereby ending the printing process.

Next, a processing procedure is explained in which the MFP 350 performs reprinting process by using the images stored in the MFP 300. FIG. 9 is a flowchart of an entire flow of reprinting process by the MFPs 300 and 350 according to the first embodiment.

First, when reprinting process is specified by the user via the operation panel 321 or the like, the print controlling unit 308 instructs the detecting unit 309 to start detecting markings (Step S901). At this time, the user is only required to scan any one of printing sheets forming a desired copy for reprinting.

The detecting unit 309 receiving the instruction detects a plurality of markings in the read document images, decodes each detected marking, and detects PIDs, print time, and information for identifying the apparatus for each marking. The detecting unit 309 then reports the detected PIDs and others to the print controlling unit 308 (Step S902). Also, based on the information for identifying the apparatus, the print controlling unit 308 can specify the apparatus having the images accumulated therein. Here, in this processing procedure, it is assumed that the MFP 300 is specified.

Next, the print controlling unit 308 instructs the ID obtaining unit 307 to perform an image specifying process for specifying an image for reprinting (Step S903). This instruction includes all detected PIDs. With this, the ID obtaining unit 307 repeats processes at Step S904 to S910 explained below as many as the number of detected PIDs.

After the instruction for starting the image specifying process (Step S903), the ID obtaining unit 307 inquires of the ID managing unit 304 of the MFP 300 about BIDs associated with the detected PID via the transmitting and receiving unit 305 of the MFP 350 and the transmitting and receiving unit 305 of the MFP 300 (Step S904). Also, the apparatus for inquiry is determined based on the information for identifying the apparatus, such as an IP address included in the detected markings.

The ID managing unit 304 receiving the inquiry obtains from the ID storage unit 303 BIDs associated with the PID, a copy cancel flag, and print settings.

The ID managing unit 304 then reports to the ID obtaining unit 307 of the MFP 350 the BIDs, the copy cancel flag, and the print settings via the transmitting and receiving unit 305 of the MFP 300 and the transmitting and receiving unit 305 of the MFP 350 (Step S905).

The ID obtaining unit 307 then determines whether the received copy cancel flag is 1, that is, whether printing of the copy to which the PID belongs has been interrupted (Step S906). If the copy cancel flag is 1 ("Yes" at Step S906), the ID obtaining unit 307 inquires of the ID managing unit 304 of the MFP 300 about a BID associated with the parent PID of the PID (Step S907).

Specifically, the ID obtaining unit 307 first inquires of the ID managing unit 304 about the parent PID associated with the PID. Then, the ID obtaining unit 307 further inquires of the ID managing unit 304 about the BID associated with the reported parent PID.

Here, although not shown in the drawing, if the copy cancel flag is 1 but the parent PID cannot be obtained, reprinting cannot be performed based on a parent PID, and therefore the reprinting process ends. Also, as for the copy cancel flag obtained for the parent PID, it is further determined whether it is 1. If it is 1, a process of further searching for a parent PID is repeated.

When the BID for the parent PID is obtained (Step S907) or when it is determined at Step S906 that the copy cancel flag is not 1 ("No" at Step S906), the ID obtaining unit 307 inquires of the ID managing unit 304 of the MFP 300 about all EIDs belonging to the copy identified by the BID (Step S908).

The ID managing unit 304 then obtains from the ID storage unit 303 all EIDs associated with the BID, and reports a list of the obtained EIDs to the ID obtaining unit 307 (Step S909). The ID obtaining unit 307 receiving the report then reports to the print controlling unit 308 the print settings and BID obtained at Step S905 and the EID list reported at Step S909 (Step S910).

Next, the print controlling unit 308 performs an image transferring and storing process of transferring the image to be reprinted from the MFP 300 and storing the image in the image storage unit 302 (Steps S911 to S916).

Specifically, the print controlling unit 308 first instructs the image storage unit 302 to start image accumulation (Step S911). Next, the print controlling unit 308 reports a transfer request of the image to the image storage unit 302 of the MFP 300 via the transmitting and receiving unit 305 (Step S912).

The image storage unit 302 of the MFP 300 receiving the transfer request then starts image transfer (Step S913) and, upon completion of transfer (Step S914), reports transfer completion to the print controlling unit 308 of the MFP 350 (Step S915). The print controlling unit 308 receiving the report then reports completion of image accumulation to the image storage unit 302 (Step S916).

In this manner, after image data for reprinting is obtained from the MFP 300 and then stored in the image storage unit 302 in its own apparatus, an image reprinting process is performed on the stored image data.

Next, the print controlling unit 308 performs an image reprinting process on the image associated with the obtained EIDs (Steps S917 to S912). Here, in the image reprinting process, as with the printing process, a process of generating a PID of a sheet for reprinting and a BID for a copy for reprinting is performed, but is not shown in the drawing.

Furthermore, the print settings, such as specified number of copies, can be changed even at the time of reprinting. With reference to the changed number of copies, a BID at the time of reprinting is generated. With this, even when the number of copies required at the time of reprinting is different from that at the time of the previous printing, a required number of copies can be specified for printing.

Specifically, the print controlling unit 308 first instructs the printer engine 322 for reprinting (Step S917). This instruction includes an EID of the image to be printed and the generated PID.

Next, the image obtaining unit 324 of the printer engine 322 starts a process of reading the image associated with the specified EID from the image storage unit 302 (Step S918). Upon completion of image reading from the image storage unit 302 (Step S919), the marking unit 323 generates a marking obtained by coding the PID, and the printer engine 322 causes the generated marking to be printed as being combined with the print image (Step S920).

Upon completion of reprinting, the completion of reprinting is reported from the printer engine 322 to the print controlling unit 308 (Step S921).

Here, in the procedure explained above, the reprinting process for each copy (BID) unit has been explained. Alternatively, the reprinting process may be performed for each print job (JID) unit. In this case, only the difference is that the process is performed by using a JID instead of a BID, and therefore this process is not explained herein.

According to the MFPs 300 and 350 according to the present embodiment, printing can be made from an arbitrary one of the marking-printed sheets, with all images included in the print unit to which the sheets belong being identified. Therefore, reprinting process by using markings can be efficiently performed. Also, from a sheet added with a plurality of markings, printing for a print unit that has been set for each mark can be made. Therefore, reprinting can be made for a plurality of print units with one reading process. Thus, reprinting can be efficiently made, and a working load on the user can be reduced.

An MFP according to a second embodiment of the present invention performs reprinting process from the latest marking when a document sheet is provided with a plurality of markings.

Figure 10:
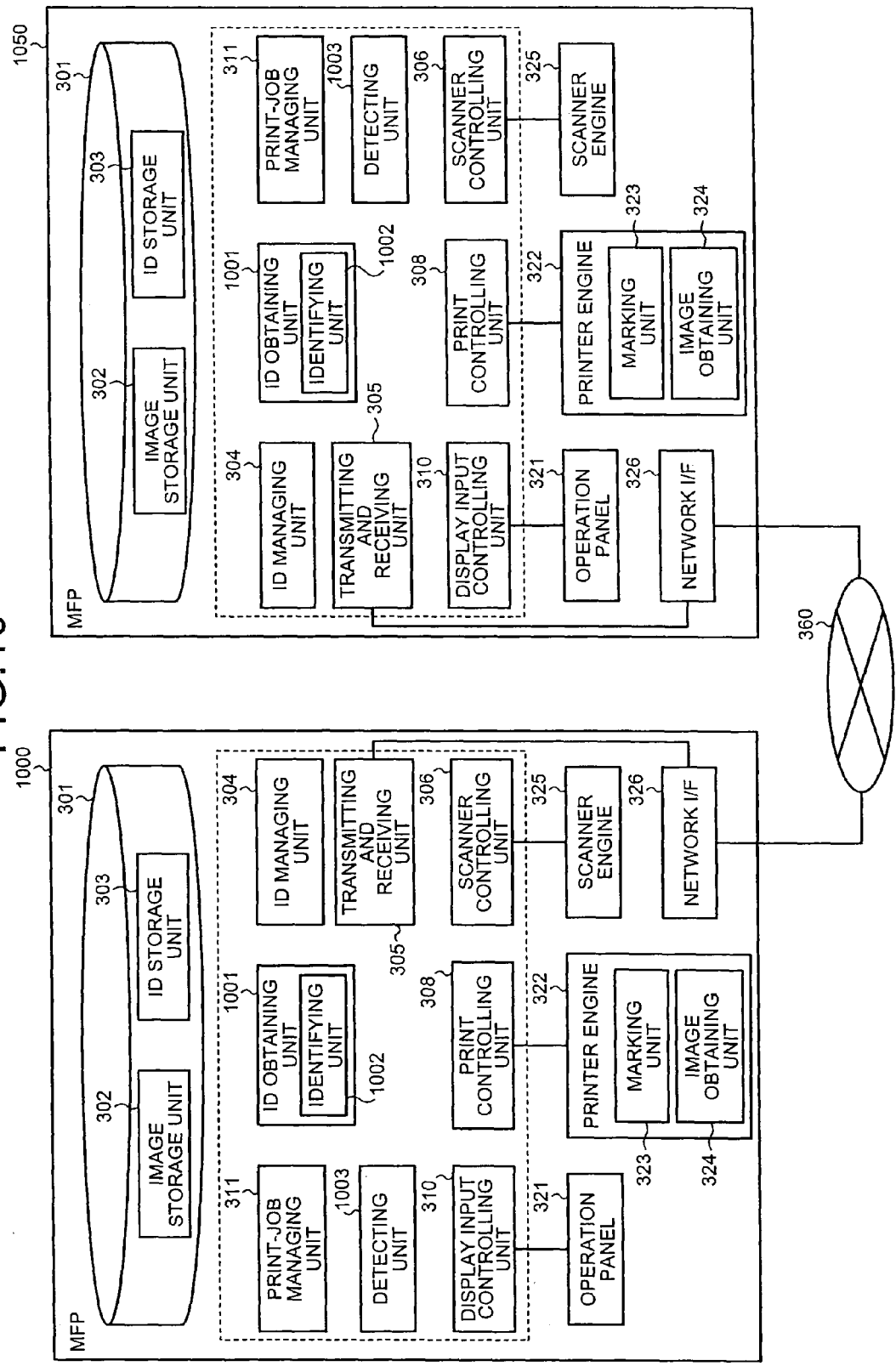
FIG. 10 is a block diagram of the configuration of each MFP according to a second embodiment of the present invention.

FIG. 10 is a block diagram of the configuration of an MFP 1000 and an MFP 1050 according to the second embodiment. These MFPs are different from the MFPs 300 and 350 according to the first embodiment in that the ID obtaining unit 307 is changed to an ID obtaining unit 1001 that performs a different process. In the following explanation, components identical to those in the first embodiment are provided with the same reference numerals, and are not explained.

It is also assumed that markings added to document sheets according to the second embodiment include not only the PID and the information for identifying the apparatus but also a print time when printing with the markings was performed.

A detecting unit 1003 detects markings in the document images read by the scanner engine 325, and decodes the detected markings, thereby detecting the PID of the document, the information for identifying the apparatus, and the print time. Other processes performed by the detecting unit 1003 are similar to those by the detecting unit 309, and therefore are not explained herein.

The ID obtaining unit 1001 includes an identifying unit 1002 for identifying an image to be reprinted.

When the detecting unit 1003 detects the PIDs of the document, the information for identifying the apparatus, and the print times in the markings, the identifying unit 1002 specifies the latest print time from among the detected print times, and also identifies a PID associated with the specified print time.

The ID obtaining unit 1001 then inquires of the ID managing unit 304 about the PID identified by the identifying unit 1002 and a BID (JID) associated in the ID storage unit 303 for obtainment. Next, the ID obtaining unit 1001 inquires of the ID managing unit 304 about all EIDs associated with the obtained BID (JID) for obtainment. Also, the ID obtaining unit 1001 inquires of the ID managing unit 304 about the print settings associated with the obtained BID (JID) for obtainment. Next, a reprinting process according to the present embodiment is explained.

First, as depicted in FIG. 1, it is assumed that, in the MFP 1000, the document A formed of three sheets is printed by the user and the printed sheets have marked with PID=a1, PID=a2, and PID=a3, respectively.

Figure 11:
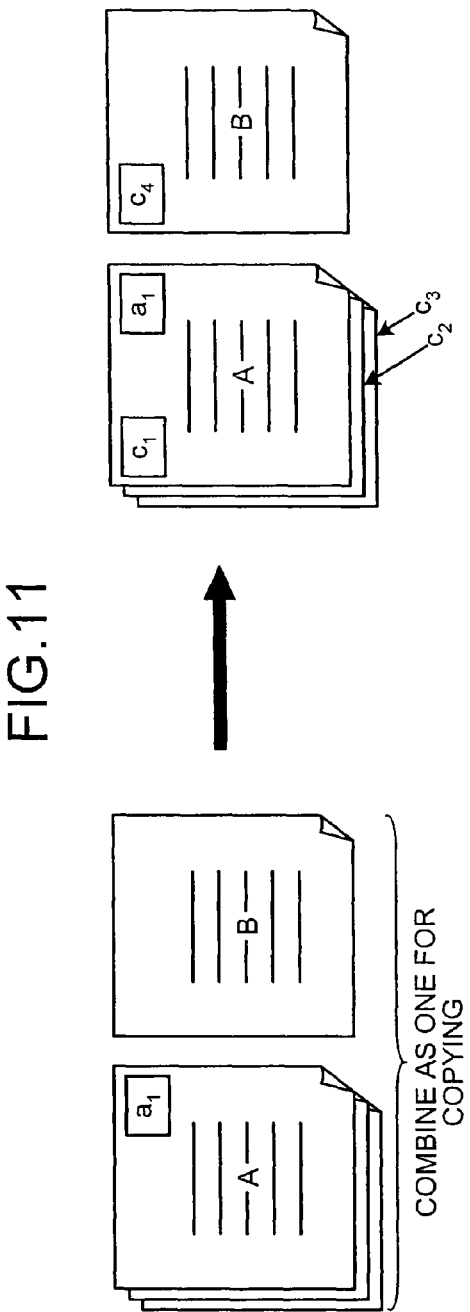
FIG. 11 is a schematic drawing of an example in which a document A and a document B are collectively copied in the MFP according to the second embodiment.

Next, the user uses the MFP 1000 to perform collectively copying process of the marked document A and a document B formed of one sheet. FIG. 11 is a schematic drawing of an example in which the document A and the document B are collectively copied in the MFP 1000 according to the second embodiment. Since this process is not a reprinting process by the MFP 1050 but copying, as depicted in FIG. 11, the sheets are newly marked with PID=c1 to PID=c4, respectively, in association with this copying process. Also, since this copying process is not a reprinting process using the markings of PID=a1 to PID=a3, these markings of PID=a1 to PID=a3 are left on the sheets as they are. With this, each sheet of the document A has a plurality of markings.

Figure 12:
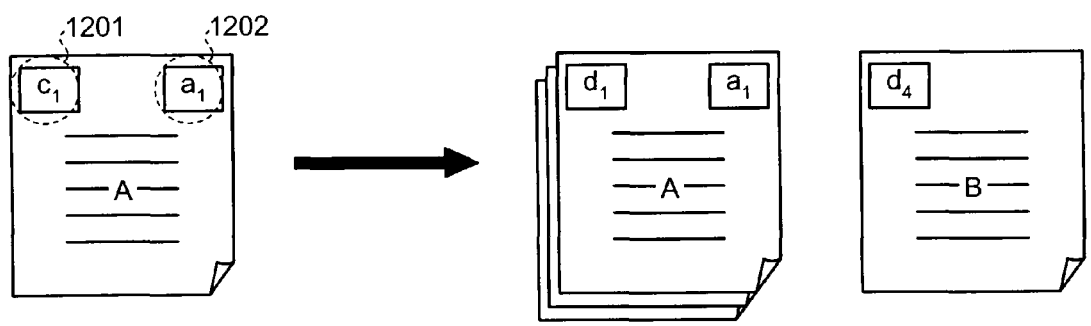
FIG. 12 is a schematic drawing of an example in which a sheet marked with PID=a1 and PID=c1 is reprinted in the MFP according to the second embodiment.

Then, by using the sheet with the marking of PID=a1 and the marking of PID=c1, the user instructs the MFP 1050 for reprinting. FIG. 12 is a schematic drawing of an example in which the sheet with a marking 1202 of PID=a1 and a marking 1201 of PID=c1 are reprinted in the MFP 1050 according to the second embodiment. The MFP 1050 according to the present embodiment performs reprinting by using the marking with the latest print time when the sheet has a plurality of markings. Therefore, the marking 1202 of PID=a1 is not used for reprinting, but the marking 1201 of PID=c1 is used for reprinting. With this, the MFP 1050 collectively outputs the document A and the document B. At this time, markings of PID=d1 to PID=d4 are provided.

Here, the printing process according to the present embodiment is similar to that according to the first embodiment, and therefore is not explained herein.

Figure 13B:
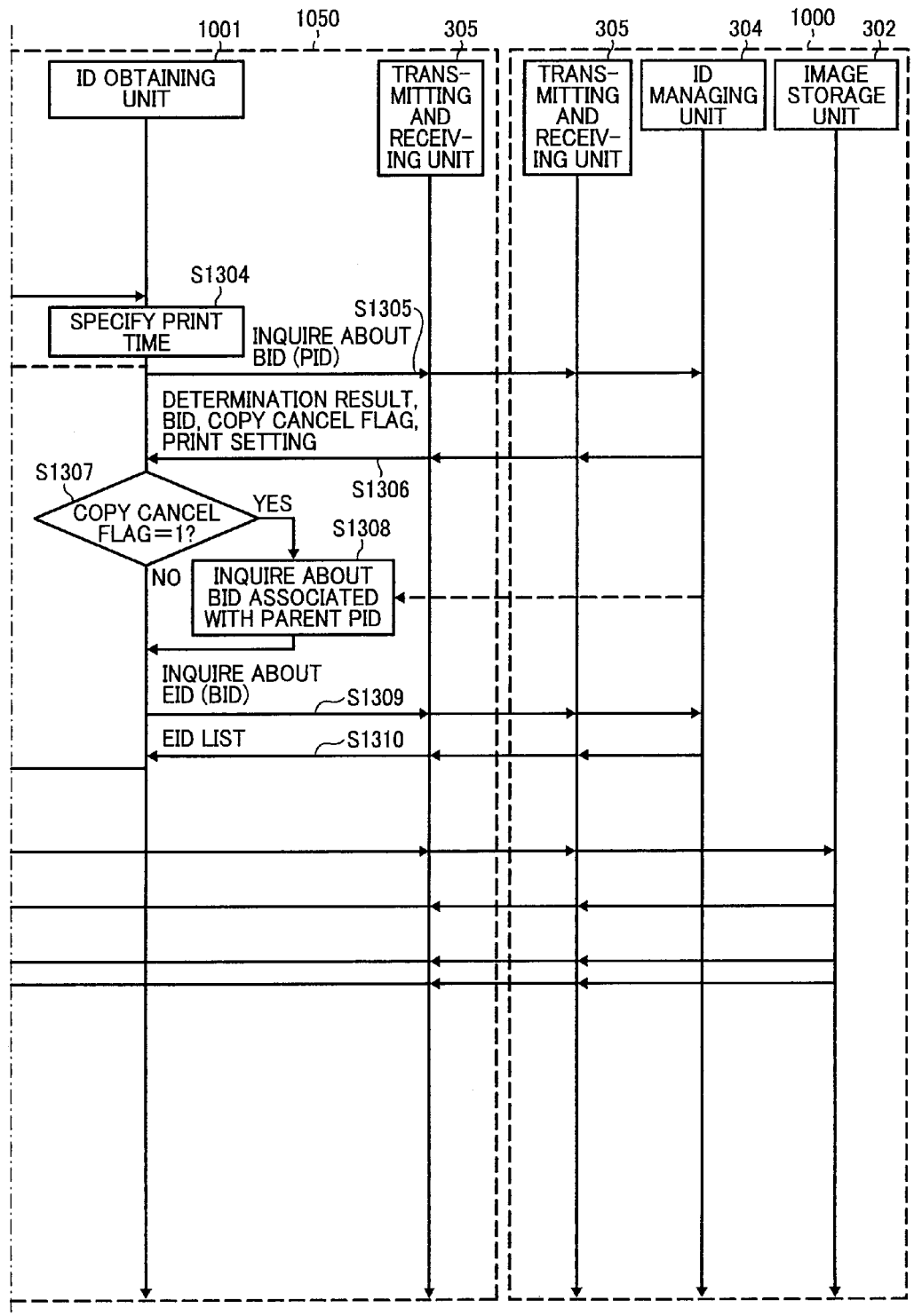

Next, a reprinting process by the MFP 1050 according to the second embodiment is explained. FIG. 13 is a flowchart of an entire flow of a reprinting process by the MFP 1050 according to the second embodiment.

First, when a reprinting process is specified by the user via the operation panel 321 or the like, the print controlling unit 308 instructs the detecting unit 1003 to start detecting markings (Step S1301).

The detecting unit 1003 receiving the instruction then detects a plurality of markings in the read document images, decodes each detected marking, and detects the PID, print time, and information for identifying the apparatus for each marking. Then, the detecting unit 1003 reports the detected PIDs to the print controlling unit 308 (Step S1302).

Next, the print controlling unit 308 instructs the ID obtaining unit 1001 to perform an image specifying process of specifying an image to be reprinted (Step S1303). This instruction includes all detected PIDs and print times in association with each other.

The identifying unit 1002 included in the ID obtaining unit 1001 then compares the print times included in the instruction to specify the latest print time. The identifying unit 1002 then specifies a PID associated with this specified latest print time as a reprinting target (Step S1304). The ID obtaining unit 1001 then repeats the processes at Steps S1305 to S1311 as many as the number of PIDs associated with the latest print time. An example of Step S1304 is explained below.

FIG. 14 is a drawing of the detected PIDs and print times transmitted to the ID obtaining unit 1001. As depicted in FIG. 14, a print time of PID=a1 is "2004/02/14/11:02:02.330", whilst a print time of PID=c1 is "2004/02/24/17:59:99.999". In this case, the identifying unit 1002 compares these print times, and identifies PID=c1 as the latest PID. With this, the ID obtaining unit 1001 performs Steps S1305 to S1311 on PID=c1.

Furthermore, the image specifying process, image accumulating process, and reprinting process from Steps S1305 to S1322 are similar to those from Steps S904 to S921 in the MFP 300 according to the first embodiment, and therefore are not explained herein.

According to the present embodiment, when a plurality of markings are present in a document sheet, reprinting is performed from the sheet marked with the latest print time. Therefore, the process according to the last instruction specified by the user is performed, thereby performing a reprinting process according to the user's request. With this, a working load on the user can be reduced, and the reprinting process can be efficiently performed.

Here, in the present embodiment, the example has been explained in which the print time is included in the markings. However, including the print time in the markings is not meant to be restrictive. As a modification example of the second embodiment, an example is explained below in which the print times are managed by an MFP 2400.

In the present modification example, the print times are held in association with the PID and others in a print-job management table of the MFP. The MFP scanning the document sheet extracts a PID from each of the markings added to the document sheets, and then transmits the extracted plurality of PIDs to the MFP printing the document sheets. With this, from the MFP printing the document sheets, the print times associated with the respective PIDs can be obtained. With this, the MFP performing scanning can specify the latest marking, and therefore can perform reprinting process from the latest marking.

An MFP according to a third embodiment of the present invention partially performs reprinting process when a plurality of markings are added to document sheets and a print job has the same PIDs detected from these markings.

Figure 15:
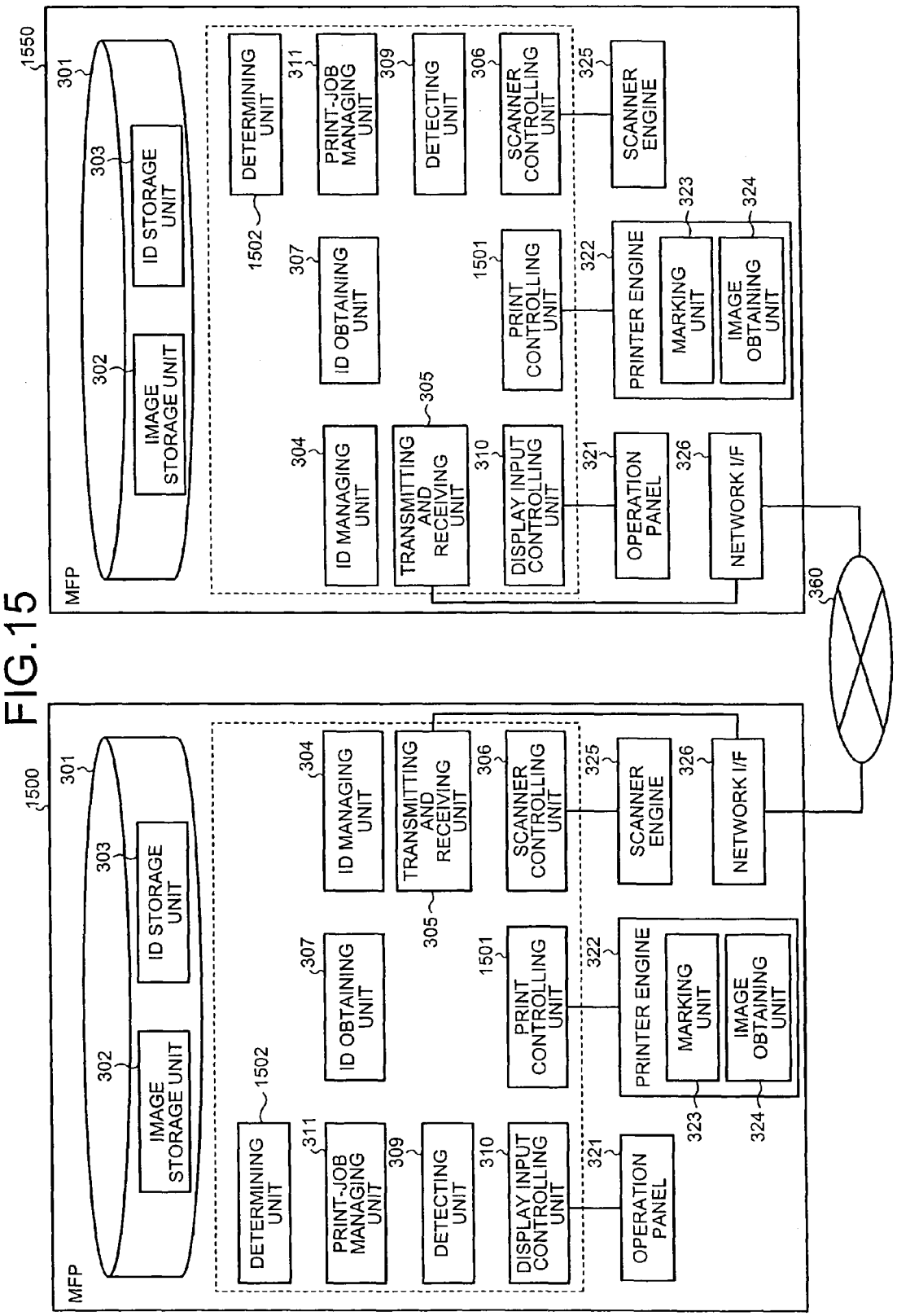
FIG. 15 is a block diagram of the configuration of each MFP according to a third embodiment of the present invention.

FIG. 15 is a block diagram of the configuration of an MFP 1500 and an MFP 1550 according to the third embodiment. These MFPs are different from the MFPs 300 and 350 according to the first embodiment in that the print controlling unit 308 is changed to a print controlling unit 1501 that performs a different process, and also a determining unit 1502 is added. In the following explanation, components identical to those in the first embodiment are provided with the same reference numerals, and are not explained herein.

It is also assumed that markings added to document sheets according to the present embodiment include only the PID and the information for identifying the apparatus, as in the first embodiment.

The print controlling unit 1501 is different from the print controlling unit 308 according to the first embodiment in that the ID obtaining unit 307 outputs information for identifying the print units (for example, unit IDs and job IDs) obtained by the ID obtaining unit 307 to the determining unit 1502. Here, other processes performed by the print controlling unit 1501 are similar to those performed by the print controlling unit 308, and therefore are not explained herein.

When a plurality of PIDs are detected, the determining unit 1502 determines whether the print units (copies or jobs) associated with these detected PIDs are identical to each other. If determining that the print units are identical, the determining unit 1502 instructs the print controlling unit 1501 to reprint only one copy for these print units. With this, a plurality of number of reprinting processes for the same print unit are prevented. Next, a reprinting process performed by the MFP 1550 according to the present embodiment is explained in detail below.

First, as depicted in FIG. 1, it is assumed that, in the MFP 1500, the document A formed of three sheets is printed by the user and the printed sheets have marked with PID=a1, PID=a2, and PID=a3, respectively.

Figure 16:
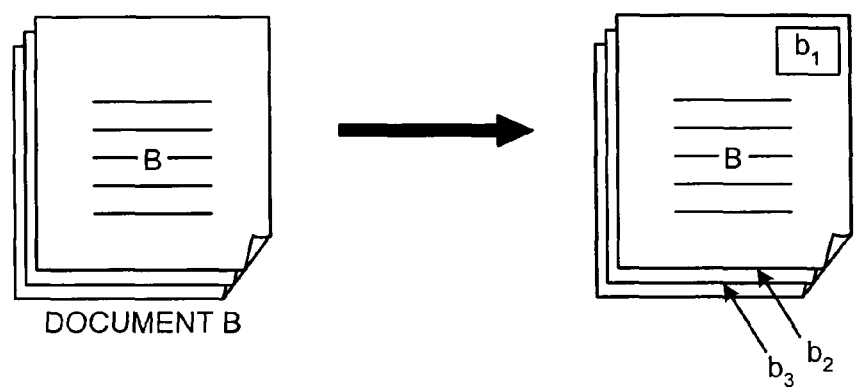
FIG. 16 is a schematic drawing of an example in which a document B is printed in the MFP according to the third embodiment.

Next, it is assumed that, in the MFP 1500, the user prints a document B formed of three sheets and the printed sheets have marked with PID=b1, PID=b2, and PID=b3, respectively. FIG. 16 is a schematic drawing of an example in which the document B is printed in the MFP 1500 according to the third embodiment. As depicted in FIG. 16, the MFP 1500 outputs sheets with PID=b1 to PID=b3 added thereto in the printing of the document B.

Figure 17:
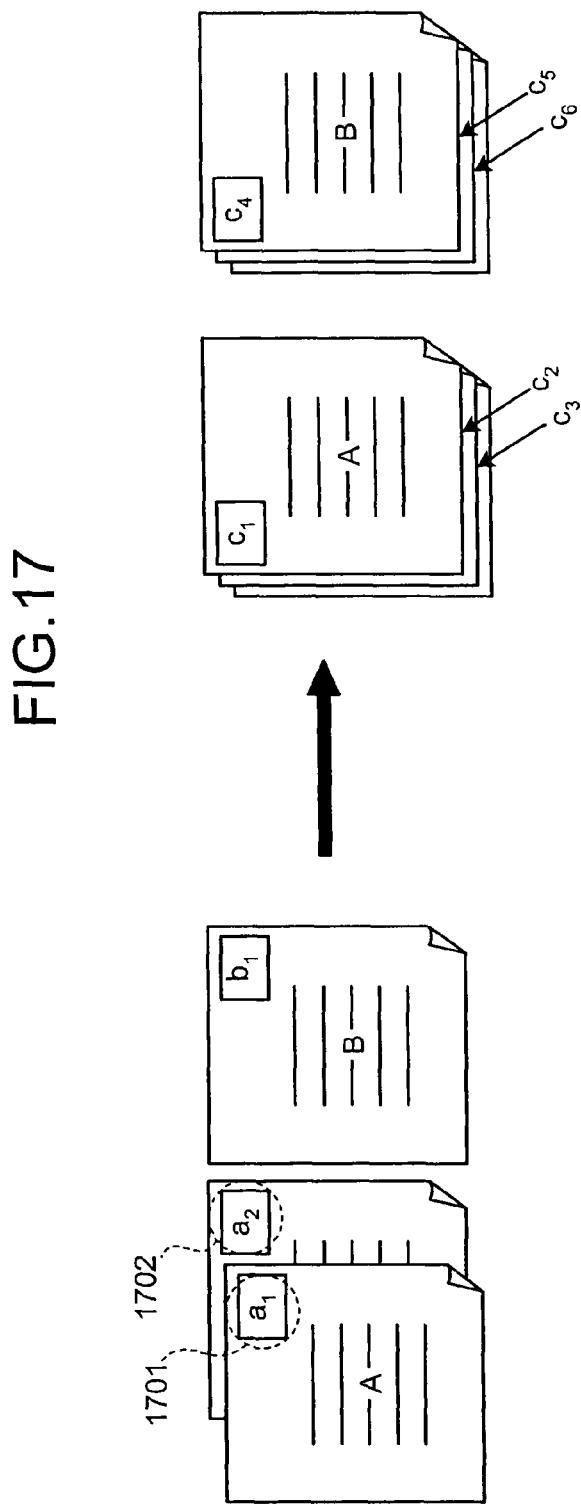
FIG. 17 is a schematic drawing of an example in which PID=a1 and PID=a2 of a document A and PID=b1 of a document B are reprinted in the MFP according to the third embodiment.

The user then puts the document formed of PID=a1, PID=a2, and PID=a3 on a contact glass not shown of the MFP 1550 to request reprinting process. FIG. 17 is a schematic drawing of an example in which PID=a1 and PID=a2 of the document A and PID=b1 of the document B are reprinted in the MFP 1550. In the example depicted in FIG. 17, the detecting unit 309 detects PID=a1 (marking 1701), PID=a2 (marking 1702), and b1. Also, as depicted in FIG. 1, PID=a1 and PID=a2 have been printed as the same print job. Therefore, when PID=a1 and PID=a2 are detected, they are determined by the determining unit 1502 as the same print job, and therefore only either one of them is reprinted. With this, the MFP 1550 prints only one copy of the document A and also one copy of the document B.

Figure 18B:
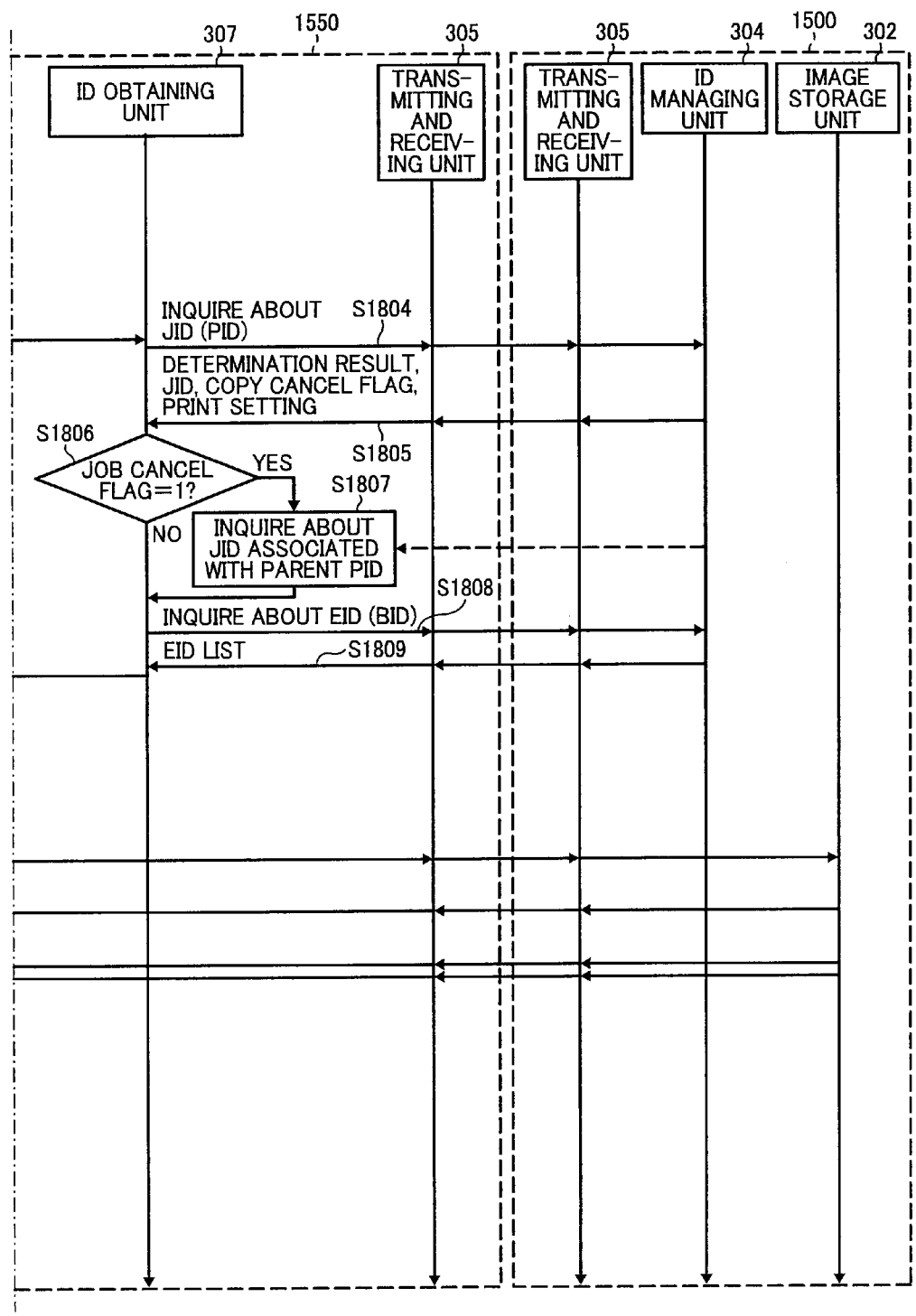

Next, a reprinting process by the MFPs 1500 and 1550 according to the third embodiment is explained. FIG. 18 is a flowchart of an entire flow of a reprinting process by the MFPs 1500 and 1550 according to the third embodiment.

First, an image specifying process from at Steps S1801 to S1810 is approximately similar to that at Steps S901 to S910 in the MFP 300 according to the first embodiment, and therefore is not explained herein. The process is different in that reprinting is performed not for each copy unit but for each print-job unit, and therefore a JID is used instead of a BID.

The print controlling unit 1501 causes the reported JIDs, the EIDs associated with the JIDs, and others to be stored in the print-job managing unit 311. The print controlling unit 1501 then requests the determining unit 1502 to inquire whether the JIDs stored in the print-job managing unit 311 are redundant (Step S1811). The determining unit 1502 then determines whether the JIDs stored in the print-job managing unit 311 is redundant (Step S1812).

FIG. 19 is a drawing of an example of print jobs held by the print-job managing unit 311 after Step S1813 of FIG. 18 ends. As depicted in FIG. 19, the print controlling unit 1501 holds, as a print job for each PID, job information of the PID, a JID, and an EID group belonging to the JID in association with each other. Here, it can be found that a job ID=Ja associated with PID=a1 and a job ID=Ja associated with PID=a2 match each other.

When such redundant JIDs are found, the determining unit 1502 leaves only one of them and causes the others to be deleted. Also, the determining unit 1502 causes the EIDs associated with the deleted JIDs to be deleted.

The determining unit 1502 then outputs the result after the process to the print controlling unit 1501 (Step S1813). With this, the print controlling unit 1501 uses the EIDs associated with the non-redundant JID to perform an image accumulating process and a reprinting process.

The image accumulating process and reprinting process at Step S1814 to S1824 are similar to those at Steps S901 to S910 in the MFP 300 according to the first embodiment, and therefore are not explained herein.

According to the present embodiment, when the document sheets included in the same printing job are scanned, only part of them is printed. Therefore, user's inadvertent printing of a plurality of copies can be prevented. With this, convenience can be increased.

An MFP according to a fourth embodiment of the present invention does not perform reprinting process for print jobs with the same PIDs detected in a plurality of markings on document sheets.

Figure 20:
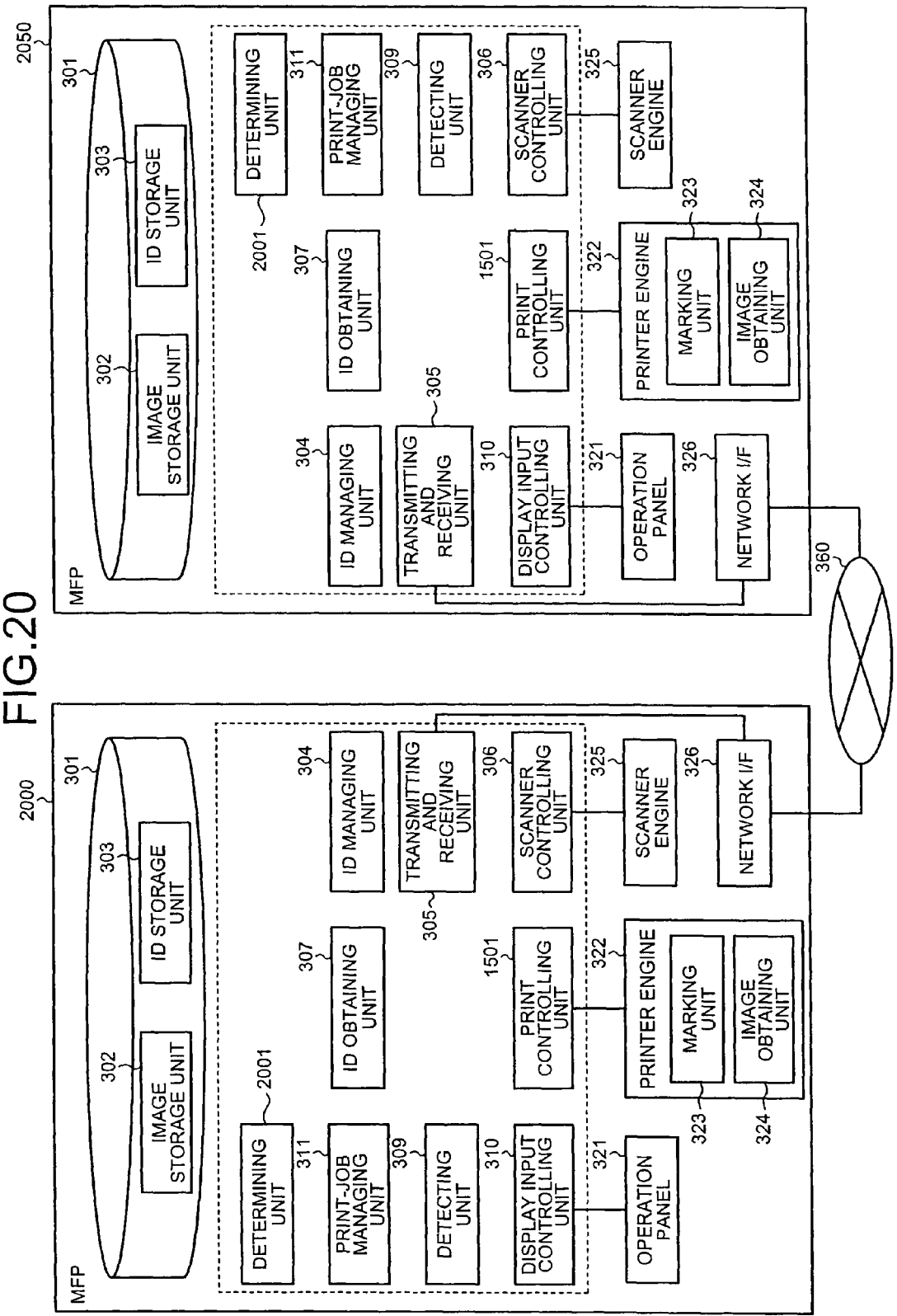
FIG. 20 is a block diagram of the configuration of each MFP according to a fourth embodiment of the present invention.

FIG. 20 is a block diagram of the configuration of an MFP 2000 and an MFP 2050 according to the fourth embodiment. These MFPs are different from the MFPs 1500 and 1550 according to the third embodiment in that the determining unit 1502 is changed to a determining unit 2001 that performs a different process. In the following explanation, components identical to those in the third embodiment are provided with the same reference numerals, and are not explained herein.

It is also assumed that markings added to document sheets according to the present embodiment include only the PID and the information for identifying the apparatus, as in the third embodiment.

When a plurality of PIDs are detected, the determining unit 2001 determines whether the print units (copies or jobs) associated with these detected PIDs are identical to each other. If determining that the print units are identical, the determining unit 2001 instructs the print controlling unit 1501 not to reprint these print units. Next, a reprinting process performed by the MFP 2000 according to the present embodiment is explained.

First, as depicted in FIG. 1, it is assumed that, in the MFP 2000, the document A formed of three sheets is printed by the user and the printed sheets have marked with PID=a1, PID=a2, and PID=a3, respectively.

Next, it is assumed as depicted in FIG. 16 that, in the MFP 2000, the user prints the document B formed of three sheets and the printed sheets have marked with PID=b1, PID=b2, and PID=b3, respectively.

Then, in the MFP 2000, the user performs copying process on two sheets, that is, the sheet with PID=a1 of the document A and the sheet with PID=b1 of the document B. FIG. 21 is a schematic drawing of an example in which a sheet of the document A and a sheet of the document B are collectively copied in the MFP 2000 according to the fourth embodiment. As depicted in FIG. 21, markings of PID=c1 and PID=c2 are newly added to these sheets. Since this copying process is not a reprinting process using the markings of PID=a1 and PID=b1, these markings of PID=a1 and PID=b1 are left on the sheets as they are. With this, each sheet of the document A has a plurality of markings.

Figure 22:
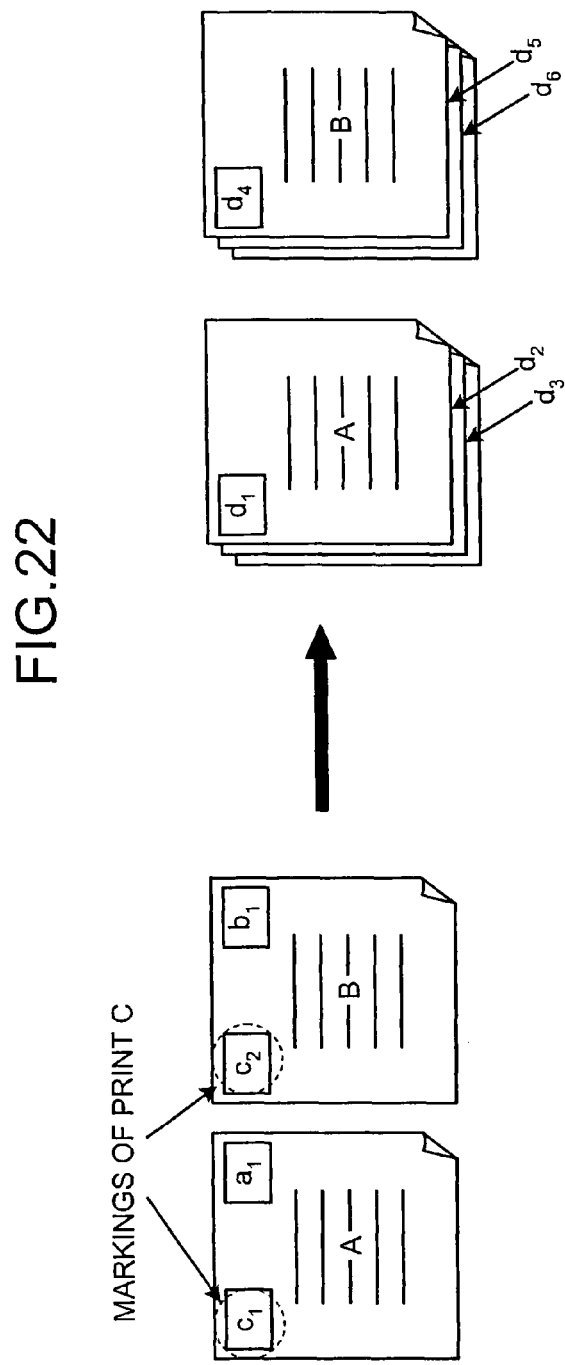
FIG. 22 is a schematic drawing of an example in which a reprinting process is performed after one sheet of the document A and one sheet of the document B are copied in the MFP according to the fourth embodiment.

Then, in the MFP 2050, the user request a reprinting process for these two sheets subjected to the copying process. FIG. 22 is a schematic drawing of an example in which a reprinting process is performed after a sheet of the document A and a sheet of the document B are collectively copied in the MFP 2050 according to the fourth embodiment. As depicted in FIG. 22, the MFP 2050 detects PID=c1, PID=c2, PID=a1, and PID=a2. Since PID=c1 and PID=c2 are in the same print job, they are not reprinted, and only reprinting process is performed by using PID=a1 and PID=b1.

That is, the user has recognized that, if the user knows that these two sheets are of a copied set, these two sheets do not have to be put when a reprinting process for the print job is requested. Therefore, from the fact that the user nevertheless puts these two sheets for reprinting, it can be determined that the user requests not a print job associated with PID=c1 and PID=c2 but a print job associated with PID=a1 and PID=b1. Thus, in the present embodiment, when a plurality of PIDs included in the same print job are detected, the MFP 2050 does not perform a reprinting process.

The process flow in the present embodiment is similar to the process flow depicted in FIG. 18 except the process at Step S1812, and therefore is not explained herein.

The process at Step S1812 of FIG. 18 performed by the MFP 2050 according to the present embodiment is explained. At Step S1812, the determining unit 2001 determines whether any JIDs are redundant in the print jobs managed by the print-job managing unit 311. If determining that the any JIDs are redundant, the determining unit 2001 causes such JIDs to be deleted.

FIG. 23 is a drawing of an example of a print job held by the print-job managing unit 311 according to the fourth embodiment after Step S1811 ends. As depicted in FIG. 23, the print controlling unit 1501 holds, as a print job for each PID, job information of the PID, a JID, and an EID group belonging to the JID in association with each other. Here, it can be found that a job ID=Jc associated with PID=c1 (marking 2301) and a job ID=Jc associated with PID=c2 (marking 2302) match each other.

When such redundant JIDs are found, the determining unit 1502 deletes all JIDs. Also, the determining unit 1502 causes the EIDs associated with the deleted JIDs to be deleted.

With this, when a plurality of PIDs included in the same print job are detected, a reprinting process can be prevented.

According to the present embodiment, when the document sheets included in the same printing job are scanned, reprinting is not performed for the same print job, and only the image data included in the other jobs can be reprinted. With this, user convenience can be increased.

According to the first to fourth embodiments, anyone who is a user having the marked sheets can reproduce a job. Therefore, there is a possibility that a user obtaining the sheets through an unauthorized way, for example, may reproduce a job against the job executor's intention and leak information.

To get around this problem, in an MFP according to a fifth embodiment of the present invention, information about the job executor (job owner) and information about a reprinting-allowed user are managed for each job, thereby managing the authority of reprinting and allowing printing only by a user having the authority.

Figure 24:
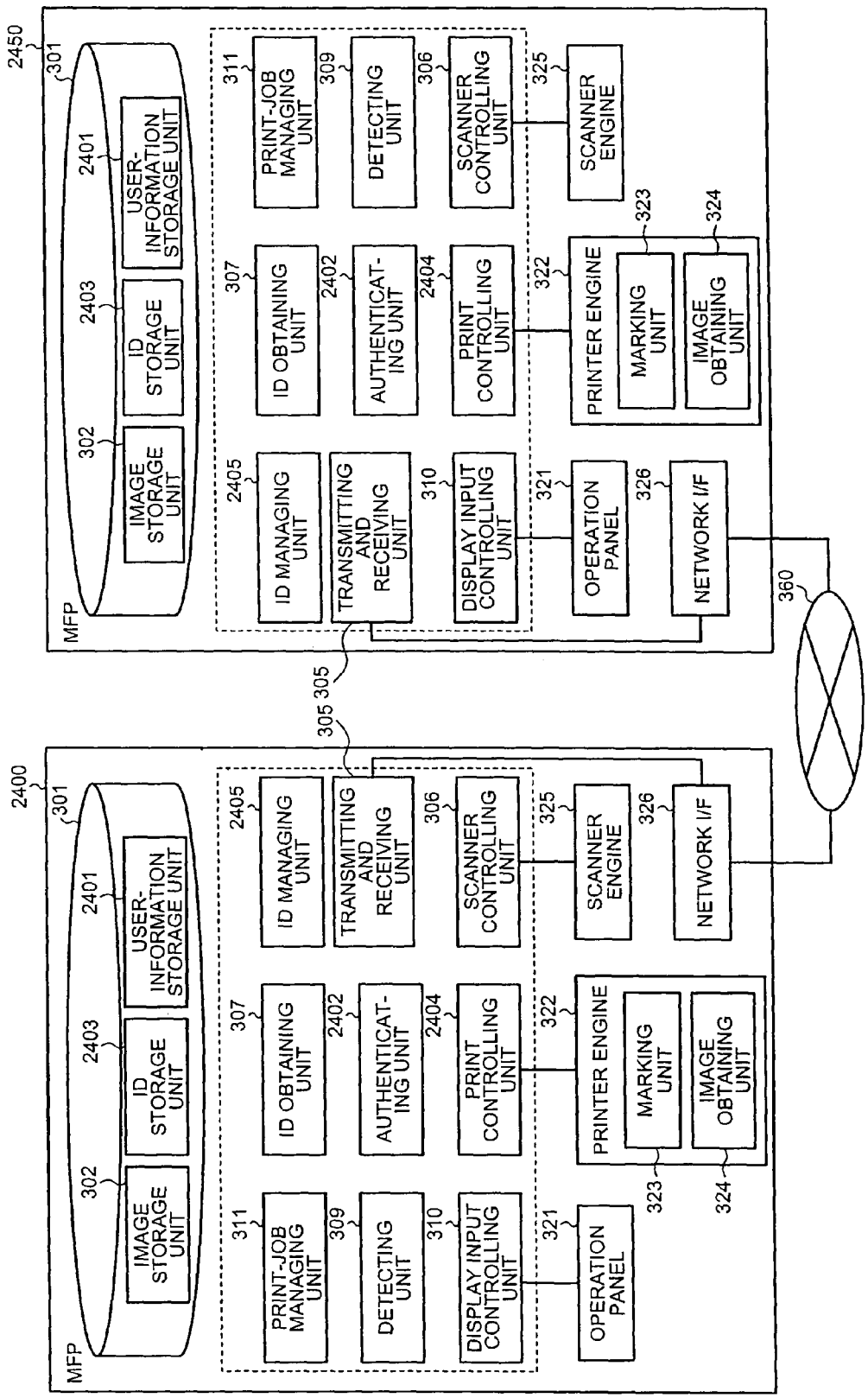
FIG. 24 is a block diagram of the configuration of each MFP according to a fifth embodiment of the present invention.

FIG. 24 is a block diagram of the configuration of the MFP 2400 and an MFP 2450 according to the fifth embodiment. These MFPs are different from the MFPs 300 and 350 according to the first embodiment in that the print controlling unit 308 is changed to a print controlling unit 2404 that performs a different process, the ID managing unit 304 is changed to an ID managing unit 2405 that performs a different process, the ID storage unit 303 is changed to an ID storage unit 2403 that has a different data structure, and a user-information storage unit 2401 and an authenticating unit 2402 are added. In the following explanation, components identical to those in the first embodiment are provided with the same reference numerals, and are not explained.

The user-information storage unit 2401 stores a user-information management table in which information about users required for authentication is stored. FIG. 25 is a drawing for explaining an example of a data structure of the user-information management table. As depicted in the drawing, the user-information management table has stored therein a user ID that uniquely identifies a user and a password in association with each other.

Here, the user-information management table may be managed by a user-information management server (not shown) on the network 360, and the user information may be obtained via the network 360.

The ID storage unit 2403 is different from the ID storage unit 303 according to the first embodiment in that information about a job owner and a user who is allowed to reprint (access-allowed user) is added to the ID information. FIG. 26 is a drawing for explaining an example of a data structure of ID information stored in the ID storage unit 2403 according to the fifth embodiment.

As depicted in the drawing, the ID information according to the fifth embodiment stores a PID, an EID, a parent PID, a BID, a copy cancel flag, a JID, a job cancel flag, and print settings, as well as a user ID of the job owner and user IDs of access-allowed users, in association with each other.

The authenticating unit 2402 authenticates the user by determining whether the input user ID and password match the user information of the user-information storage unit 2401, and allows the use of the apparatus only for the authenticated users. That is, when user information not registered in the user-information management table is input, the authenticating unit 2402 rejects this input, and the insertion of a job to the apparatus is prohibited.

Here, the authentication method by the authenticating unit 2402 is not restricted to the one using a user ID and a password. Any method conventionally used can be used, such as a method using biometrics with fingerprints, for example. Here, the user-information storage unit 2401 has stored therein information required for the authentication method in use instead of a password and the like.

The print controlling unit 2404 has, in addition to the function of the print controlling unit 308 according to the first embodiment, a function of storing information about the user authenticated by using the ID managing unit 2405 in the ID storage unit 2403.

Furthermore, the print controlling unit 2404 before image reprinting has a function of requesting another MFP connected to the network 360 to transfer image data to be reprinted and controlling the process of storing the image data in its own image storage unit 302.

Figure 27:
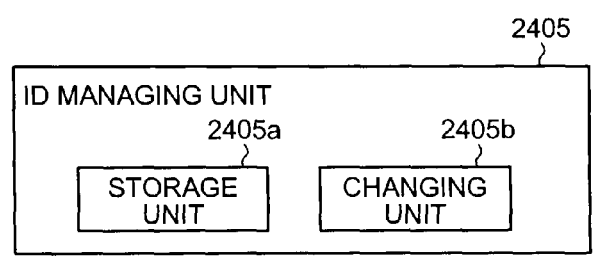
FIG. 27 is a block diagram of a detailed structure of an ID managing unit of the MFP according to the fifth embodiment.

The ID managing unit 2405 has, in addition to the function of the ID managing unit 304 according to the first embodiment, a function of managing an access right at the time of print reproducing, a function of storing user information, and a function of changing the stored user information. FIG. 27 is a block diagram of a detailed structure of the ID managing unit 2405 according to the fifth embodiment.

As depicted in the drawing, the ID managing unit 2405 includes a storage unit 2405a and a changing unit 2405b. The storage unit 2405a stores, according to an instruction from the print controlling unit 2404, the user ID of the job owner and user ID of reprint-allowed users specified before job execution in the ID storage unit 2403.

The changing unit 2405b changes an access-allowed user stored in the ID storage unit 2403.

Figure 28B:
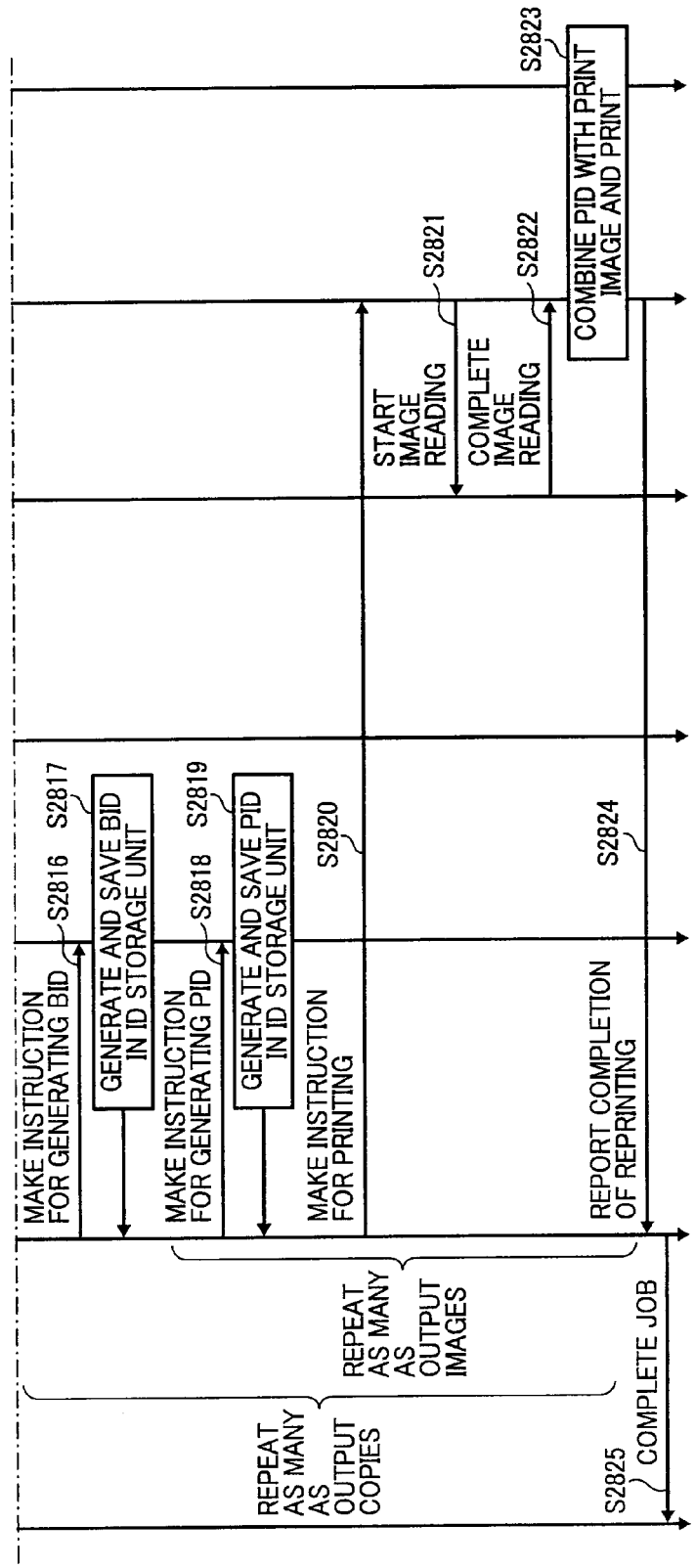

Next, a printing process by the MFP 2400 configured as explained above according to the fifth embodiment is explained. FIG. 28 is a flowchart of an entire flow of a printing process in the MFP 2400 according to the fifth embodiment.

First, when a user ID and a password are input through a login screen of the operation panel 321 for a login operation (Step S2801), an authentication process is performed by the authenticating unit 2402, and the authentication result is reported (Step S2802).

Figure 29:
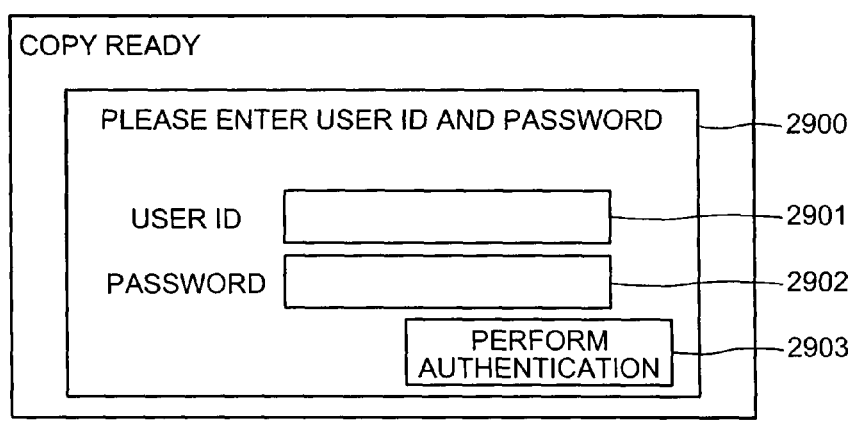
FIG. 29 is a drawing for explaining an example of the structure of a login screen.

FIG. 29 is a drawing for explaining an example of the structure of the login screen. As depicted in the drawing, a login screen 2900 has displayed thereon a user ID input field 2901 for inputting a user ID, a password input field 2902 for inputting a password, and an authentication execution button 2903 for executing authentication.

Upon successful authentication, the display input controlling unit 310 accepts specification of an access-allowed user with, for example, a setting screen for specifying a reprint-allowed user (not shown), through the operation panel 321 (Step S2803). For example, user IDs of the users stored in the user-information management table are displayed on the setting screen to be selectable, and a selected user is accepted as an access-allowed user. Here, it is assumed that such an access-allowed user can be specified only by the job owner.

Next, the print controlling unit 2404 uses the ID managing unit 2405 to store the job owner, who is the authenticated user, and the specified access-allowed user in the ID storage unit 2403 (Step S2804).

With this, by referring to the ID storage unit 2403, it is possible to perform control such that only the job owner or the access-allowed user is allowed to reprint.

An ID generation process, an image accumulation process, and an accumulated image printing process from Steps S2805 to S2825 are similar to those from Steps S701 to S721 in FIG. 8 according to the first embodiment, and therefore are not explained herein.

Next, a reprinting process by the MFPs 2400 and 2450 according to the fifth embodiment is explained. FIG. 30 is a flowchart of an entire flow of a reprinting process in these MFPs 2400 and 2450 according to the fifth embodiment.

A marking detecting process and a process of making an instruction for starting specifying an image are similar to those from Steps S901 to S904 in the MFP 350 according to the first embodiment, and therefore are not explained herein.

However, the inquiry at Step S3004 further includes the user ID of a user who has logged in and specified reprinting.

The ID managing unit 2405 receiving the inquiry obtains from the ID storage unit 2403 the user IDs of the job owner and the access-allowed users in addition to the BID associated with the PID, the copy cancel flag, and the print settings. Then, by comparing the user ID in the inquiry and the obtained user ID, it is determined whether the user specifying reprinting has an access right to the relevant job (Step S3005).

The ID managing unit 2405 then reports to the ID obtaining unit 307 the determination result regarding an access right, the BID, the copy cancel flag, and the print settings through the transmitting and receiving unit 305 of the MFP 2400 and the transmitting and receiving unit 305 of the MFP 2450 (Step S3006). The MFP 2450 then performs the following process only for the BID determined as having an access right in the determination result regarding an access right.

A copy-cancel-flag determination process, an EID inquiring and reporting process, and an image transfer and storing process from Steps S3007 to S3021 are similar to those from Steps S906 to S921 in the MFP 350 according to the first embodiment, and therefore are not explained herein.

Here, in the case of a reprinting job, the user ID of the user executing reprinting is not stored in the ID storage unit 2403 as a job owner, but the job owner of the original job to be reprinted is copied and set as the job owner of the reprinting job.

Similarly, also as to access-allowed users, the access-allowed users managed in the job to be reprinted are copied and recorded in the ID storage unit 2403. With this, the job owner of the reprinting job is not a user authenticated at the time of reprinting but is a user executing the job to be reproduced. That is, the access right of the original job can be inherited at the time of reprinting. With this, it is possible to prevent the access right from being changed against the original job owner's intention.

On the other hand, the reproduction-allowed users can be changed only by the job owner. FIG. 31 is a drawing for explaining an example of a changeable-job selection screen displayed when an access-allowed user is changed.

As depicted in the drawing, a changeable-job selection screen 3100 includes a display section 3101 for displaying a list of changeable jobs, a "next" button 3102 for displaying jobs on the next screen, and a "previous" button 3103 for displaying jobs on the previous screen. Also, on the display section 3101, a JID, print conditions (print settings) of the job, a document name, and the IP address of the apparatus executing the job are displayed.

Here, on the display section 3101, only the jobs with the job owner matching the user ID of the logged-in user. With this, only the job owner executing printing can change the access right.

When a job is selected on the changeable-job selection screen 3100, a change screen for changing the access-allowed users of the selected job is displayed. FIG. 32 is a drawing for explaining an example of the change screen.

As depicted in the drawing, the change screen 3200 includes an access-allowed user display section 3201 for displaying current access-allowed users, a selectable user display section for selecting users to be added, a delete button 3203, an addition button 3204, a change button 3205, and a cancel button 3206.

An access-allowed user can be deleted by selecting a user on the access-allowed user display section 3201 and then pressing the delete button 3203. Also, an access-allowed user can be added by selecting a user on a selectable-user display section 3202 and then pressing the addition button 3204. Aft deleting or adding a user, when the change button 3205 is pressed, the changed contents are stored in the ID storage unit 2403.

Here, as a scheme of changing the access right, in addition to the change scheme with an operation through various screens displayed on the operation panel 321 as explained above, a scheme of obtaining information to be changed through the network 360 may be used.

As explained above, in the fifth embodiment, whether reprinting can be executed is determined in consideration of the access right of the jobs associated with the detected PID. Therefore, when a plurality of PIDs are detected in a plurality of markings by scanning a plurality of sheets, jobs associated with some PIDs may have the access right, but jobs associated with other PIDs may not have the access right.

In this case, only the jobs having the access right may be reprinted, or reprinting may be allowed only when all jobs have the access right. The former case has an advantage in which reprinting can be executed without being aware of the presence or absence of the access right. The latter case, on the other hand, provides convenience of preventing reproduction of an odd job not intended by the user.

Also, as in the embodiments explained above, a plurality of markings may be provided to a document sheet. In this case, reprinting may be performed only when all jobs for the markings added to the document sheet are printable, or only the printable jobs among the jobs associated with the markings added to the document sheet may be reprinted.

Figure 33:
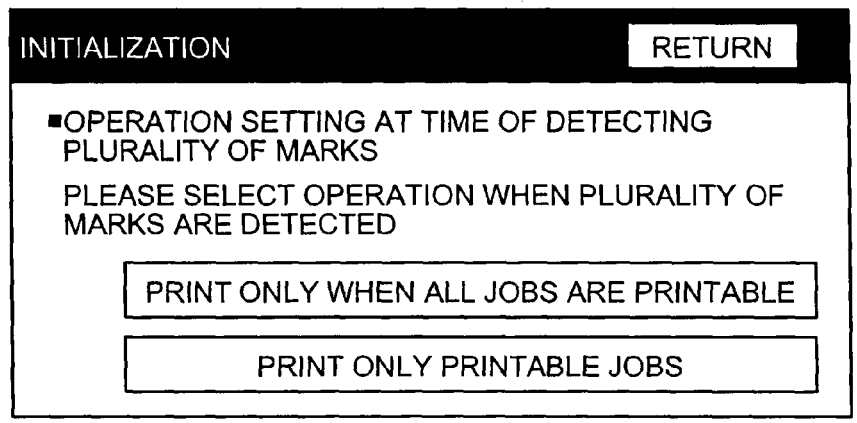
FIG. 33 is a drawing of an example of an initialization screen.

Furthermore, the process at the time of detecting a plurality of marks may be able to be set in advance on an initialization screen for setting the operation of the apparatus in advance. FIG. 33 is a drawing of an example of the initialization screen. With settings by the manager on the initialization screen depicted in the drawing, appropriate security can be set according to the use purpose.

As with the first embodiment, the cancelled job can be reproduced also as in the fifth embodiment. Also in this case, the cancelled job is allowed to be reproduced only when the job has the access right. Here, in the case of the job interrupted due to jamming or canceling, reproduction may not be allowed even by the access-allowed user, and only the job owner may be allowed to reproduce. This is because the interrupted job is inherently a job to be discarded, and it may be desirable to strictly regulate the authority for reproduction.

In this manner, in the MFP according to the fifth embodiment, the access right can be set, and only the user having the access right can execute reprint. With this, leakage of information against the job owner's intension can be prevented. Also, in the MFP according to the fifth embodiment, reprinting can be performed from an apparatus other than the apparatus in which images are accumulated.

Furthermore, the embodiments explained above are not meant to be restrictive, and various modifications as exemplarily explained below are possible.

In the first to fourth embodiments, the example has been explained in which different processes are performed when a plurality of markings are added to the scanned sheet. However, the functions of the MFPs according to the first to fourth embodiments may be combined into to one MFP, thereby allowing a process to be selected according to the use purpose of the user. Here, in a first modification example of the first to fourth embodiments, an example of a process-selectable MFP is explained.

In this MFP, when the user uses document sheets with the markings to perform reprinting, if a plurality of markings are detected, an indication as such is displayed on the operation panel.

Figure 34:
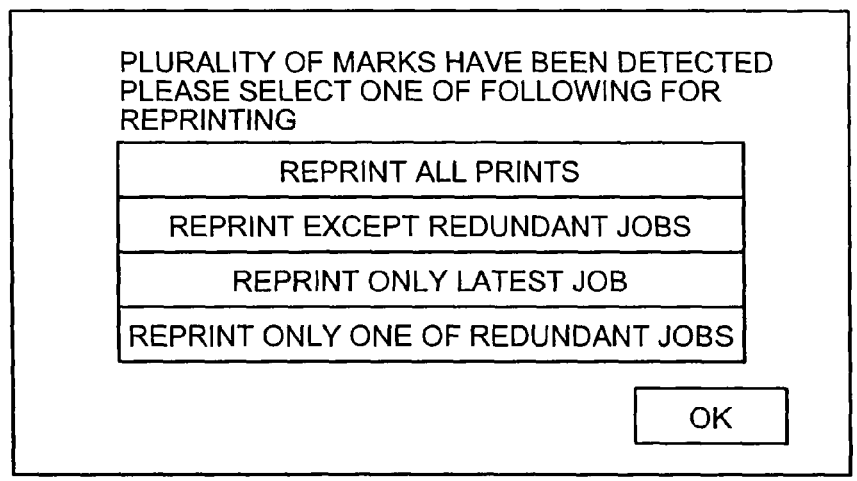
FIG. 34 is a drawing of an example of a screen displayed when a plurality of markings are detected in an MFP according to a first modification example.

FIG. 34 is a drawing of an example of a screen displayed when a plurality of markings are detected. As depicted in the drawing, the user can select an appropriate process from among reprinting all jobs, reprinting except redundant jobs, reprinting only the latest job, and reprinting only one of the redundant jobs.

Here, since the process when any one of the items is selected has been explained in the embodiments explained above, and therefore is not explained herein. With this, printing process can be made according to the use purpose of the user. Thus, user convenience is increased.

Also, when a plurality of markings are added to the scanned sheet, the user may be caused to select a job to be reprinted. Thus, in a second modification example according to the first to fourth embodiments, an example of an MFP that can select a print job to be reprinted is explained. Here, it is assumed in this modification example that a print time is included in the marking.

In the MFP according to the present modification example, when a plurality of markings are detected, print jobs associated with the detected markings are displayed.

FIG. 35 is a drawing of an example of a print-job selection screen displayed when a plurality of markings are detected in the MFP according to the second modification example. As depicted in the drawing, the user can select a print job desired to be reprinted from among the displayed print jobs.

Also, in the embodiments, the case has been explained in which the IP address included in the marking represents information identifies the apparatus. However, the IP address is not always fixed to the apparatus, and a different IP address may be assigned every time the apparatus is connected to the network. In consideration of this, in a third modification example of the first to fourth embodiments, an example is explained in which the MFP that has performed printing can be identified even its IP address is changed. In the MFP according to this modification example, it is assumed that a device ID for identifying the MFP is included in the marking. Here, it is also assumed that the device ID is uniquely assigned to each MFP in advance.

To identify the IP address with the device ID detected in the marking, the MFP associates its device ID, the IP address assigned thereto, and a port number of a port performing the process explained in the embodiments with one another, and then requests a device, such as a DNS server, for registration.

With this, the DNS server holds the device ID, the IP address, and the port number in association with each other.

Also, in this modification example, it is assumed that this registration process is performed on the DNS server after the MFP is powered on and assigned an IP address.

Furthermore, as an information registration destination, various devices can be thought, such as DNS server and an MFP within the same sub-network as that of MFP requesting registration.

Upon request for registration of the information from the MFP, the device, such as the DNS server, holds the information in an SRV record, an A record, and the like. For example, the device ID is stored in a "Name" field of the SRV record and the port number is stored in a "Port" field thereof, and the device ID is stored in a "Name" field of the A record and the IP address is stored in an "Addr" field thereof. With this, the correspondence among the device ID, the port number, and the IP address can be held. Furthermore, when a "TXT" record is used, conditions for reprinting can also be stored.

Still further, as a transmission scheme for registration, unicast transmission or multicast transmission may be used. In the case of multicast transmission, the correlation among the device ID, the IP address, and the port number can be registered to all MFPs, DNS servers, and others included in the same sub-network. In the case of unicast transmission, registration can be made to DNS servers and others beyond the same sub-network. That is, when unicast transmission is performed for registration, it is possible to identify the MFP from a network outside the same sub-network. With this, for example, the information can be registered in a representative DNS server within a network of a business establishment.

When the user then scans document sheets at an arbitrary MFP, its device ID and PID are detected. The MFP then uses a search query including the device ID to inquire of another device (for example, the DNS server or another MFP in the network) about the IP address and others. For this inquiry, unicast transmission or multicast transmission may be used.

Here, in the case of unicast transmission, when a transmission destination is specified, the user may be caused to select a business establishment that printed the document sheets. With this, the scanning MFP can make unicast transmission of an inquiry with the search query to the DNS server representing the network of the business establishment selected by the user.

If the DNS server or MFP receiving the inquiry holds the correspondence, the IP address and port number associated with the device ID are transmitted to the MFP scanning the document sheets.

With this, the MFP scanning the document sheets can identify the IP address and port number of the MFP storing the document data for reprinting. With the processes thereafter, which are similar to those in the embodiments, reprinting can be realized.

In the present modification example, with the MFP performing the process, the MFP storing the image data for reprinting and the port number of the port providing a function for reprinting can be identified even if the IP address or the like is changed. When unicast transmission is used for registration, the MFP and port number can be identified even from a network different from that of the reprinting MFP.

Figure 36:
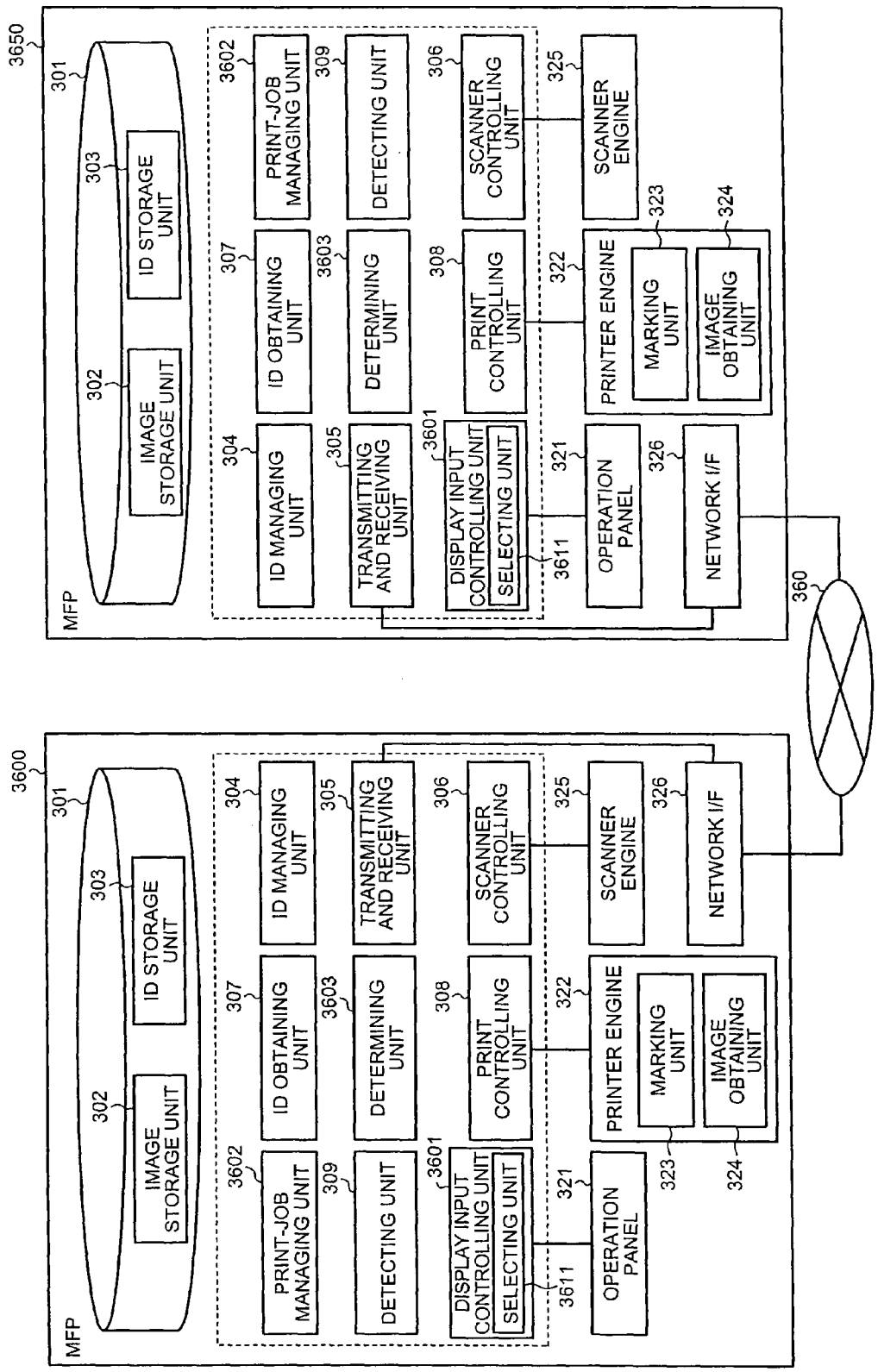
FIG. 36 is a block diagram of a configuration of each MFP according to a sixth embodiment of the present invention.

FIG. 36 is a block drawing of a configuration of an MFP 3600 and an MFP 3650 according to a sixth embodiment of the present invention. Here, also in the present embodiment, the MFP 3600 and the MFP 3650 have a similar configuration, and therefore only the MFP 3600 is explained.

As depicted in FIG. 36, the MFP 3600 according to the sixth embodiment includes the image storage unit 302, the ID storage unit 303, the operation panel 321, the printer engine 322, the scanner engine 325, the network I/F 326, the ID managing unit 304, the transmitting and receiving unit 305, the scanner controlling unit 306, the ID obtaining unit 307, the print controlling unit 308, the detecting unit 309, a display input controlling unit 3601, a print-job managing unit 3602, and a determining unit 3603.

The display input controlling unit 3601 includes a selecting unit 3611 that controls display of various screens on a displaying unit of the operation panel 321 and accepts a key input event from an input unit. Also, the display input controlling unit 3601 causes a plurality of print jobs to be displayed on the displaying unit of the operation panel 321 according to a request from the determining unit 3603, which will be explained further below. Here, a procedure of displaying print jobs will be explained further below.

When the display input controlling unit 3601 causes a plurality of print jobs to be displayed on the displaying unit of the operation panel 321, the selecting unit 3611 accepts a print job selected by the user from these print jobs, and selects print jobs to be printed.

Also, when an inquiry about a JID (or BID) associated with the PID detected by the detecting unit 309 is received, for example, the ID managing unit 304 obtains the JID associated with the PID from the ID storage unit 303, and then returns the JID to the inquiring source.

With the detection process by the detecting unit 309 according to the present embodiment, the MFP 3600 can print the document from each marking.

In the MFP 3600 according to the present embodiment, when JIDs associated with a plurality of PIDs detected by the detecting unit 309 are identical to each other, a control is made so that the same image is not redundantly printed.

Figure 37:
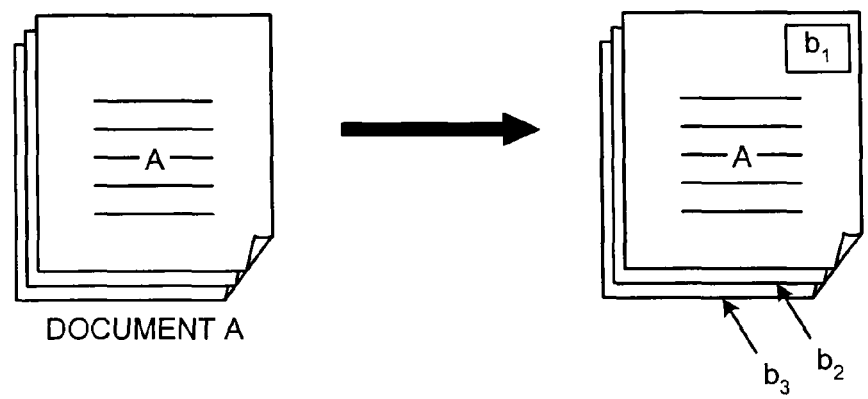
FIG. 37 is a schematic drawing of an example in which a document A is printed in the MFP according to the sixth embodiment.

For example, it is assumed that the MFP 3600 performs printing of adding markings depicted in FIG. 1 onto the document A, and then again performs printing of adding markings thereonto. FIG. 37 is a schematic drawing of an example in which the document A is printed in the MFP 3600 according to the sixth embodiment. As depicted in the drawing, when the user again prints the document A, PID=b1 is marked at the head sheet, and PID=b2 and PID=b3 are marked on the second and third sheets, respectively.

Thereafter, it is assumed that user reprints the document subjected to marking printing depicted in FIG. 1 and the document subjected to marking printing depicted in FIG. 37.

Figure 38:
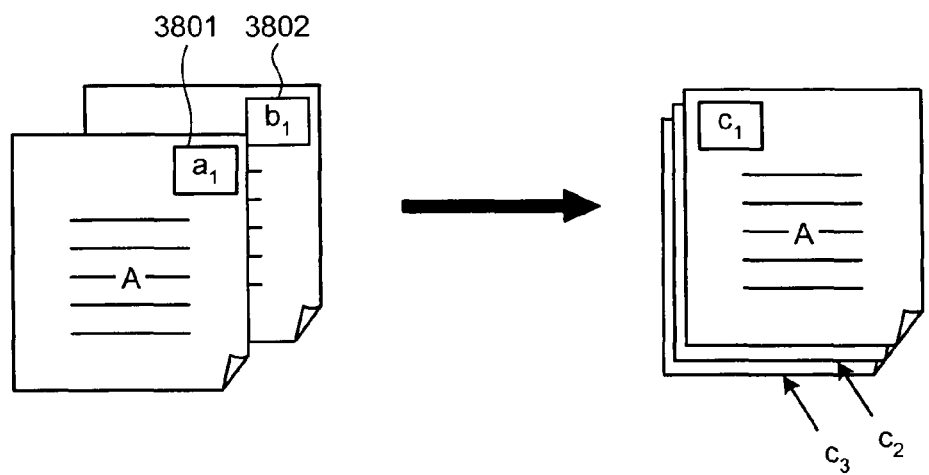
FIG. 38 is a schematic drawing of an example of reprinting a document from a plurality of markings associated with the same JID in the MFP according to the sixth embodiment.

FIG. 38 is a schematic drawing of an example of reprinting a document from a plurality of markings associated with the same JID in the MFP 3650 according to the sixth embodiment. As depicted in the drawing, it is assumed that document sheets added with marking 3801 of PID=a1 and document sheets added with marking 3802 of PID=b1 are simultaneously put on a contact glass of the MFP 3650 and then a request for reprinting is made.

In this case, the detecting unit 309 detects PID=a1 and PID=b1. When determining that the documents associated with PID=a1 and PID=b1 are identical to each other, the MFP 3600 reprints that document only once. Here, markings of PID=c1, PID=c2, and PID=c3 are added to the sheets of the reprinted document A. In this manner, when determining that images to be printed at the time of reprinting the documents associated with the detected PIDs are redundant, the MFP 3600 performs control so that the redundant image is printed only once. Next, the configuration required for such reprinting is explained.

In the present embodiment, in the case of an MFP with different storage destinations of document image data, after reception of a reprinting request from the user, the ID obtaining unit 307 obtains, from the ID storage unit 303 of another MFP through the transmitting and receiving unit 305, EIDs of all images included in a print unit to which the PID detected by the detecting unit 309 belongs and print settings associated with the print unit.

Also, when a request for transmitting information for reprinting is received from another MFP, the ID obtaining unit 307 inquires of the ID managing unit 304 about an EID, a JID (BID), and print settings associated with the PID received by the transmitting and receiving unit 305 for obtainment. Then, the obtained information is transmitted to the other MFP (for example, the MFP 3650), which can thus obtain the information associated with the PID.

The print-job managing unit 3602 manages print jobs obtained under the control of the print controlling unit 308. FIG. 39 is a drawing of an example of print jobs managed by the print-job managing unit 3602. As depicted in FIG. 39, on a print-job management table, a PID extracted from the detection marking, print conditions, job information of the PID, a JID to which the PID belongs, and an EID group belonging to the JID are stored in association with each other.

The determining unit 3603 determines whether the EIDs of the print jobs obtained by the ID obtaining unit 307 and stored in the print-job managing unit 3602 match each other. Here, the print job is generated for each PID detected by the detecting unit 309. That is, the determining unit 3603 determines whether the EIDs match each other for each associated PID.

Also, upon determination that the EIDs of the print jobs match each other, the determining unit 3603 further determines whether the print settings for these print jobs match each other. If it is determined that the print settings match each other, the print controlling unit 308 performs control so that the same image is not output a plurality of times.

Here, when the determining unit 3603 determines that the EIDs match each other and the print settings are different, the display input controlling unit 3601 causes these print jobs to be displayed, and the selecting unit 3611 selects a print job to be printed according to a user's input. With this, the print controlling unit 308 performs printing with the selected print job.

A procedure is explained below in which the MFP 3600 prints markings and the MFP 3650 performs reprinting.

Figure 40B:
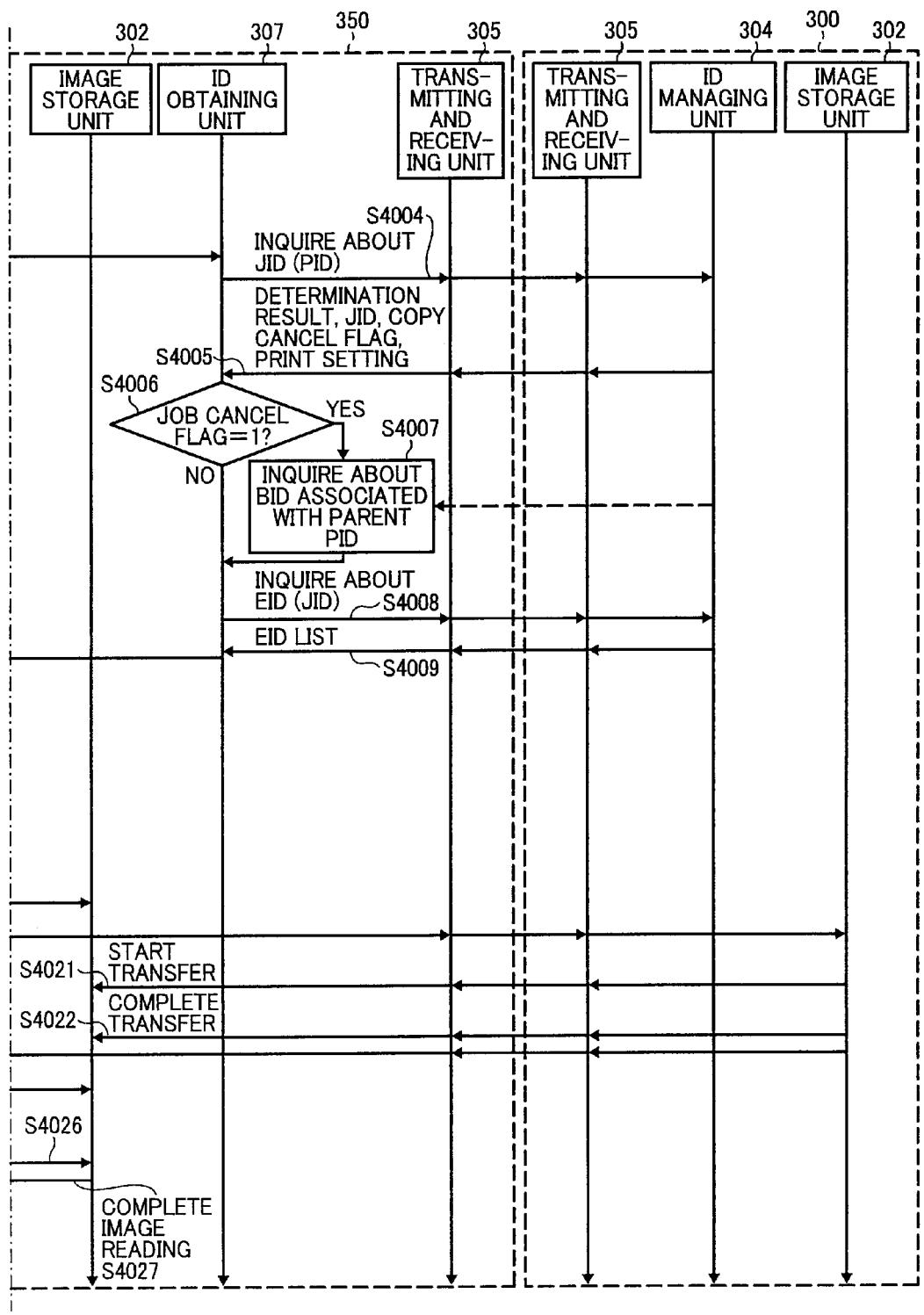

Here, a procedure is explained in which the MFP 3650 performs reprinting by using images stored in the MFP 3600. FIG. 40 is a flowchart of an entire flow of a reprinting process in the MFP 3600 and the MFP 3650 according to the sixth embodiment.

First, when a reprinting process is specified by the user through the operation panel 321 or the like, the print controlling unit 308 instructs the detecting unit 309 to start mark detection (Step S4001). In this procedure, it is assumed that the user scans two print sheets (for example, a print sheet marked with PID=a1 and a print sheet marked with PID=b1) on a contact glass of the MFP 3650.

The detecting unit 309 receiving the instruction then detects a plurality of markings in the document images disposed on the contact glass, decodes each detected marking, and detects information for identifying a PID, a print time and device. The detecting unit 309 then reports the detected PID and others to the print controlling unit 308 (Step S4002). The print controlling unit 308 can use the information for identifying the device to identify the device storing the images. Here in the present procedure, the MFP 3600 is assumed to be identified.

Next, the print controlling unit 308 instructs the ID obtaining unit 307 to perform an image identifying process for identifying an image to be reprinted (Step S4003). This instruction includes all detected PIDs. With this, the ID obtaining unit 307 performs processes from Steps S4004 to S4010 as many as the number of detected PIDs.

After instructed to start the image identifying process (Step S4003), the ID obtaining unit 307 inquires of the ID managing unit 304 of the MFP 3600 about JIDs associated with the detected PIDs through the transmitting and receiving unit 305 of the MFP 3650 and the transmitting and receiving unit 305 of the MFP 3600 (Step S4004). Also, which apparatus the inquiry is headed for is determined based on the information for identifying the apparatus, such as the IP address included in the detected marking.

The ID managing unit 304 receiving the inquiry then obtains from the ID storage unit 303 a JID associated with the PIDs, a job cancel flag, and print settings.

The ID managing unit 304 then reports to the ID obtaining unit 307 of the MFP 3650, the JID, job cancel flag, and print settings through the transmitting and receiving unit 305 of the MFP 3600 and the transmitting and receiving unit 305 of the MFP 3650 (Step S4005).

The ID obtaining unit 307 then determines whether the received job cancel flag is 1, that is, whether printing of the job to which the PID belongs has been interrupted (Step S4006). When the job cancel flag is 1 ("Yes" at Step S4006), the ID obtaining unit 307 inquires of the ID managing unit 304 of the MFP 3600 about a JID for the parent PID of that PID (Step S4007).

Specifically, the ID obtaining unit 307 first inquires of the ID managing unit 304 about a parent ID associated with the PID, and then further inquires of the ID managing unit 304 about a JID associated with the reported parent PID.

Here, although omitted in the drawing, when the job cancel flag is 1 but the parent PID cannot be obtained, reprinting based on the parent PID cannot be performed, and therefore the reprinting process ends. Also, for the job cancel flag obtained for the parent PID, it is further determined that whether the job cancel flag is 1, and when it is 1, a process of searching for a parent PID is further repeated.

When a JID for the parent PID is obtained (Step S4007) or when it is determined at Step S4006 that the job cancel flag is not 1 ("No" at Step S4006), the ID obtaining unit 307 inquires of the ID managing unit 304 of the MFP 3600 about all EIDs belonging to the job identified by the JID (Step S4008).

The ID managing unit 304 then obtains all EIDs associated with the JID from the ID storage unit 303, and then reports a list of the obtained EIDs to the ID obtaining unit 307 (Step S4009). The ID obtaining unit 307 receiving the report then reports to the print controlling unit 308 the print settings and JID obtained at Step S4005 and the EID list reported at Step S4009 (Step S4010).

When a plurality of EID list are obtained for each PID at steps 4004 to 4010, the print controlling unit 308 then request the determining unit 3603 for these EID lists and the print settings associated with the EID lists, as well as an EID redundancy determination (Step S4011).

The determining unit 3603 then determines whether EID groups included in these EID lists match each other (Step S4012). When the determining unit 3603 determines that they do not match ("No" at Step S4012), the determining unit 3603 reports to the print controlling unit 308 that the EID lists do not match (Step S4013). Here, redundancy is determined not restrictively when all EIDs included in the EID lists match each other, and other examples will be explained in a first modification example of the sixth embodiment. With this, the print controlling unit 308 performs processes from Steps S4017 to S4027 on each EID included in these EID lists.

On the other hand, when the determining unit 3603 determines that the EID groups included in these EID lists match each other ("Yes" at Step S4012), it is determined whether the print settings associated with the respective EID lists match each other (Step S4014).

When determining that the print settings match each other ("Yes" at Step S4014), the determining unit 3603 reports to the print controlling unit 308 that only the EID group of any one of the EID lists is enough for printing (Step S4015). With this, the print controlling unit 308 performs processes from Step S4017 to S4027 on each EID included in the one of the EID lists.

On the other hand, when determining that the print settings do not match each other ("No" at Step S4014), the determining unit 3603 requests the display input controlling unit 3601 for displaying a list of print jobs associated with each of these EID lists (Step S4016).

With this, the display input controlling unit 3601 displays a list of print jobs including the same EID group with different print settings. FIG. 41 is a drawing of an example of a screen of a print-job list displayed by the display input controlling unit 3601. The user refers to the screen of the print-job list to select a print job desired to be printed. The selecting unit 3611 then selects the print job selected by the user as a print target, and reports the selected print job to the determining unit 3603 (Step S4017).

Next, the determining unit 3603 reports to the print controlling unit 308 that only the list of the EIDs associated with the reported printing is enough for printing (Step S4018). With this, the print controlling unit 308 performs processes from Steps S4019 to S4029 on each EID included in the reported EID list.

Next, upon the report from the determining unit 3603, the print controlling unit 308 performs an image transferring and storing process of transferring an image to be reprinted from the MFP 3600 and storing the image in the image storage unit 302 (Steps S4019 too S4024).

Specifically, the print controlling unit 308 first instructs the image storage unit 302 to start image accumulation (Step S4019). Next, the print controlling unit 308 reports an image transfer request via the transmitting and receiving unit 305 to the image storage unit 302 of the MFP 3600, (Step S4020).

The image storage unit 302 of the MFP 3600 receiving the transfer request then starts image transfer (Step S4021) and, when the transfer is completed (Step S4022), reports the transfer completion to the print controlling unit 308 of the MFP 3650 (Step S4023). The print controlling unit 308 receiving the report then reports the completion of image accumulation to the image storage unit 302 (Step S4024).

In this manner, after the image data to be reprinted is obtained from the MFP 3600 and stored in its image storage unit 302, the stored image data is reprinted.

Next, the print controlling unit 308 performs an image reprinting process for the image associated with the obtained EID (Steps S4025 to S4029). Here, in the image reprinting process, as with the printing process, a process of generating PIDs of sheets for reprinting and JIDs of jobs for reprinting is performed, which is omitted in the drawing.

Also, the print settings, such as the specified number of copies, can be changed even at the time of reprinting. With reference to the changed number of copies, a BID is generated at the time of reprinting. With this, even when the number of copies required at the time of reprinting is different from that at the time of printing, the required number of copies can be specified for printing.

Specifically, the print controlling unit 308 first instructs the printer engine 322 for reprinting (Step S4025). This instruction includes an EID of the image to be printed and the generated PID.

Next, the image obtaining unit 324 of the printer engine 322 starts a process of reading the image associated with the specified EID from the image storage unit 302 (Step S4026). Upon completion of image reading from the image storage unit 302 (Step S4027), the marking unit 323 generates a marking obtained by coding the PID, and the printer engine 322 causes the generated marking to be printed as being combined with the print image (Step S4028).

Upon completion of reprinting, the completion of reprinting is reported from the printer engine 322 to the print controlling unit 308 (Step S4029).

Here, in the procedure, the reprinting process for each job (JID) unit has been explained. Alternatively, the reprinting process may be performed for each copy (BID) unit. In this case, only the difference is that the process is performed by using a BID instead of a JID, and therefore this process is not explained herein.

According to the MFPs 3600 and 3650 according to the present embodiment, printing can be made from an arbitrary one of the marking-printed sheets, with all images included in the print unit to which the sheets belong being identified. Also, printing the redundant images can be suppressed. Therefore, reprinting process by using markings can be efficiently performed. Also, from a sheet added with a plurality of markings, printing for a print unit that has been set for each mark can be made. Therefore, reprinting can be made for a plurality of print units with one reading process. Thus, reprinting can be efficiently made, and a working load on the user can be reduced.

Also, according to the MFPs 3600 and 3650 according to the present embodiment, printing the redundant images with the same print settings can be suppressed. Furthermore, in the case of different print settings, only the image desired by the user can be printed based on a selection from the user.

In the sixth embodiment, the case has been explained in which, when the MFP 3650 performs reprinting, the EID groups of the obtained EID lists match each other. Here, in the first modification example of the sixth embodiment, an example is explained in which printing is suppressed when the EID groups of one of the EID lists includes EID groups of the other of the EID lists. It is assumed herein that the configuration of the MFP according to the first modification example is similar to that according to the sixth embodiment, and is not explained herein.

Figure 42:
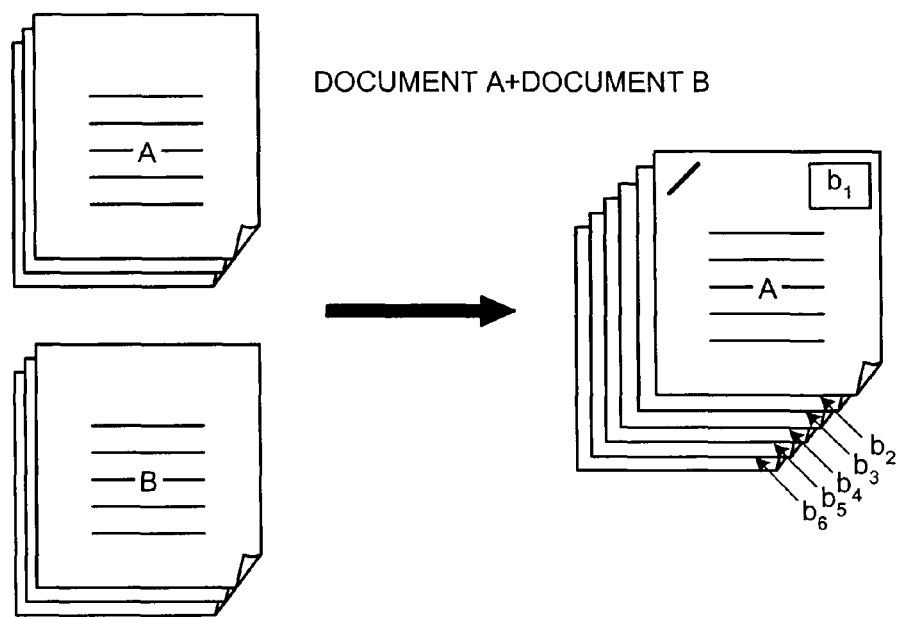
FIG. 42 is a schematic drawing of an example in which a document A and a document B are printed in an MFP according to a first modification example of the sixth embodiment.

In the present modification example, it is assumed that after performing printing and marking depicted in FIG. 1, the MFP 3600 performs printing and marking again the document A and the document B at once. FIG. 42 is a schematic drawing of an example in which the document A and the document B are printed in the MFP 3600 according to a first modification example of the sixth embodiment. As depicted in the drawing, when the user prints the document A and the document B at once, the head sheet is marked with PID=b1, and the second to sixth sheets are marked with PID=b2, PID=b3, PID=b4, PID=b5, and PID=b6, respectively.

Then, it is assumed that the user performs reprinting on the document subjected to the marking printing depicted in FIG. 1 and the documents subjected to the marking print depicted in FIG. 42.

Figure 43:
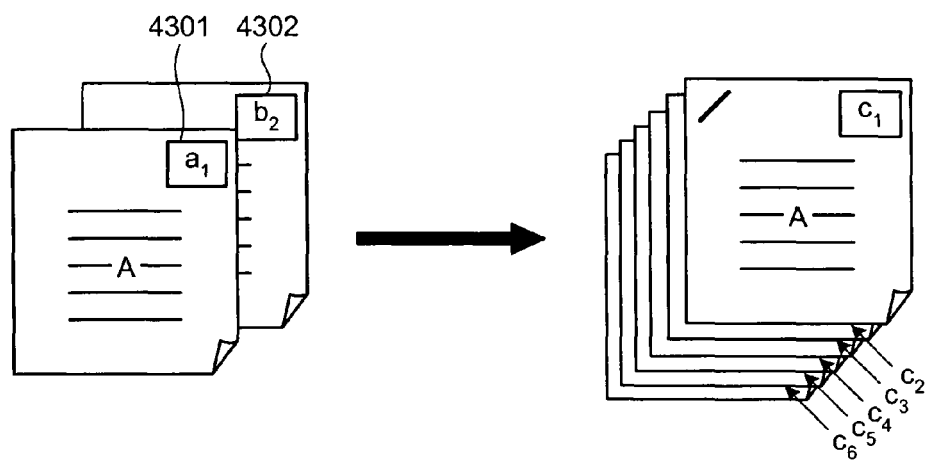
FIG. 43 is a schematic drawing of an example in which, in the MFP according to the first modification example of the sixth embodiment, a document is reprinted from a plurality of markings in which an EID group associated with one of JIDs is included in EID groups associated with the other of the JIDS.

FIG. 43 is a schematic drawing of an example in which, in the MFP 3650 according to the present modification example, a document is reprinted from a plurality of markings in which an EID group associated with one of JIDs is included in EID groups associated with the other of the JIDs. As depicted in the drawing, it is assumed that a document sheet marked with a marking 4301 of PID=a1 and a document sheet marked with a marking 4302 of PID=b1 are simultaneously put on the contact glass of the MFP 3650 for requesting a reprinting process.

In this case, the detecting unit 309 simultaneously detects PID=a1 and PID=b1. Since the document associated with PID=a1 is included in the document associated with PID=b1, the MFP 3600 reprints the document sheet associated with PID=b1 associated with the document B. Here, each sheet of the reprinted document A is marked with PID=c1, PID=c2, PID=c3, PID=c4, PID=c5, and PID=c6. In this manner, when a plurality of PIDs are detected and the MFP 3600 determines that an image of one of the print jobs is included in images of another one of the print jobs, a image group of the other print job is reprinted.

FIG. 44 is a drawing of an example of print jobs stored in the reprinting process and managed by the print-job managing unit 3602. In a print-job management table depicted in FIG. 44, EIDs and a JID associated with the document A are stored for the print job of PID=a1 in an upper row, whilst EIDs and a JID associated with the document A and the document B are stored for the print job of PID=b1 in a lower row. In the MFP 3650 according to the present modification example, only the print job of PID=b1 in the lower row is printed.

Figure 45A:
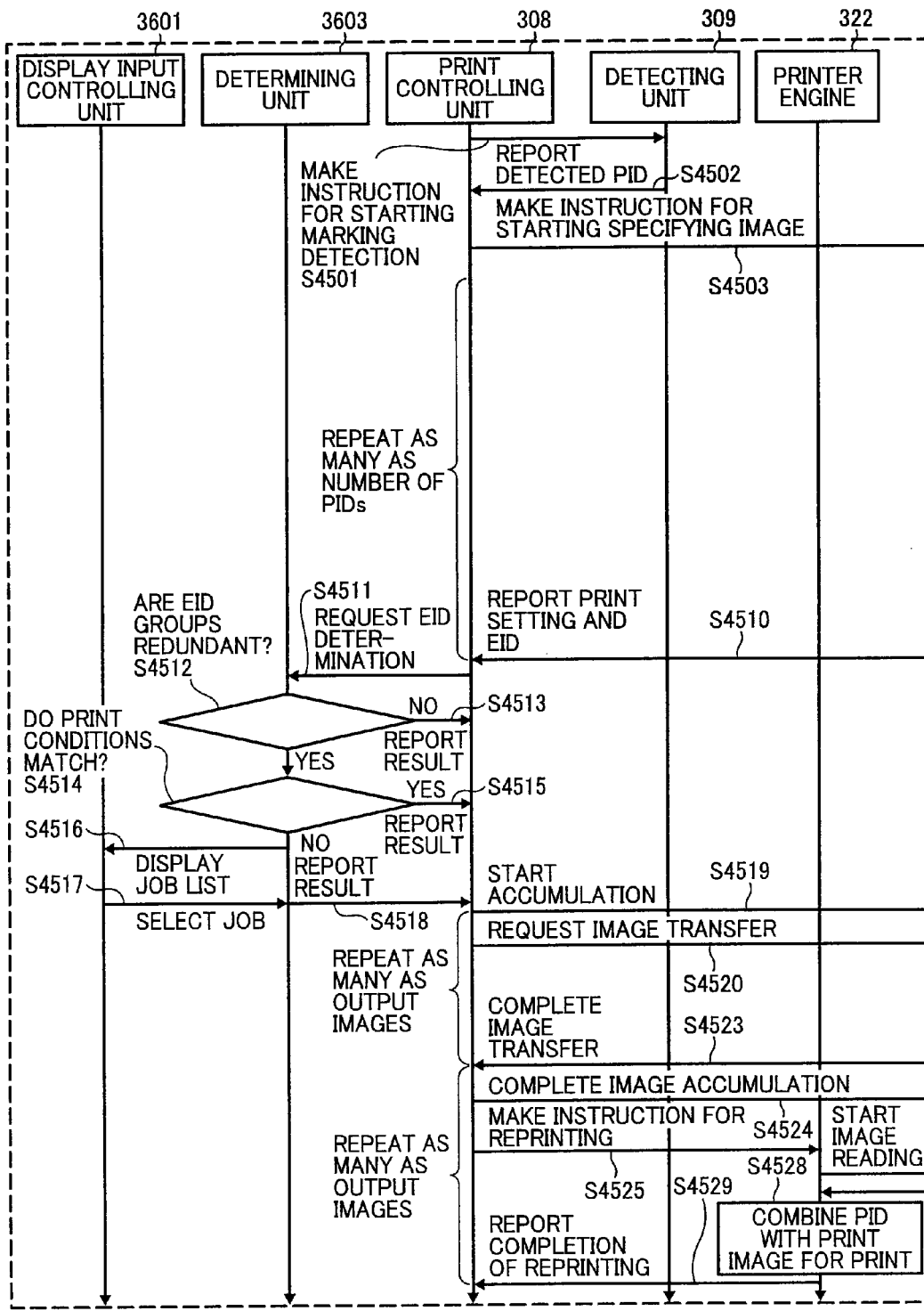
FIGS. 45A and 45B are a flowchart of an entire flow of a reprinting process in each MFP according to the first modification example of the sixth embodiment.
Figure 45B:
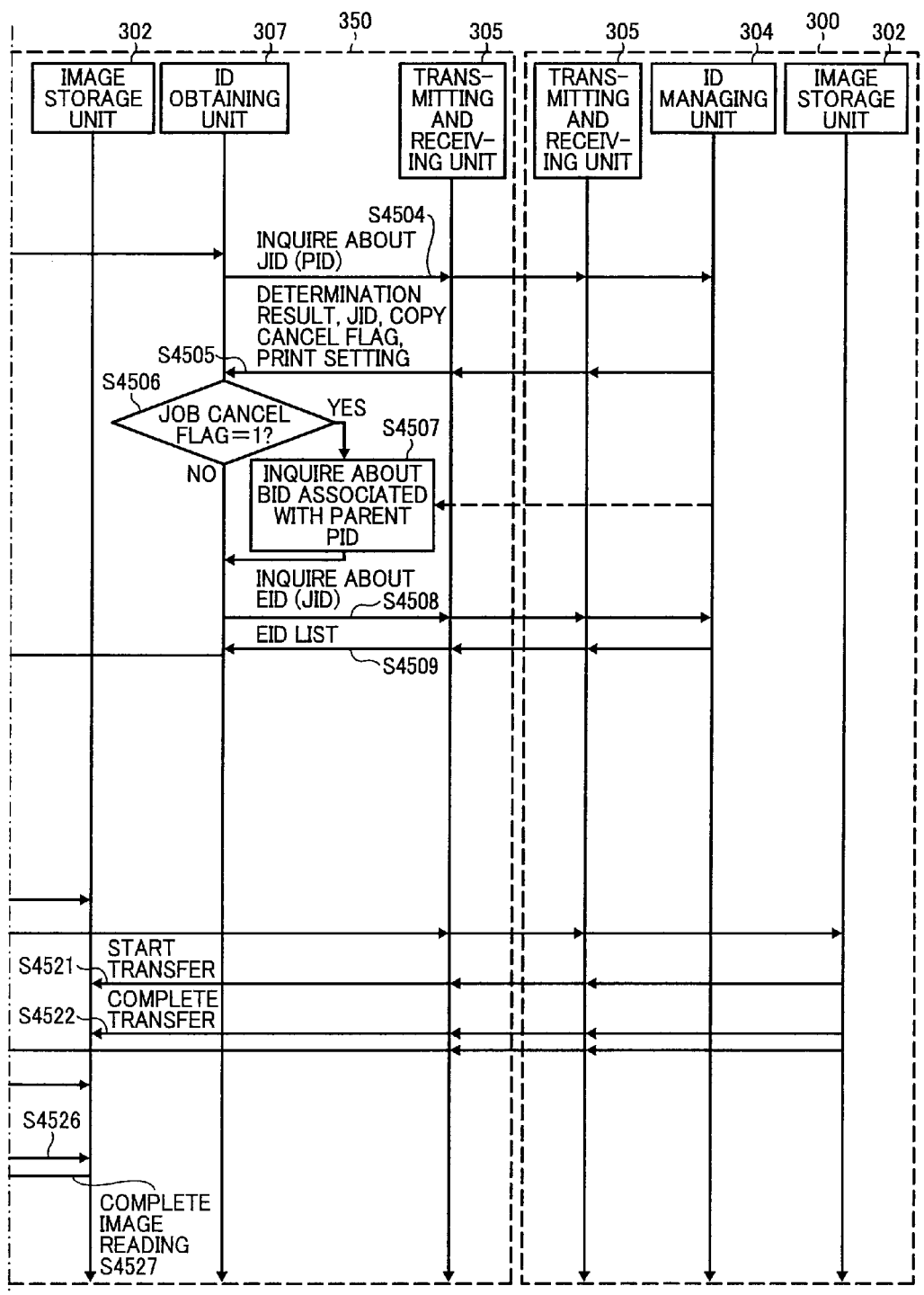

Next, a procedure of the MFP 3650 performing a reprinting process by using the images stored in the MFP 3600 is explained. FIG. 45 is a flowchart of an entire flow of a reprinting process in the MFP 3600 and the MFP 3650 according to the present modification example.

First, in the MFP 3600 and the MFP 3650, as with Steps S4001 to S4010 in FIG. 40 according to the sixth embodiment, from the MFP 3600 to the print controlling unit 308 of the MFP 3650, an EID list and print settings associated with the detected markings are reported (Step S4501 to S4510).

When a plurality of EID lists are obtained for each PID, the print controlling unit 308 then requests the determining unit 3603 for these EID lists and the print settings associated with the EID lists, as well as to make an EID redundancy determination (Step S4511).

The determining unit 3603 determines whether EID groups included in one of the EID lists is included in EID groups included in another one of the EID lists (Step S4512). When determining that they are not included ("No" at Step S4512), the determining unit 3603 reports to the print controlling unit 308 that the EID lists are not redundant (Step S4513). With this, the print controlling unit 308 performs processes from Step S4017 to S4027 on each EID included in these EID lists.

On the other hand, when determining that EID groups included in one of the EID lists is included in EID groups included in another one of the END lists ("Yes" at Step S4512), the determining unit 3603 determines whether the print settings associated with the EID lists match each other (Step S4514).

When determining that the print settings match each other ("Yes" at Step S4514), the determining unit 3603 reports to the print controlling unit 308 that only the EID groups included in the other one of the EID lists are enough for printing (Step S4515). With this, the print controlling unit 308 performs processes from Steps S4519 to S4529 on each EID included in the other EID list.

That is, reprinting only the EID groups (for example, the document A and the document B) of the other EID list means printing the images identical to the images of the EID groups (for example, the document A) of the one EID list. Therefore, reprinting the EID groups of the one EID list is not required.

Also, when determining that the print settings do not match each other ("No" at Step S4514), the determining unit 3603 request the display input controlling unit 3601 to display a list of print jobs associated with each EID list (Step S4516).

With this, the display input controlling unit 3601 displays a list of print jobs including the same EID groups with different print settings. FIG. 46 is a drawing of an example of a screen of a print-job list displayed by the display input controlling unit 3601. The user refers to the screen of the print-job list to select a print job desired to be printed. The selecting unit 3611 then selects the print job selected by the user as a print target, and reports the selected print job to the determining unit 3603 (Step S4517).

Next, the determining unit 3603 reports to the print controlling unit 308 that only the list of the EIDs associated with the reported printing is enough for printing (Step S4018). With this, the print controlling unit 308 performs processes from Steps S4519 to S4529 on each EID included in the reported EID list.

The MFP 3650 then performs reprinting with processes similar to those from Steps S4019 to S4029 according to the sixth embodiment (Steps S4519 to S4529).

As evident from the explanation, in the MFPs 3600 and 3650 according to the present modification example, printing of redundant images with the same print settings can be inhibited.

Figure 47:
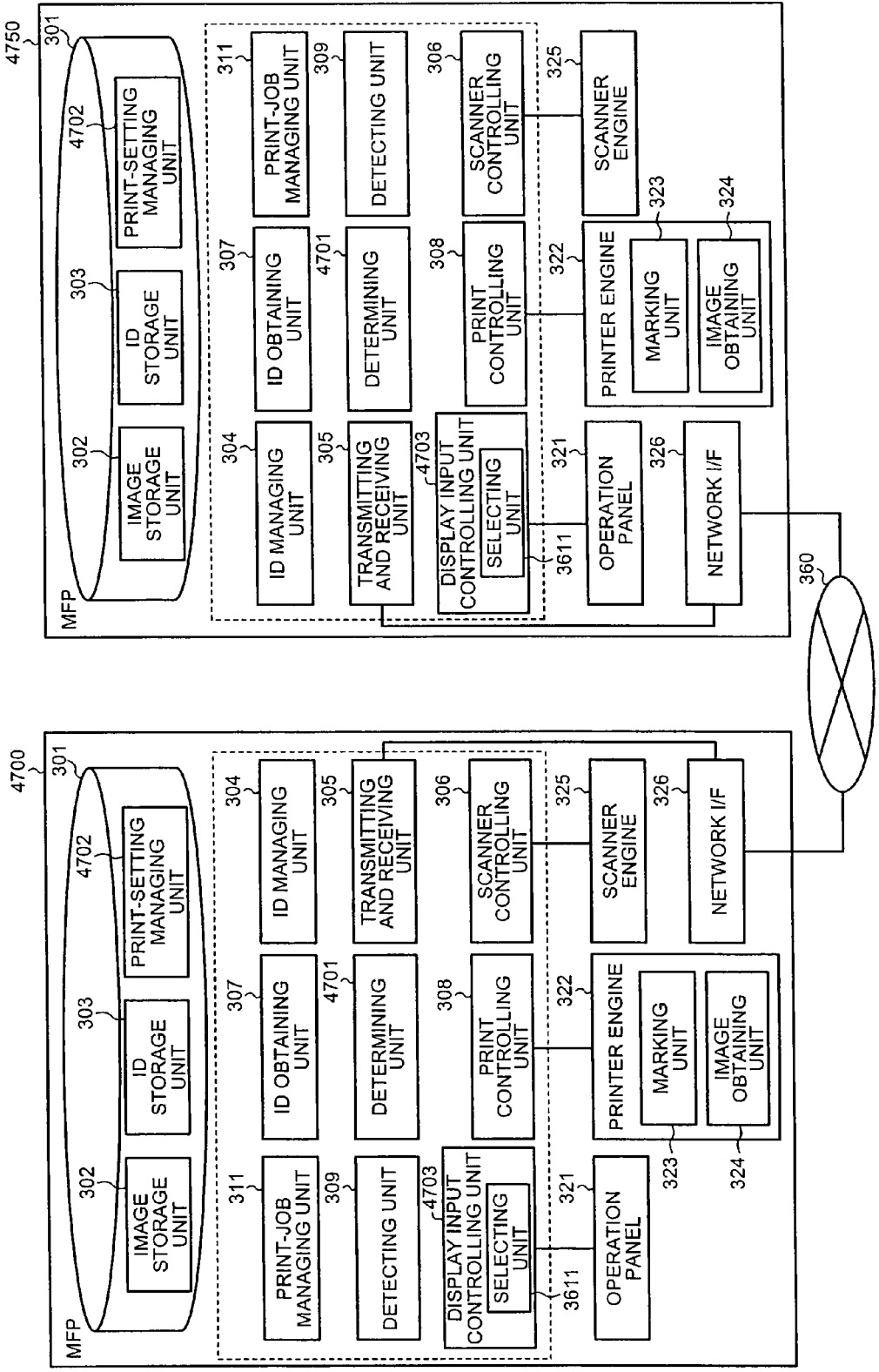
FIG. 47 is a block diagram of the configuration of each MFP according to a seventh embodiment of the present invention.

FIG. 47 is a block diagram of the configuration of an MFP 4700 and an MFP 4750 according to a seventh embodiment of the present invention. Here, as depicted in the drawing, the MFP 4700 and 4750 have a similar configuration, and therefore only the MFP 4700 is explained.

The MFP 4700 depicted in FIG. 47 is different from the MFP 3600 according to the sixth embodiment in that a print-setting managing unit 4702 is added, the display input controlling unit 3601 is changed to a display input controlling unit 4703 that performs a different process, and the determining unit 3603 is changed to a determining unit 4701 that performs a different process. In the following explanation, components identical to those in the sixth embodiment are provided with the same reference numerals, and are not explained.

Figures 48, 49:
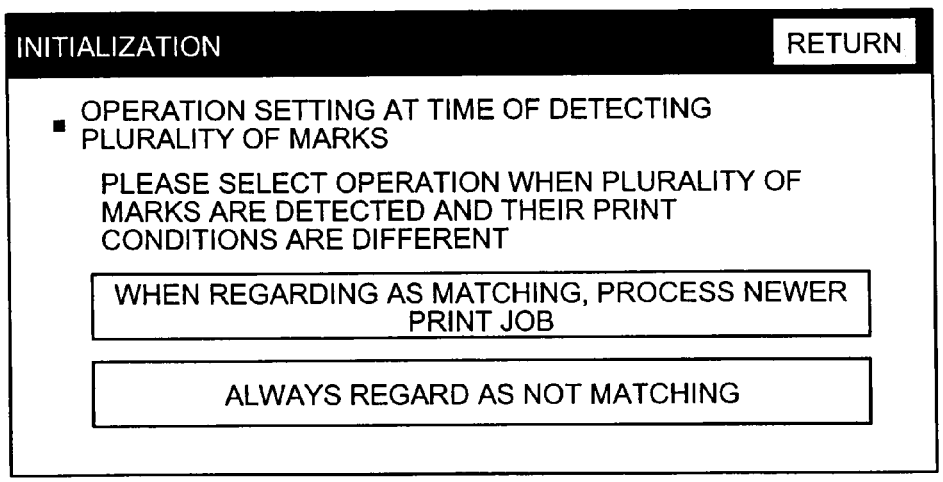
FIG. 48 is a drawing of an example of a print-setting management table managed by a print-setting managing unit in the MFP according to the seventh embodiment.
FIG. 49 is a drawing of an example of an initialization screen displayed by a display input controlling unit of the MFP according to the seventh embodiment.

FIG. 48 is a drawing of an example of a print-setting management table managed by the print-setting managing unit 4702. As depicted in FIG. 48, in the print-setting management table, print settings and a process when the print settings are different are held in association with each other.

Print settings A to D represent print settings that are settable by the user. The print setting A indicates a condition in which, after printing is performed with that print setting, the state can be matched by the user performing some operation on the printing sheets. Examples included in the print setting A are shift stacking, dividing, rotational sorting, whether stapling is to be performed, and whether punching is to be performed.

The print setting B indicates a condition regarding a process to be performed on a printing sheet where an image is to be printed, the condition indicating that, after printing is performed with that print setting, the state can be matched by the user performing some operation on the printing sheets. Examples included in the print setting B are monochrome or color, duplex printing, combination with the same scaling, arrangement order at the time of combination, the number of staples or a positional difference thereof, and the number of punch holes and a positional difference thereof.

The print setting C represents a first process in which an output other than an image is changed, particularly indicating a condition regarding a layout. Examples included in the print setting C include a stamp location, a position of a printed page number, a position of a printed date, and a dividing line at the time of combination.

The print setting D represents a second process in which an output other than an image is changed, particularly indicating a condition regarding an image combining scheme and a print size. Examples included in the print setting D include color, density, resolution, and transparency/water mark of a stamp; font and font size of a printed page number; and font and font size of a printed date.

As for these print setting A to D, the images themselves are not changed. Thus, in the MFPs 4700 and 4750, according to a user's request, printing is performed with these print settings being regarded as matching even though they are different.

Therefore, in the print-setting management table managed by the print-setting managing unit 4702, whether these print settings are regarded as matching when they are different is held.

The display input controlling unit 4703 includes, in addition to the functions of the display input controlling unit 3601, a function of receiving an input to the print-setting management table of a setting as to whether the settings match each other, a function of displaying an initialization screen indicating whether the information held in the print-setting management table is to be used, and a function of accepting an input to the initialization screen.

FIG. 49 is a drawing of an example of the initialization screen displayed by the display input controlling unit 4703. As depicted in the drawing, it is possible to set how the process is to be preformed when a plurality of marks with different print settings are detected. "When regarding as matching, process a newer print job" is selected, when only the print setting indicating that the conditions are regarded as matching in the print-setting management table is different, only the newer print job of print jobs associated with the marks is subjected to printing. "Always regard as not matching" is selected, the user is always caused to select a print job for printing as long as the print setting is different.

A determination by the determining unit 4701 as to whether EIDs of the print jobs match each other is similar to that according to the sixth embodiment, and therefore is not explained herein. When determining that the EIDs of the print jobs match each other, the determining unit 4701 determines whether the print settings match each other. When determining that the print settings do not match each other, the determining unit 4701 determines whether the print settings can be regarded as matching each other. When determining that they can be regarded as matching each other, the determining unit 4701 performs a process similar to that when they are determined as matching in the MFP 4700. When the determining unit 4701 determines that they cannot be regarded as matching, print jobs and others are displayed in the MFP 4700 in a manner similar to that according to the sixth embodiment.

Figure 50B:
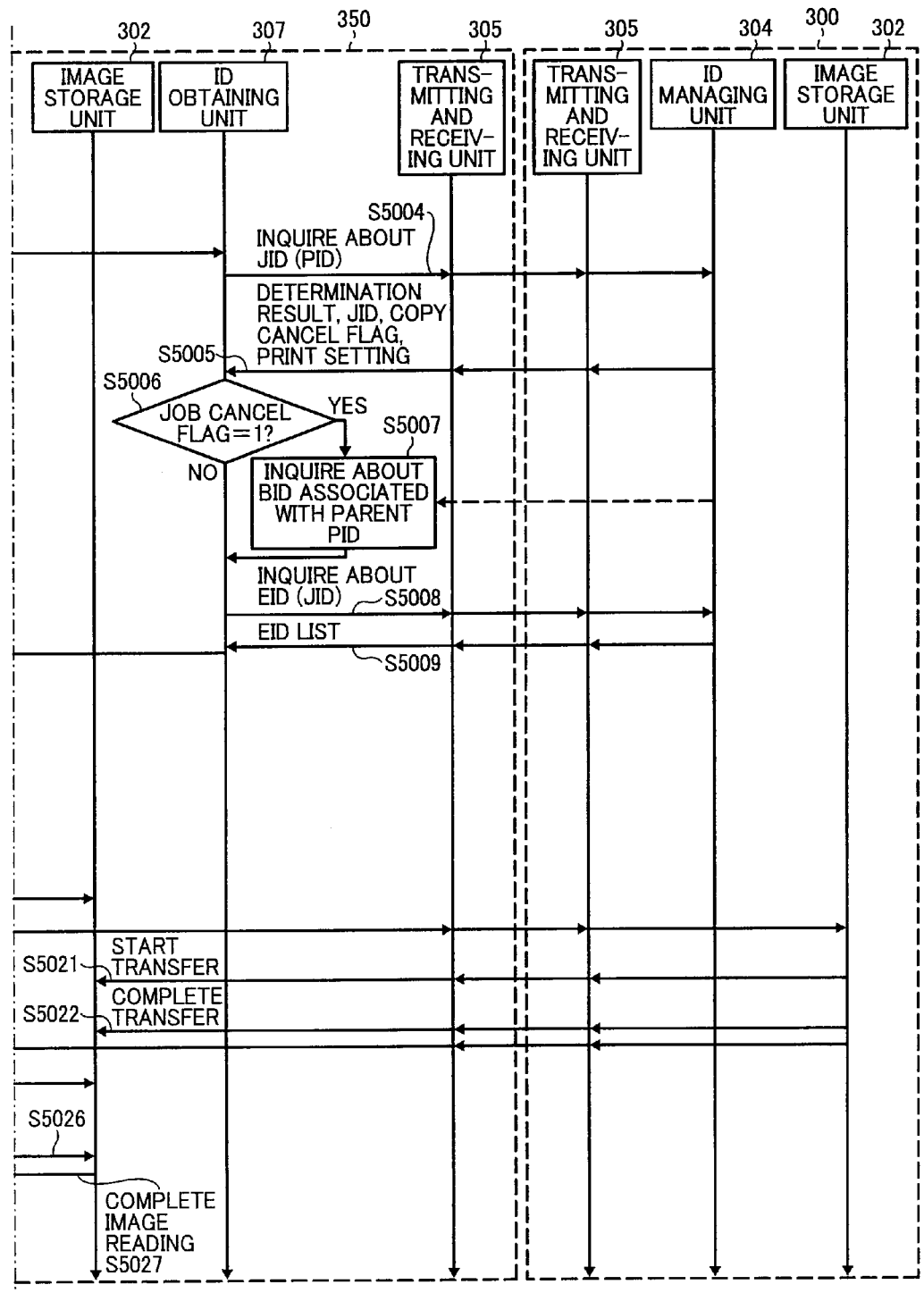

Next, a procedure of performing a reprinting process by the MFP 4750 with the use of the images stored in the MFP 4700 is explained. FIG. 50 is a flowchart of an entire flow of a reprinting process in the MFPs 4700 and 4750 according to the present embodiment.

The MFPs 4700 and 4750 first perform processes until a redundancy determination in the EID lists associated with the detected markings, the processes being similar to those from Steps S4001 to S4013 of FIG. 40 according to the sixth embodiment (Steps S5001 to S5012).

Then, when determining that the EID groups included in one of the EID lists match the EID groups included in another one of the EID lists ("Yes" at Step S5012), the determining unit 4701 determines whether the print settings associated with the EID lists match each other or can be regarded as matching (Step S5014). A detailed procedure of this will be explained further below.

When determining that the print settings match each other or can be regarded as matching ("Yes" at Step S5014), the determining unit 4701 reports to the print controlling unit 308 that only the EID groups included in the EID list associated with the newer print job of the print jobs associated with the detected markings are printed (Step S5015).

On the other hand, when determining that the print settings do not match each other ("No" at Step S5014), the determining unit 4701 requests the display input controlling unit 3601 to display a list of print jobs associated with the EID lists (Step S5016).

The MFP 4750 is assumed to perform processes similar to those from Steps S4016 to S4029 of FIG. 40 (Steps S5016 to S5029).

Figure 51:
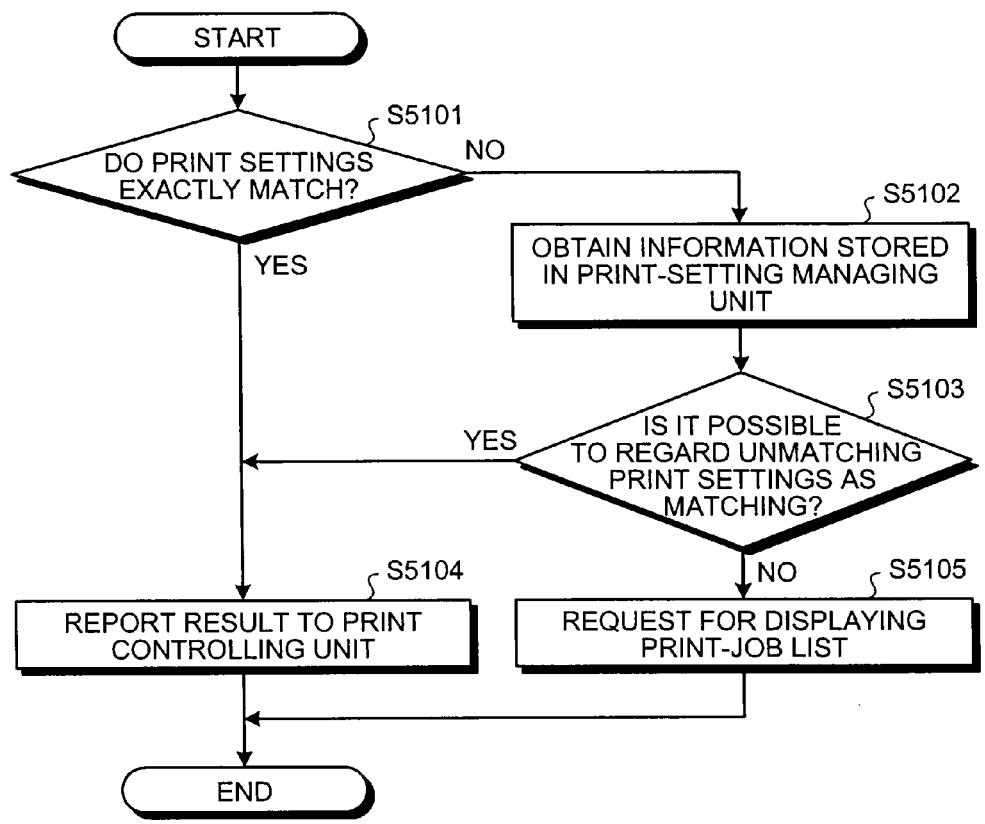
FIG. 51 is a flowchart of a procedure of a process by a determining unit determining whether print settings match each other according to the seventh embodiment.

Next, a determination process performed by the determining unit 4701 at Step S5014 of FIG. 50 is explained. FIG. 51 is a flowchart of a procedure of the process by the determining unit 4701 according to the present embodiment.

First, the determining unit 4701 determines whether the print settings associated with the markings exactly match each other (Step S5101).

When determining that they do not exactly match each other ("No" at Step S5101), the determining unit 4701 obtains information stored in the print-setting managing unit 4702 indicating whether the print settings are regarded as matching (Step S5102).

The determining unit 4701 then uses the information indicating whether the obtained print settings are regarded as matching to determine whether the print settings determined at Step S5101 as not matching can be regarded as matching (Step S5103).

On the other hand, when determining that the print settings exactly match each other ("Yes" at Step S5101), or when determining that the print settings can be regarded as matching ("Yes" at Step S5103), the determining unit 4701 reports to the print controlling unit 308 that only the EID groups included in the EID lists associated with the newer print job of the print jobs associated with the markings are printed (Step S5104). Then, the processes at Step S5015 and onward in FIG. 50 are performed.

Also, when determining that the print settings should not be regarded as matching ("No" at Step S5103), the determining unit 4701 requests the display input controlling unit 4703 to display a list of print jobs associated with the EID lists (Step S5105). With this, processes at Step S5016 and onward in FIG. 50 are performed.

In the MFPs 4700 and 4750 according to the present embodiment, from among different print settings, predetermined print settings are regarded as matching. With this, the user does not have to select a print job, thereby reducing an operation load and also inhibiting the printing of redundant images.

In the MFPs 4700 and 4750 according to the seventh embodiment, when the print settings are regarded as matching, the EID groups included in the EID list associated with the newer print job of the print jobs is subjected to printing. However, the use of the newer print job of the print jobs is not meant to be restrictive.

Thus, in a first modification example of the seventh embodiment, from among the print jobs, a print job having more functions is subjected to printing. Here, the configuration and procedure is similar to that according to the seventh embodiment, and not explained herein.

Furthermore, the present invention is not restricted to the embodiments, and various modifications as exemplarily explained below can be made.

Still further, in the sixth and seventh embodiments, the case has been explained in which the IP address included in the marking represents information for identifying the apparatus. However, the IP address is not always fixed to the apparatus, and a different IP address may be assigned every time the apparatus is connected to the network. In consideration of this, in a first modification example of the sixth and seventh embodiments, an example is explained in which the MFP that has performed printing can be identified even its IP address is changed. In the MFP according to this modification example, it is assumed that a device ID for identifying the MFP is included in the marking at the time of printing process. Here, it is also assumed that the device ID is uniquely assigned to each MFP in advance.

To identify the IP address with the device ID detected in the marking, the MFP associates its device ID, the IP address assigned thereto, and a port number of a port performing the process explained in the embodiments with one another, and then requests a device, such as a DNS server, for registration. With this, the DNS server holds the device ID, the IP address, and the port number in association with each other.

Also, in this modification example, it is assumed that this registration process is performed on the DNS server after the MFP is powered on and assigned an IP address.

Furthermore, as an information registration destination, various devices can be thought, such as DNS server and an MFP within the same sub-network as that of MFP requesting registration.

Upon reception of request for registration of the information from the MFP, the device, such as the DNS server, holds the information in an SRV record, an A record, and the like. For example, the device ID is stored in a "Name" field of the SRV record and the port number is stored in a "Port" field thereof, and the device ID is stored in a "Name" field of the A record and the IP address is stored in an "Addr" field thereof. With this, the correspondence among the device ID, the port number, and the IP address can be held. Furthermore, when a "TXT" record is used, conditions for reprinting can also be stored.

Still further, as a transmission scheme for registration, unicast transmission or multicast transmission may be used. In the case of multicast transmission, the correlation among the device ID, the IP address, and the port number can be registered to all MFPs, DNS servers, and others included in the same sub-network. In the case of unicast transmission, registration can be made to DNS servers and others beyond the same sub-network. That is, when unicast transmission is performed for registration, it is possible to identify the MFP from a network outside the same sub-network. With this, for example, the information can be registered in a representative DNS server within a network of a business establishment.

When the user then scans document sheets at an arbitrary MFP, its device ID and PID are detected. The MFP then uses a search query including the device ID to inquire of another device (for example, the DNS server or another MFP in the network) about the IP address and others. For this inquiry, unicast transmission or multicast transmission may be used.

Here, in the case of unicast transmission, when a transmission destination is specified, the user may be caused to select a business establishment that printed the document sheets. With this, the scanning MFP can make a unicast transmission of an inquiry with the search query to the DNS server representing the network of the business establishment selected by the user.

If the DNS server or MFP receiving the inquiry holds the correspondence, the IP address and port number associated with the device ID are transmitted to the MFP scanning the document sheets.

With this, the MFP scanning the document sheets can identify the IP address and port number of the MFP storing the document data for reprinting. With the processes thereafter, which are similar to those in the embodiments, reprinting process can be realized.

In the present modification example, with the MFP performing the process, the MFP storing the image data for reprinting and the port number of the port providing a function for reprinting can be identified even if the IP address or the like is changed. When unicast transmission is used for registration, the MFP and port number can be identified even from a network different from that of the reprinting MFP.

Figure 52:
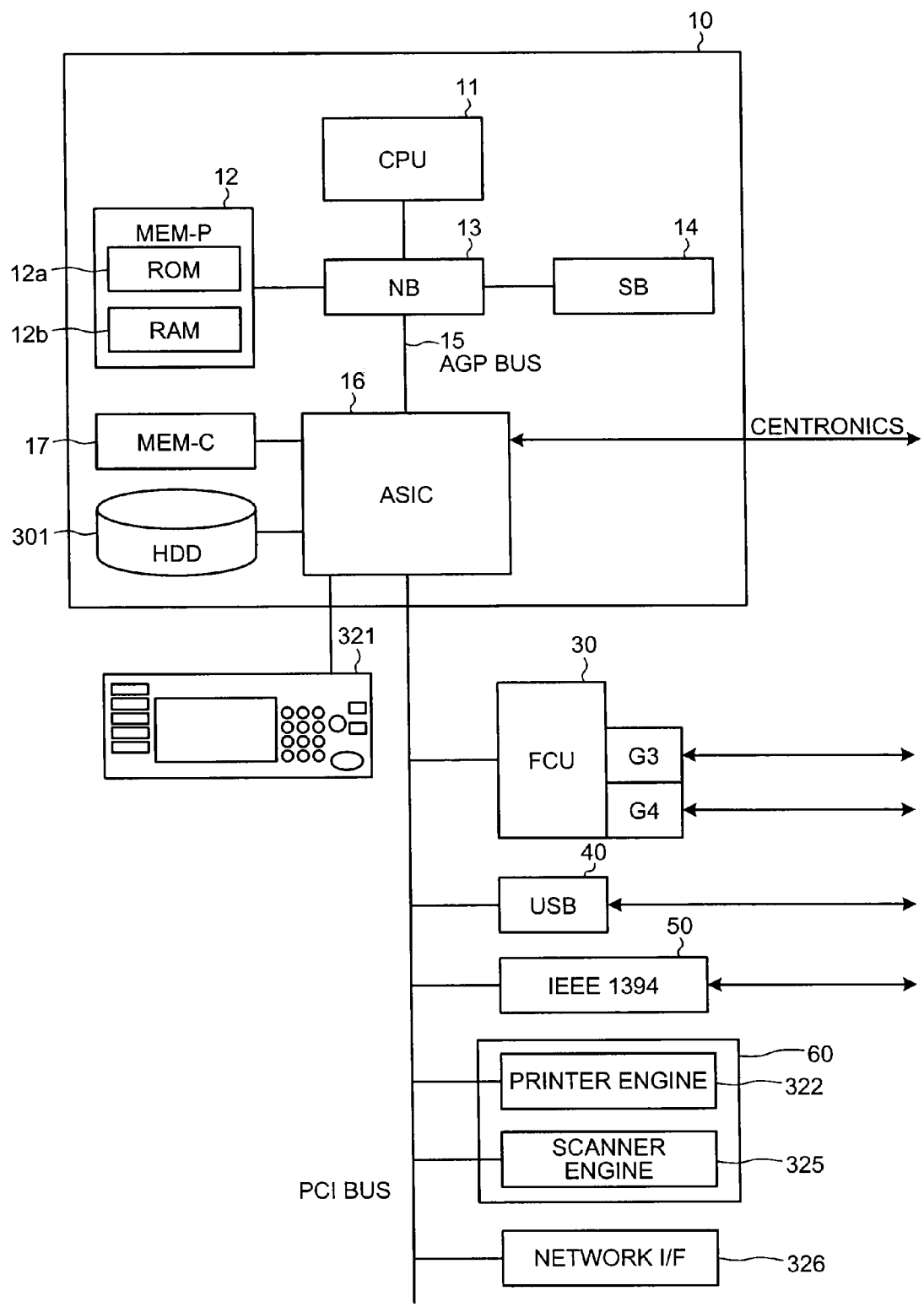
FIG. 52 is a block diagram of a hardware configuration of an MFP.

FIG. 52 is a block diagram of a hardware configuration of the MFP according to the embodiments and modification examples. As depicted in the drawing, this MFP has a configuration in which a controller 10 and an engine unit 60 are connected via a Peripheral Component Interconnect (PCI) bus. The controller 10 is a controller that controls the entire MFP, rendering, communication, and inputs from the operating unit (operation panel) 321. The engine unit 60 is, for example, a printer engine connectable to the PCI bus. Examples of the engine unit 60 are, for example, a monochrome plotter, a one-drum color plotter, a four-drum color plotter, a scanner, or a facsimile unit. Here, this engine unit 60 includes, in addition to a so-called engine unit, such as a plotter, an image processing unit for error diffusion or gamma transformation.

The controller 10 includes a CPU 11, a northbridge (NB) 13, a system memory (MEM-P) 12, a southbridge (SB) 14, a local memory (MEM-C) 17, an Application Specific Integrated Circuit (ASIC) 16, and a hard disk drive (HDD) 18, with the NB 13 and the ASIC 16 being connected via an Accelerated Graphics Port (AGP) bus 15. Also, the MEM-P 12 further includes a Read Only Memory (ROM) 12a and a Random Access Memory (RAM) 12b.

The CPU 11 performs the overall control over the MFP, has a chip set formed of the NB 13, the MEM-P 12, and the SB 14. Via this chip set, the CPU 11 is connected to other devices.

The NB 13 is a bridge for connection of the CPU 11 with the MEM-P 12, the SB 14, and the AGP bus 15, and has a memory controller that controls read and write with respect to the MEM-P 12, a PCI master, and an AGP target.

The MEM-P 12 is a system memory for use as a memory for storing programs and data, a memory for developing the programs and data, or a rendering memory for printers, and includes the ROM 12a and the RAM 12b. The ROM 12a is a read-only memory for use as a memory for storing programs and data, whilst the RAM 12b is a writable and readable memory for use as a memory for developing the programs and data, or a rendering memory for printers.

The SB 14 is a bridge for connection between the NB 13 and PCI devices and peripheral devices. The SB 14 is connected to the NB 13 via the PCI bus. To this PCI bus, the network interface (I/F) unit is connected, for example.

The ASIC 16 is an integrated circuit (IC) dedicated for image processing having hardware components for image processing, serving as a bridge connecting the AGP bus 15, the PCI bus, the HDD 18, and the MEM-C 17. The ASIC 16 includes a PCI target and an AGP master, an arbiter (ARB), which is a core of the ASIC 16, a memory controller that controls the MEM-C 17, a plurality of Direct Memory Access Controllers (DMACs) for rotating image data with hardware logic, and a PCI unit for data transfer via the PCI bus with the engine unit 60. To the ASIC 16, a Fax Control Unit (FCU) 30, a Universal Serial Bus (USB) 40, and an IEEE 1394 interface 50 are connected.

The MEM-C 17 is a local memory for use as an image buffer for copy or a code buffer. The HDD 18 is a storage for storing image data, programs, font data, and forms.

The AGP bus 15 is a bus interface for a graphics accelerator card suggested for increasing speed of graphic processing and, by directly accessing the MEM-P 12 with a high throughput, increases the speed of the graphic accelerator card.

Here, an image processing program to be executed on the MFP in the embodiments and modification examples is provided as being incorporated in advance in a ROM or the like.

Also, the image processing program to be executed on the MFP in the embodiments and modification examples may be configured to be recorded as a file in an installable or executable format on a computer-readable recording medium for provision, such as a Compact-Disk Read-Only Memory (CD-ROM), a flexible disk (FD), a Compact-Disk Recordable (CD-R), or a Digital Versatile Disk (DVD).

Furthermore, the image processing program to be executed on the MFP in the embodiments and modification examples may be configured to be stored on a computer connected to a network, such as the Internet, and is downloaded via the network for provision. Also, the image processing program to be executed on the MFP in the embodiments and modification examples may be configured to be provided or distributed via a network, such as the Internet.

The image processing program to be executed on the MFP in the embodiments and modification examples has a module configuration including each unit (the display input controlling unit, the print controlling unit, the scanner controlling unit, the ID managing unit, the detecting unit, the ID obtaining unit, the transmitting and receiving unit and, as required, the determining unit, the print-job managing unit, and others). As actual hardware, the CPU (processor) reads the image processing program from the ROM for execution, thereby loading each unit onto a main storage device and generating each unit on the main storage device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an input unit that receives plural images as input;
a first generating unit that generates image IDs, each image ID corresponding to one of the plural images received by the input unit;
a first storage control unit that stores the images and the image IDs generated by the first generating unit in a storage apparatus such that each of the image IDs is associated with one of the images;
a second generating unit that generates, when an output unit outputs a plurality of images on a plurality of output mediums as one copy unit, unit IDs and medium IDs, each unit ID corresponding to one copy unit and each medium ID corresponding to one of the output mediums;
a user ID accepting unit that accepts an allowed-user ID for allowing a corresponding user to reprint an image received by the input unit when the output unit outputs the image;
a second storage control unit that stores the unit IDs, the medium IDs, and corresponding allowed-user IDs accepted by the user ID accepting unit in association with the image IDs in the storage apparatus;
the output unit that outputs an output medium including one of the images combined with one of the medium IDs generated by the second generating unit and associated with the one of the images;
a detecting unit that detects a medium ID from the output medium output by the output unit;
an identifying unit that identifies a unit ID associated with the medium ID detected by the detecting unit and identifies one or more medium IDs associated with the identified unit ID;
an image obtaining unit that obtains images associated with the one or more medium IDs identified by the identifying unit from the images stored in the storage apparatus;
an authenticating unit that authenticates a user with a user identification for identifying the user;
a determining unit that determines whether a user ID authenticated by the authenticating unit and an allowed-user ID associated with the medium ID detected by the detecting unit match each other; and
an image ID obtaining unit that, when the determining unit determines that the user ID and the allowed-user ID match each other, obtains from the storage unit the image ID included in the copy unit identified by the unit ID associated with the medium ID detected by the detecting unit.

2. The image processing apparatus according to claim 1, further comprising a determining unit that determines whether unit IDs associated with the identified medium IDs are identical, wherein
when it is determined that the unit IDs are identical, the output unit outputs an image associated with the identical unit IDs once.

3. The image processing apparatus according to claim 1, further comprising a determining unit that determines whether unit IDs associated with the identified medium IDs are identical, wherein
when it is determined that the unit IDs are identical, the output unit does not output an image associated with the identical unit IDs.

4. The image processing apparatus according to claim 3, wherein when the determining unit determines that a first unit ID is identical and that a second unit ID is different, the output unit outputs an image associated with the second unit ID.

5. The image processing apparatus according to claim 1, wherein
the detecting unit detects the medium ID and print time provided in association with the detected medium ID, and
the identifying unit includes a specifying unit that specifies a medium ID based on the print time, and obtains all image IDs included in a copy unit identified by a unit ID associated with the specified medium ID, from the storage apparatus.

6. The image processing apparatus according to claim 5, wherein the specifying unit specifies a latest print time from among detected print times, and specifies a medium ID associated with the specified latest print time.

7. The image processing apparatus according to claim 1, wherein
the storage apparatus further stores therein a print condition for each copy unit in association with a unit ID corresponding to the copy unit, the identifying unit further obtains a print condition associated with the detected medium ID, from the storage apparatus, and the output unit outputs an image based on the print condition obtained by the identifying unit.

8. The image processing apparatus according to claim 1, wherein the storage apparatus stores therein identification information in which a copy identification for identifying a copy unit as the unit ID, an image ID of an image included in the copy unit, and a print condition for the copy unit are associated with each other, and the identifying unit obtains an image ID of an image included in a copy unit identified by a copy identification associated with the detected medium ID and a print condition associated with the obtained image ID, from the storage apparatus.

9. The image processing apparatus according to claim 1, wherein the storage apparatus stores therein identification information in which a job identification for identifying a job unit as the unit ID, an image ID of an image included in the job unit, the medium ID of a recording medium on which the image is printed, and a print condition for the job unit are associated with each other, and the identifying unit obtains an image ID of an image included in a job unit identified by a job identification associated with the detected medium ID and a print condition associated with the detected medium ID, from the storage apparatus.

10. The image processing apparatus according to claim 1, wherein the storage apparatus stores therein identification information in which a parent identification indicating a medium ID detected by the detecting unit when each image included in a copy unit was printed and interruption information indicating whether printing of the copy unit was interrupted are further associated, and when interruption information associated with the detected medium ID indicates a print interruption, the image obtaining unit obtains a parent identification associated with the detected medium ID, a medium ID matching the obtained parent identification, an image ID of an image included in a copy unit identified by a unit ID associated with the obtained medium ID, and a print condition associated with the obtained medium ID, from the storage apparatus.

11. The image processing apparatus according to claim 1, wherein the storage apparatus stores therein identification information in which a parent identification indicating a medium ID detected by the detecting unit when each image included in a copy unit was printed and interruption information indicating whether printing of the copy unit was interrupted are further associated each other, and when interruption information associated with the detected medium ID indicates print interruption, the identifying unit obtains a parent identification associated with the detected medium ID, a medium ID matching the obtained parent identification, an image ID that does not match an image ID of an image included in a copy unit identified by a unit ID associated with the detected medium ID from among image IDs of images included in a copy unit identified by a unit ID associated with the obtained medium ID, and a print condition associated with the obtained medium ID, from the storage apparatus.

12. The image processing apparatus according to claim 1, wherein the storage apparatus stores therein identification information in which a print user identification, which is a user identification of a user printing a copy unit is further associated, and the identifying unit further determines whether the user identification of the authenticated user and a print user identification associated with the detected medium ID match each other, and when the user identification and the print user identification match each other, obtains an image ID of an image included in a copy unit identified by a unit ID associated with the detected medium ID and a print condition associated with the detected medium ID, from the storage apparatus.

13. An image processing apparatus comprising:

an input unit that receives plural images as input;

a first generating unit that generates image IDs, each image ID corresponding to one of the plural images received by the input unit;

a first storage control unit that stores the images and the image IDs generated by the first generating unit in a storage apparatus such that each of the image IDs is associated with one of the images;

a second generating unit that generates, when an output unit outputs a plurality of images on a plurality of output mediums as one copy unit, unit IDs and medium IDs, each unit ID corresponding to one copy unit and each medium ID corresponding to one of the output mediums;

a user ID accepting unit that accepts an allowed-user ID for allowing a corresponding user to reprint an image received by the input unit when the output unit outputs the image;

a second storage control unit that stores the unit IDs, the medium IDs, and corresponding allowed-user IDs accepted by the user ID accepting unit in association with the image IDs in the storage apparatus;

the output unit that outputs an output medium including one of the images combined with one of the medium IDs generated by the second generating unit and associated with the one of the images;

a detecting unit that detects a medium ID from the output medium output by the output unit;

an identifying unit that identifies a unit ID associated with the medium ID detected by the detecting unit and identifies one or more medium IDs associated with the identified unit ID;

an image obtaining unit that obtains images associated with the one or more medium IDs identified by the identifying unit from the images stored in the storage apparatus;

an authenticating unit that authenticates a user with a user identification for identifying the user;

a determining unit that determines whether a user ID authenticated by the authenticating unit and an allowed-user ID associated with the medium ID detected by the detecting unit match each other;

an image ID obtaining unit that, when the determining unit determines that the user ID and the allowed-user ID match each other, obtains from the storage unit the image ID included in the copy unit identified by the unit ID associated with the medium ID detected by the detecting unit; and a determining unit that determines whether image IDs obtained by the identifying unit match each other for each of the identified medium IDs, wherein the output unit outputs once, when the determining unit determines that the image IDs match each other, an image associated with the image IDs determined as matching.

14. The image processing apparatus according to claim 13, wherein the determining unit determines, based on the determination result as to whether the image IDs match each other, whether all image IDs associated with a first medium ID are included in image IDs associated with a second medium ID, and when the determining unit determines that all image IDs associated with the first medium ID are included in the image IDs associated with the second medium ID, the output unit outputs once an image associated with the image IDs associated with the second medium ID.

15. The image processing apparatus according to claim 13, wherein the storage apparatus further stores therein a print condition for a copy unit associated with the image IDs, the identifying unit further obtains a print condition associated with a medium ID detected by the detecting unit, from the storage apparatus, the determining unit determines whether print conditions obtained by the identifying unit match each other for each of medium IDs associated with the detected medium ID, and when the determining unit determines that an image ID and a print condition matches each other, the output unit outputs once an image associated with image IDs determined to be matched.

16. The image processing apparatus according to claim 13, further comprising a selecting unit that selects a print condition when the determining unit determines that print conditions do not match each other, wherein the output unit outputs once an image associated with an image ID determined to be matched under a selected print condition.

* * * * *